United States Patent
Kempf et al.

(10) Patent No.: US 11,790,656 B2
(45) Date of Patent: Oct. 17, 2023

(54) MACHINE VISION SYSTEM AND METHOD WITH STEERABLE MIRROR

(71) Applicant: COGNEX CORPORATION, Natick, MA (US)

(72) Inventors: Torsten Kempf, Aachen (DE); Saul Sanz Rodriguez, Aachen (DE); Pepe Fernandez-Dorado, Aachen (DE); Laurens Nunnink, Simpelveld (NL)

(73) Assignee: Cognex Corporation, Natick, MA (US)

( * ) Notice: Subject to any disclaimer, the term of this patent is extended or adjusted under 35 U.S.C. 154(b) by 108 days.

(21) Appl. No.: 17/359,200

(22) Filed: Jun. 25, 2021

(65) Prior Publication Data

US 2021/0326603 A1 Oct. 21, 2021

Related U.S. Application Data

(63) Continuation-in-part of application No. 17/071,636, filed on Oct. 15, 2020, which is a continuation-in-part
(Continued)

(51) Int. Cl.
*G06V 20/52* (2022.01)
*G05D 1/02* (2020.01)
(Continued)

(52) U.S. Cl.
CPC ......... *G06V 20/52* (2022.01); *G02B 26/0833* (2013.01); *G05D 1/0094* (2013.01);
(Continued)

(58) Field of Classification Search
CPC ...... G06V 20/56; G06V 10/242; G06V 10/25; G06V 2201/07; G06V 10/147;
(Continued)

(56) References Cited

U.S. PATENT DOCUMENTS 4,032,785 A 6/1977 Green et al.
4,175,832 A 11/1979 Umeki et al.
(Continued)

FOREIGN PATENT DOCUMENTS

CN 109642820 A 4/2019
EP 1630721 A1 3/2006
(Continued)

OTHER PUBLICATIONS

Moser, Using Bounce Mirrors to Read Codes in Tight Spaces, Jun. 17, 2013, Copyright 2018 Omron Microscan Systems, Inc., 6 pages.
(Continued)

*Primary Examiner* — Jason A Flohre
(74) *Attorney, Agent, or Firm* — Quarles & Brady LLP

(57) ABSTRACT

A computer-implemented method for scanning a side of an object to identify a region of interest is provided. The method can include determining, using one or more computing devices, a distance between a side of an object and an imaging device, determining, using the one or more computing devices, a scanning pattern for an imaging device that includes a controllable mirror, based on the distance between the side of the object and the imaging device, moving a controllable mirror according to the scanning pattern to acquire, using the one or more computing device and the imaging device, a plurality of images of the side of the object, and identifying, using the one or more computing devices, the region of interest based on the plurality of images.

21 Claims, 34 Drawing Sheets

Related U.S. Application Data of application No. 16/715,078, filed on Dec. 16, 2019, now Pat. No. 10,812,727.

(51) Int. Cl.
*G02B 26/08* (2006.01)
*G05D 1/00* (2006.01)
*G06V 20/56* (2022.01)
*G06V 10/147* (2022.01)

(52) U.S. Cl.
CPC ......... *G05D 1/0231* (2013.01); *G06V 10/147* (2022.01); *G06V 20/56* (2022.01); *G06V 2201/07* (2022.01)

(58) Field of Classification Search
CPC .... G06V 20/52; G02B 26/0833; G02B 26/10; G05D 1/0094; G05D 1/0231; G01S 17/89
See application file for complete search history.

(56) References Cited

U.S. PATENT DOCUMENTS

| | | | |
|---|---|---|---|
| 4,825,068 A | 4/1989 | Suzuki et al. | |
| 4,939,355 A | 7/1990 | Rando et al. | |
| 5,770,848 A | 6/1998 | Oizumi et al. | |
| 5,979,761 A | 11/1999 | Wurz et al. | |
| 6,053,409 A | 4/2000 | Brobst et al. | |
| 6,086,209 A | 7/2000 | Miyahara et al. | |
| 6,688,525 B1 | 2/2004 | Nelson et al. | |
| 6,856,472 B2 | 2/2005 | Herman et al. | |
| 6,963,375 B1 | 11/2005 | Lundberg | |
| 7,256,834 B1 | 8/2007 | Sagefalk et al. | |
| 7,527,205 B2 | 5/2009 | Zhu et al. | |
| 7,726,573 B2 | 6/2010 | Gurevich et al. | |
| 7,954,719 B2 | 6/2011 | Zhu et al. | |
| 8,027,077 B2 | 9/2011 | Border | |
| 8,134,589 B2 | 3/2012 | Border et al. | |
| 8,164,625 B2 | 4/2012 | Klawunder | |
| 8,322,621 B2 | 12/2012 | Olmstead | |
| 8,608,076 B2 | 12/2013 | Olmstead | |
| 8,646,690 B2 | 2/2014 | Nunnink et al. | |
| 8,668,150 B2 | 3/2014 | Bombaugh et al. | |
| 8,978,979 B2 | 3/2015 | Bombaugh et al. | |
| 9,239,636 B1 | 1/2016 | S et al. | |
| 9,449,211 B2 | 9/2016 | Detwiler | |
| 9,703,115 B2 | 7/2017 | Schneider | |
| 9,710,684 B2 | 7/2017 | Detwiler | |
| 9,854,226 B2 | 12/2017 | Ko et al. | |
| 10,002,271 B2 | 6/2018 | Olmstead et al. | |
| 10,074,191 B1 * | 9/2018 | Reome | G01S 17/87 |
| 10,075,651 B2 | 9/2018 | Laroia et al. | |
| 10,812,727 B1 | 10/2020 | Kempf et al. | |
| 2003/0066949 A1 | 4/2003 | Mueller et al. | |
| 2004/0245227 A1 | 12/2004 | Grafton-Reed et al. | |
| 2008/0128503 A1 | 6/2008 | Moore et al. | |
| 2010/0051695 A1 | 3/2010 | Yepez et al. | |
| 2011/0254967 A1 | 10/2011 | Filliettaz III | |
| 2012/0261473 A1 * | 10/2012 | Bombaugh | G06K 7/10831 235/462.11 |
| 2013/0181051 A1 | 7/2013 | Olmstead et al. | |
| 2013/0200157 A1 * | 8/2013 | Nunnink | H04N 5/2259 348/222.1 |
| 2013/0327828 A1 | 12/2013 | Lawson et al. | |
| 2014/0028837 A1 | 1/2014 | Gao et al. | |
| 2014/0097251 A1 * | 4/2014 | Joussen | G06K 7/1491 235/462.07 |
| 2014/0124581 A1 * | 5/2014 | Bombaugh | G06K 7/10603 235/462.11 |
| 2014/0198185 A1 | 7/2014 | Haugen et al. | |
| 2015/0122890 A1 | 5/2015 | Olmstead et al. | |
| 2015/0310242 A1 | 10/2015 | Wehrle | |
| 2018/0203249 A1 | 7/2018 | Filhaber | |
| 2018/0218224 A1 | 8/2018 | Olmstead et al. | |
| 2018/0324349 A1 | 11/2018 | Kim | |
| 2019/0169008 A1 * | 6/2019 | Houle | B66F 9/07559 |
| 2019/0251312 A1 | 8/2019 | Schneider et al. | |
| 2019/0374855 A1 | 12/2019 | Johnston et al. | |
| 2020/0059594 A1 | 2/2020 | Olbrich et al. | |
| 2022/0174221 A1 | 6/2022 | Frischman et al. | |
| 2022/0267128 A1 * | 8/2022 | Han | G05D 1/0011 |

FOREIGN PATENT DOCUMENTS

| | | | | |
|---|---|---|---|---|
| EP | 2380109 B1 | 8/2017 | | |
| EP | 3839610 A1 | 6/2021 | | |
| GB | 2494884 A | * | 3/2013 | ........... B66F 17/003 |
| JP | 2006155395 A | 6/2006 | | |

OTHER PUBLICATIONS

European Patent Office, Extended European Search Report, Application No. 20214296.4, dated May 12, 2021, 8 pages.

PCT International Search Report and Written Opinion, PCT/US2022/034929, dated Oct. 19, 2022, 15 pages.

* cited by examiner

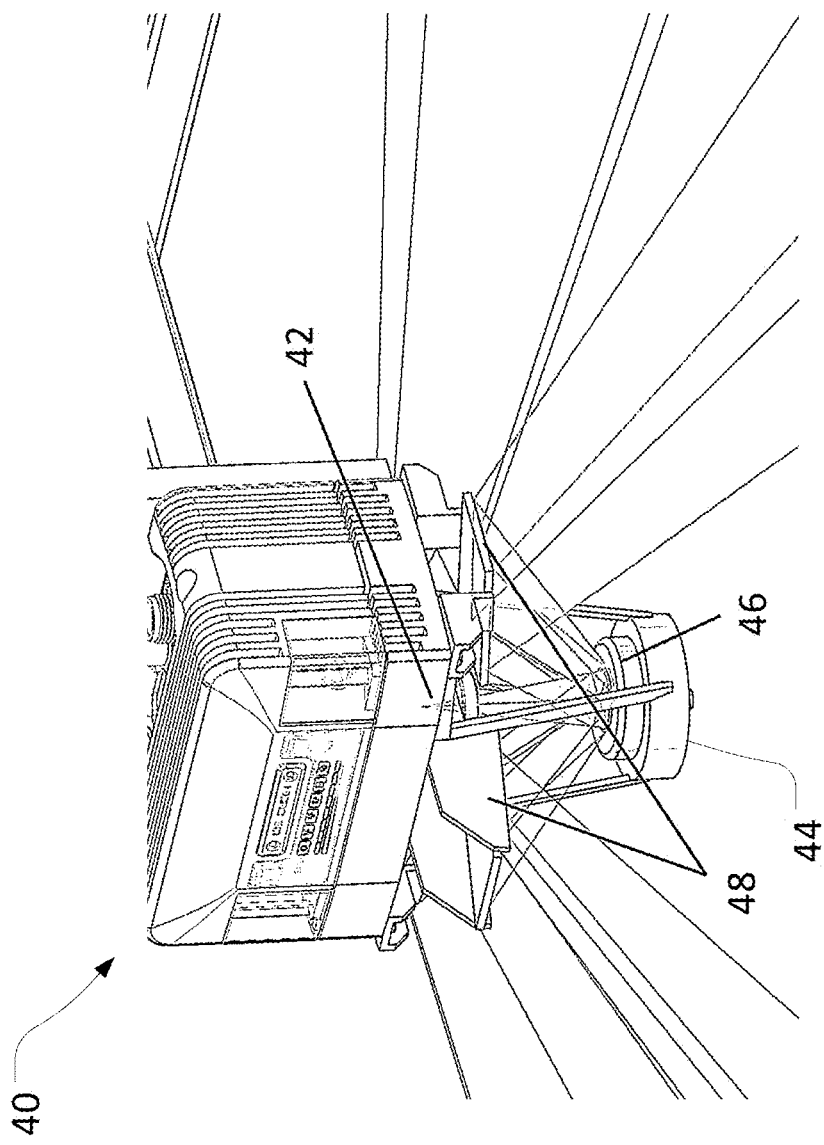

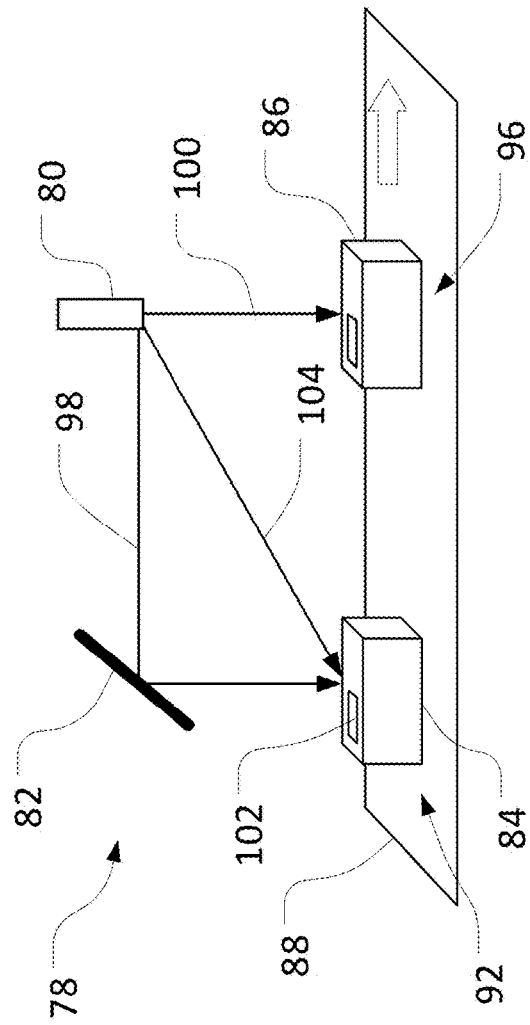
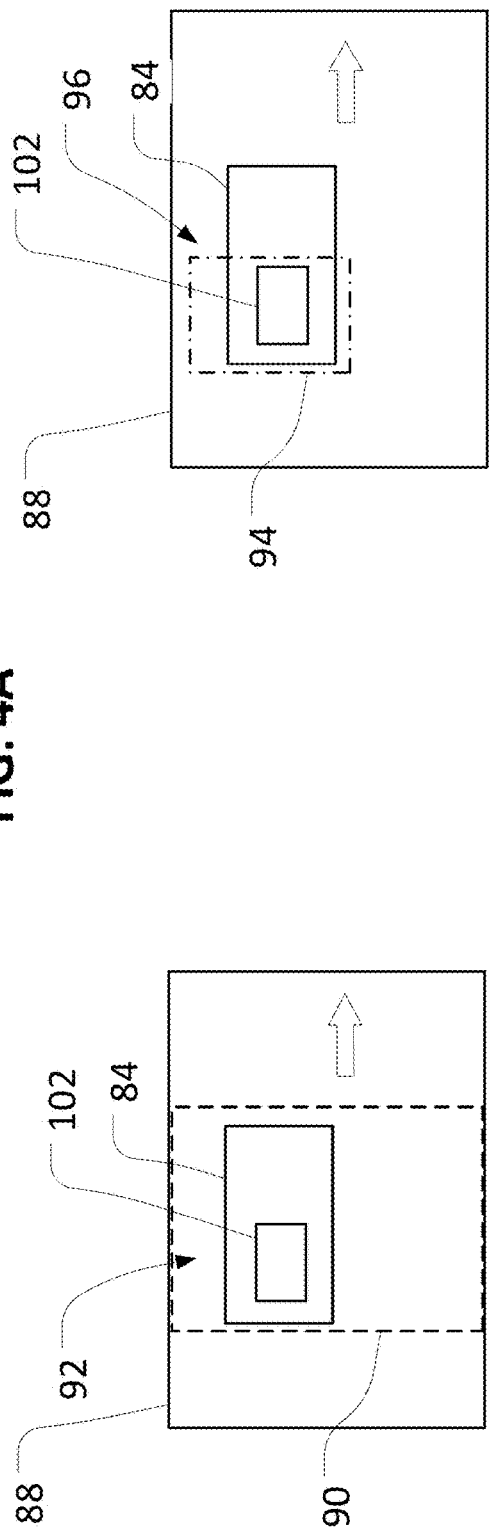
FIG. 4A
FIG. 4B
FIG. 4C

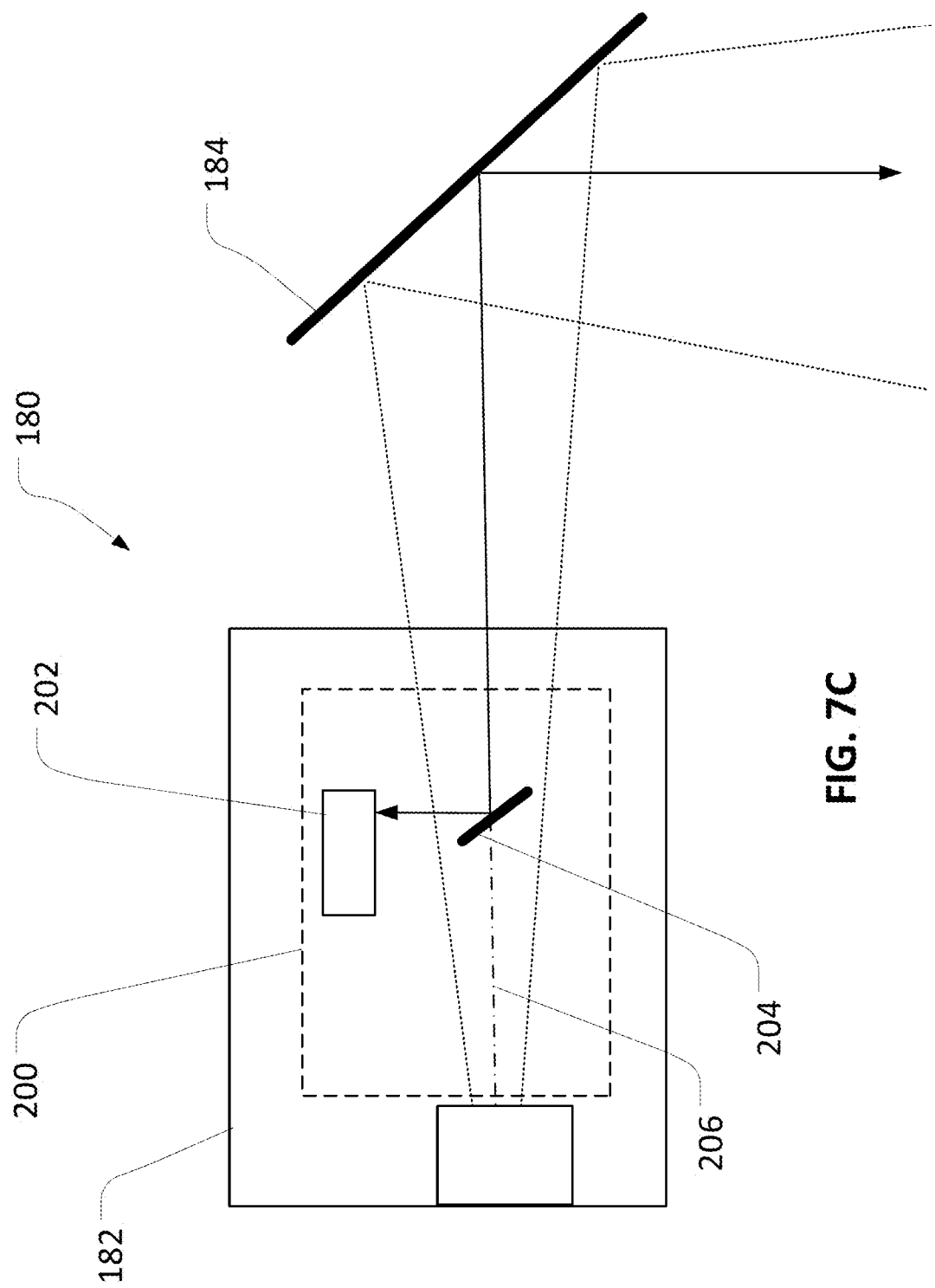

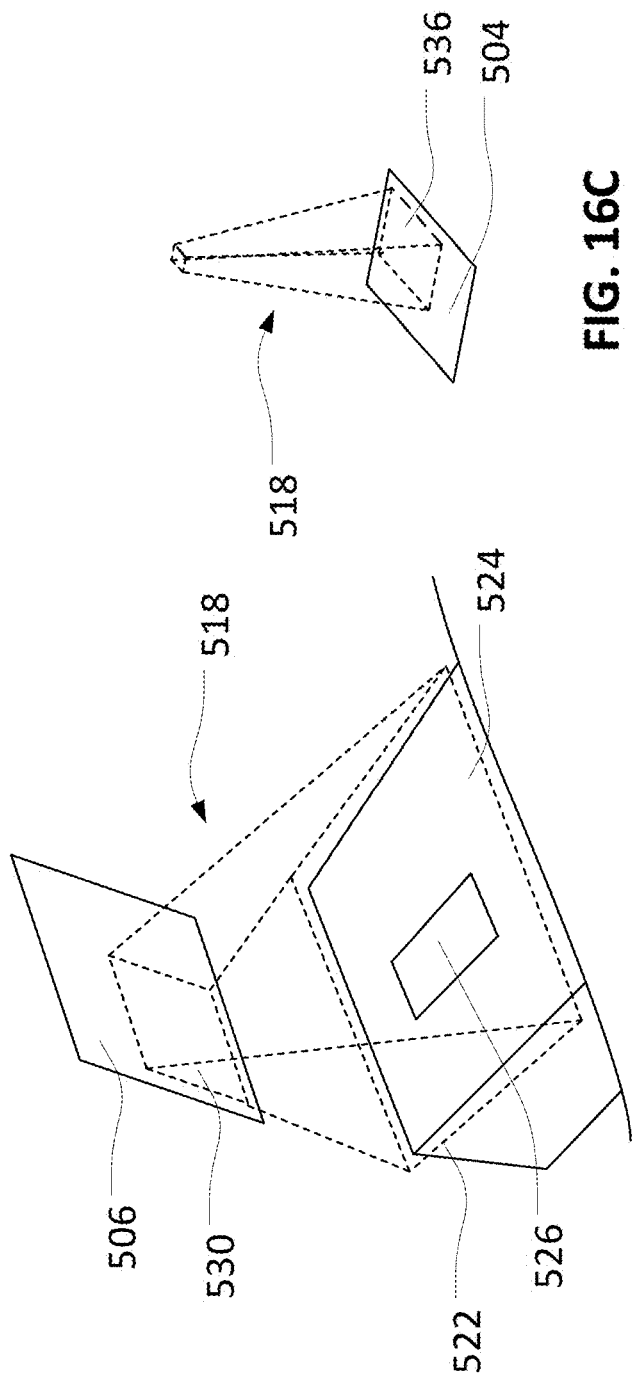

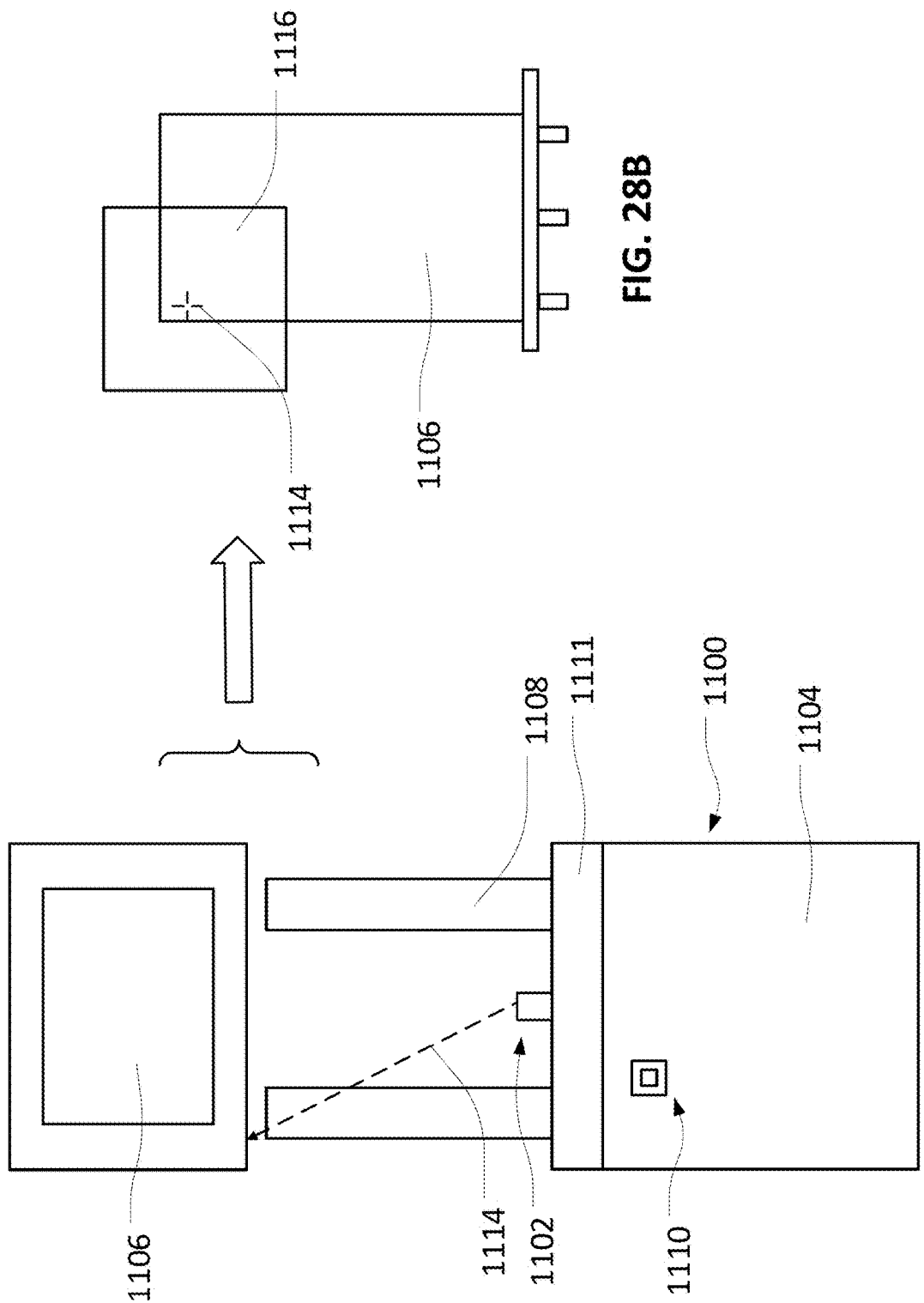

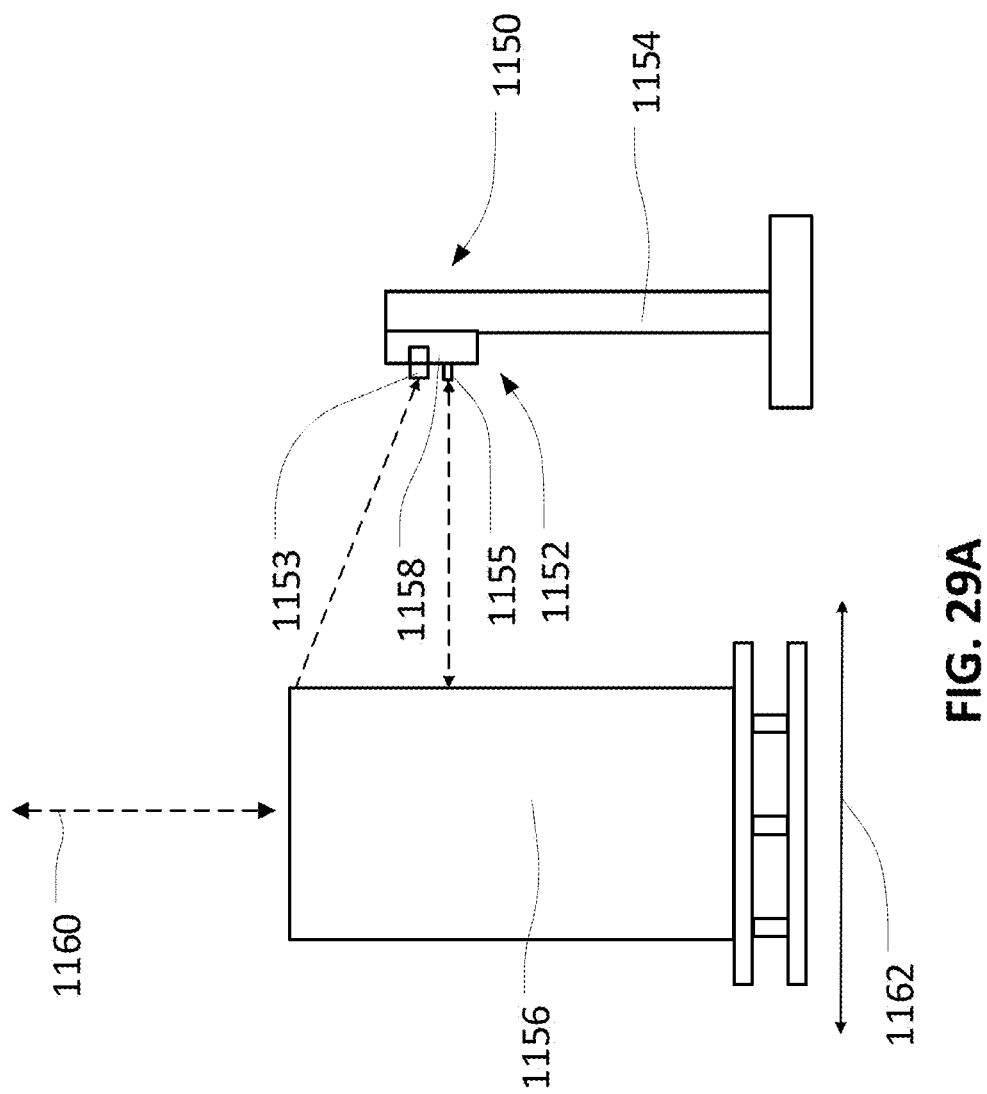

MACHINE VISION SYSTEM AND METHOD WITH STEERABLE MIRROR

CROSS-REFERENCE TO RELATED APPLICATIONS

This application is a continuation in part of U.S. patent application Ser. No. 17/071,636 filed Oct. 15, 2020, and entitled, "Machine Vision System and Method with Steerable Mirror," which is a continuation-in-part of U.S. patent application Ser. No. 16/715,078 filed Dec. 16, 2019, and entitled, "Machine Vision System and Method with Steerable Mirror," both of which are hereby incorporated by reference in their entirety.

STATEMENT REGARDING FEDERALLY SPONSORED RESEARCH OR DEVELOPMENT

Not applicable.

BACKGROUND OF THE TECHNOLOGY

The present technology relates to imaging systems, including machine vision systems that are configured to acquire and analyze images of objects or symbols (e.g., barcodes).

Machine vision systems are generally configured for use in capturing images of objects or symbols and analyzing the images to identify the objects or decode the symbols. Accordingly, machine vision systems generally include one or more devices for image acquisition and image processing. In conventional applications, these devices can be used to acquire images, or to analyze acquired images, including for the purpose of decoding imaged symbols such as barcodes or text. In some contexts, machine vision and other imaging systems can be used to acquire images of objects that may be larger than a field of view (FOV) for a corresponding imaging device or that may be moving relative to an imaging device.

BRIEF SUMMARY OF THE TECHNOLOGY

In some applications, including in systems for imaging and decoding barcodes or other symbols, it may be useful to acquire multiple images of a target, including successive images having different fields of view (FOVs) or different degrees of zoom. For example, as an object moves past an imaging device on a conveyor, it may be useful to acquire images of the object at different locations on the conveyor, to acquire images of different sides of the object, or to acquire objects with different degrees of zoom, such as may be useful to analyze a symbol on a relatively small part of the object at large.

Under conventional approaches, multiple images of an object can be acquired in different ways. As one example, in a tunnel application or other context in which images of multiple sides of an object are to be acquired, multiple imaging devices may be arranged with optical axes for image acquisition that are angled differently relative to an expected location of an object. For example, different sets of imaging devices may be angled to acquire images of a front of an object as it enters a tunnel, of the rear of the object as it leaves the tunnel, and of the top and sides of the object as it travels through the tunnel. As another example, a first imaging device can be arranged to acquire a first image of an object at a first location along a conveyor and a second imaging device can be arranged to acquire a second image of an object at a second location further along the conveyor. Or a first imaging device can be arranged to acquire an image of a first portion of an object, and a second imaging device can be arranged to acquire an image of a second portion of the object.

Although conventional approaches can provide useful information, including for identification and decoding of symbols, the installation, calibration, maintenance, and operation of multiple imaging devices may inherently be relatively complex, time consuming, expensive, and subject to error. Embodiments of the disclosed technology can address these and other issues. For example, some embodiments provide systems and corresponding methods in which a controllable (movable) mirror is used to change a field of view of a fixed-location imaging device (e.g., camera) between initial and subsequent images taken by the imaging device. In some embodiments, a controllable mirror can be used in combination with one or more fixed mirrors in order to provide different fields of view or to adjust a zoom of a particular image relative to another. For example, for a single imaging device, a combination of fixed and controllable mirrors can be used to adjust a field of view to different locations on a conveyor or to different locations on (e.g., different sides of) an object, or to provide different degrees of zoom for particular objects or locations. In some embodiments, a combination of fixed and controllable mirrors can be used to adjust a field of view between initial and subsequent images in order to measure dimensions of an object, thereby potentially obviating the need for more complex, e.g., three-dimensional (3D), sensors.

Some embodiments disclosed herein are expressly presented as systems, such as machine vision systems with imaging devices and associated mirrors. Those of skill in the art will recognize that corresponding embodiments (and others) can be executed as methods, such as computer-implemented methods with automated control of image acquisition and, as appropriate, image analysis, according to the capabilities of the associated systems. In this regard, unless otherwise indicated, discussion herein of disclosed systems inherently includes disclosure of corresponding methods that use the disclosed systems to execute the intended functionality (e.g., as electronically controlled by one or more processor devices). Similarly, those of skill in the art will recognize that embodiments expressly presented herein as methods can be implemented as systems, such as machine vision systems with one or more imaging devices, one or more associated mirrors (including a controllable mirror), and one or more processor devices that are configured to implement one or more operations of the relevant method, including through manipulation of a controllable mirror and corresponding acquisition of images.

Consistent with the discussion above, some embodiments of the technology include an imaging system (or method), such as, for example, a machine vision system, for acquiring images of a first object. An imaging device can include an imaging sensor and a lens arrangement. A first mirror can be configured to be (or can be) tilted relative to at least one axis. A control device can be configured to (or can), as the first object is moved along a direction of travel: using the imaging device, acquire a first image that includes the first object in a first location, the first image being acquired along a first optical path defined by the first mirror and a second mirror; tilt the first mirror relative to the at least one axis to define a second optical path (e.g., that does not include the second mirror); and using the imaging device, acquire a second image that includes the first object in a second location. In some cases, the second image can be acquired along the second optical path so that the first object is represented in a larger proportion of the second image than of the first image.

In some embodiments, a control device can be configured to focus a lens arrangement for image acquisition along a second optical path as a first mirror is tilted relative to at least one axis to define the second optical path.

In some embodiments, a control device can be configured to execute further operations. For example, After acquiring a second image, a first mirror can be tilted relative to at least one axis to be aligned with a first optical path. Using the imaging device, a third image can be acquired that includes a second object.

In some embodiments, with an object configured to move in a direction of travel along a conveyor, a first field of view can correspond to a first optical path and can extend across a substantially full width of the conveyor at a first location along the conveyor. A second field of view can correspond to a second optical path and can extend, at a second location along the conveyor, over a smaller width of the conveyor than does the first field of view at the first location along the conveyor. In some cases, a center of the first field of view may not be aligned with a center of the second field of view along the direction of travel.

In some embodiments, a control device can be configured to tilt a first mirror relative to two axes to define a second optical path and a second field of view. Tilting the first mirror relative to the two axes can collectively shift a field of view of an imaging device along a direction of travel for an object and transverse to the direction of travel.

In some embodiments, a first optical path can be defined by at least two mirrors including, optionally or preferably, a first movable mirror. In some cases, the second optical path may not include at least one of the mirrors that defines the first optical path.

In some embodiments, based on control of a mirror arrangement, a first location corresponding to a first image can coincide with a second location corresponding to a second image.

In some embodiments, based on control of a mirror arrangement, a larger proportion of a first object can be represented in a first image than in a second image.

In some embodiments, a control device can be further configured to execute other operations. For example, a region of interest can be identified on a first object in a first image. A first mirror can be tilted to define a second optical path so that the region of interest is included in the second image and is represented in a larger proportion of the second image than of the first image. In some cases, the region of interest can be a symbol on the first object. In some embodiments, an imaging system can include a machine vision system that is configured to decode the symbol based on the second image.

In some embodiments, a control device can be further configured to execute other operations. Based on a first image, a first pixel dimension of a feature of the first object can be determined. Based on a second image, a second pixel dimension of the feature of the first object can be determined. Based on the first and second pixel dimensions, a dimension (e.g., a height dimension) of the first object can be determined. In some embodiments, a control device can be configured to automatically focus a lens arrangement to acquire an image based on a determined dimension of the first object.

In some embodiments, a second image can substantially overlap with a first image.

In some embodiments, a first optical path can be defined by at least two mirrors and a second optical path may not include at least one of the at least two mirrors. In some cases, an optical path can include at least two fixed mirrors.

Some embodiments of the technology include an imaging system (or method), such as, for example, a machine vision system, for analyzing a symbol included on an object. An imaging device can include an imaging sensor and a lens arrangement. A control device can be configured to (or can): using the imaging device, acquire a first image of the object using a first field of view that is defined by first and second mirrors, with the first mirror in a first orientation, and that provides a first degree of zoom; move the first mirror to a second orientation; and using the imaging device, acquire a second image of the object using a second field of view that is defined by the first and second mirrors, with the first mirror in a second position, and that provides a second degree of zoom that is different from the first effective zoom.

In some embodiments, based on a first image, a first pixel dimension of a feature of a first object can be determined. Based on a second image, a second pixel dimension of the feature of the first object can be determined. Based on the first and second pixel dimensions, a height dimension of the first object can be determined.

In some embodiments, a second image can be acquired without using a fixed mirror that is used to acquire a first image. A control device can be configured to acquire the first image while the object is disposed at a first location along a conveyor, and to acquire the second image while the object is disposed at a second location along the conveyor, different from the first location.

Some embodiments of the technology include a method of (or system for) analyzing a symbol on an object, using an imaging system that includes an imaging device with an imaging sensor and a lens arrangement, a first mirror, and a second mirror. Using the imaging device, a first image of an object can be acquired along a first optical path that includes the first mirror and the second mirror. The first mirror can be moved to define a second optical path that does not include the second mirror. Using the imaging device, a second image of the object can be acquired along the second optical path so that the object is represented in a larger proportion of a second field of view for the second image than of a first field of view of the first image.

In some embodiments, determining a first pixel dimension of a feature of an object can be determined based on a first image. Based on a second image, a second pixel dimension of the feature of the object can be determined. Based on the first and second pixel dimensions, a distance from the object to the imaging device or a dimension of the object can be determined. In some cases, a lens arrangement can be automatically focused to acquire an image based on a determined distance from an object to an imaging device.

Some embodiments of the technology include an imaging system for acquiring images of a first object, with the first object configured to move in a direction of travel along a transport system. An imaging arrangement can include at least one imaging sensor and at least one lens arrangement. A mirror arrangement can include a first mirror that can be controllably movable, and optionally or preferably a second mirror. A control device can be configured to execute operations, as the first object is moved along the direction of travel. The operations can include using the at least one imaging sensor and the at least one lens arrangement to acquire a first image that includes the first object in a first location, the first image being acquired along a first optical path, the first optical path being optionally or preferably defined at least in part by the mirror arrangement or the second mirror. In some cases, a first field of view corresponding to the first optical path extends across a substantially full width of the conveyor at a first location along the conveyor.

The operations can further include moving the first mirror to define a second optical path that optionally or preferably does not include the second mirror. In some cases, a second field of view corresponding to the second optical path can extend, at a second location along the conveyor, over a smaller width of the conveyor than does the first field of view at the first location along the conveyor.

The operations can further include using the at least one imaging sensor and the at least one lens arrangement to acquire a second image that includes the first object in the second location, the second image being acquired along the second optical path with a different degree of zoom than the first image, relative to the first object.

In some embodiments, a control device can be configured to selectively control a first mirror to define a second optical path such that the second optical path intersects a set of mirrors that includes one of: only the first mirror or a plurality of mirrors.

In some embodiments, a control device can be configured to selectively move a first mirror to define a second optical path based on a determination of a height of the first object.

In some embodiments, a control device can be configured to execute further operations. For example, Multiple images of a first object can be acquired, each along a different optical path, with at least one of the different optical paths defined by a controlled movement of one or more mirrors. Pixel dimensions of a feature of the first object can be determined in each of the multiple images. A dimension (e.g., a height) of the first object can be determined based on the determined pixel dimensions of the feature.

In some embodiments, a second optical path can be determined based on a position of an object on a transport system in a first image.

In some embodiments, an imaging system for analyzing a symbol included on an object can include an imaging arrangement that includes at least one imaging sensor and at least one lens arrangement. A mirror arrangement can include a first mirror that is controllably movable and, optionally or preferably, a second mirror. A control device can be configured to execute certain operations. For example, a first image can be acquired, using the imaging arrangement, using a first field of view that provides a first degree of zoom and, optionally or preferably, is defined at least in part by the second mirror. The first mirror can be moved from a first orientation to a second orientation. Using the imaging arrangement, a second image can be acquired of the object using a second field of view that is defined at least in part by the first mirror in the second orientation and that provides a second degree of zoom that is different from the first degree of zoom.

In some embodiments, based on the first image, a first pixel dimension of a feature of the object can be determined. Based on the second image, a second pixel dimension of the feature of the object can be determined. Based on the first and second pixel dimensions, determine a dimension (e.g., a height dimension) of the object can be determined.

In some embodiments, a method is provided for analyzing a symbol on an object, using an imaging system that includes an imaging arrangement with at least one imaging sensor and at least one lens arrangement, and a mirror arrangement that includes a first mirror and, optionally or preferably, a second mirror. Using the imaging arrangement, a first image of the object can be acquired along a first optical path that, optionally or preferably, includes at least the second mirror. The first mirror can be moved to define a second optical path that is different from the first optical path and, optionally or preferably, does not include the second mirror. Using the imaging arrangement, a second image of the object can be acquired along the second optical path. Based on the first image, a first pixel dimension of a feature of the object can be determined. Based on the second image, a second pixel dimension of the feature of the object can be determined. Based on the first and second pixel dimensions, determining one or more of a distance from the object to the imaging arrangement or a dimension (e.g., a height dimension) of the object. Optionally or preferably, the second image can provide a different degree of zoom than the first image, relative to the object.

Some embodiments provide a system for scanning multiple sides of an object. A support structure can be configured to support the object. One or more imaging devices can include, collectively, a first imaging sensor and a second imaging sensor. A mirror arrangement can include at least one controllable mirror. A processor device can be configured to execute operations using the one or more imaging devices and the mirror arrangement. For example, a first image of a first side of the object can be acquired using the first imaging sensor and the mirror arrangement, including moving the at least one controllable mirror to direct a first field of view (FOV) for the first imaging sensor to a first region of interest for the first side. A second image of a second side of the object can be acquired using the second imaging sensor and the mirror arrangement, including moving the at least one controllable mirror to direct a second FOV for the second imaging sensor to a second region of interest for the second side.

In some embodiments, a mirror arrangement can include a first controllable mirror and a second controllable mirror. Acquiring a first image can include moving the first controllable mirror to direct the first FOV. Acquiring a second image can include moving the second controllable mirror to direct the second FOV.

In some embodiments, first and second images can be acquired as part of a single trigger event.

In some embodiments, respective additional images can be acquired of each of a plurality of other sides of the object using a respective imaging sensor. Acquiring each of the respective additional images can include moving the at least one controllable mirror to direct a respective additional FOV for the respective additional imaging sensor to a respective additional region of interest for a respective one of the plurality of the other sides.

In some embodiments, acquiring respective images of sides of an object can include moving a respective different controllable mirror of a mirror arrangement to direct a respective FOV to a respective additional region of interest.

In some embodiments, an image can be acquired of a bottom side of an object.

In some embodiments, a support structure can include a support platform with a transparent or open structure to support an object from below.

In some embodiments, images can be acquired while an object is stationary.

In some embodiments, a first image may not include an entirety of a first side of an object.

In some embodiments, a composite image can be generated of a first side of an object using a first image and a subsequent image of a subsequent region of interest for the first side of the object. The subsequent image can be acquired using a first imaging sensor, including moving at least one controllable mirror to direct an FOV to the subsequent region of interest.

In some embodiments, at least one controllable mirror can be moved to acquire one or more initial images using a first imaging sensor. A first region of interest can be identified based on the one or more initial images.

In some embodiments, initial images can be acquired based on a predetermined initial scan area (e.g., as identified based on user input).

In some embodiments, a first region of interest can be identified based on identifying one or more symbols in one or more initial images.

In some embodiments, one or more initial images can include a plurality of overlapping images.

In some embodiments, one or more initial images can include a set of non-overlapping images.

In some embodiments, if identifying a first region of interest based on a set of non-overlapping images is unsuccessful, a set of overlapping images can be acquired and the first region of interest can be identified based on the overlapping images.

Some embodiments of the technology provide a system for scanning six sides of an object. A support structure can be configured to support the object. A mirror arrangement can include a plurality of controllable mirrors (e.g., at least six controllable mirrors) associated with a plurality of imaging sensors (e.g., at least six imaging sensors). A processor device can be configured to execute operations using the plurality of imaging sensors and the plurality of controllable mirrors. The controllable mirrors can be moved to direct a respective field of view (FOV) for image acquisition onto each of the six sides of the object. A respective image of each of the respective FOVs can be acquired using a respective imaging sensor of the plurality of imaging sensors.

In some embodiments, one or more sensors can be configured to identify three-dimensional features of one or more sides of the object. The three-dimensional features can be combined with (e.g., overlaid on) one or more images associated with the one or more sides of the object to provide a three-dimensional representation of the object.

Some embodiments of the technology can provide a method of scanning multiple sides of an object. A first image of a first side of the object can be acquired using a first imaging sensor and a mirror arrangement that includes at least one controllable mirror, including moving the at least one controllable mirror to direct a first field of view (FOV) for the first imaging sensor to a first region of interest for the first side. A second image of a second side of the object can be acquired using a second imaging sensor and the mirror arrangement, including moving the at least one controllable mirror to direct a second FOV for the second imaging sensor to a second region of interest for the second side.

Some embodiments of the technology can provide an imaging system that includes one or more imaging devices and a mirror arrangement. The one or more imaging devices can include at least one imaging sensor and at least one lens arrangement. The mirror arrangement can include at least one controllable mirror. A processor device configured to execute operations for the one or more imaging devices and the mirror arrangement. For example, using a first optical path, a first image of a first object at a first location can be acquired, the first object having a first height, and the first optical path not including a first fixed mirror of the mirror arrangement. The at least one controllable mirror can be moved to define a second optical path that includes the first fixed mirror and provides a field of view (FOV) for image acquisition that is larger at a second height than is an FOV along the first optical path at the second height. A second image of a second object having the second height can be acquired using the second optical path.

In some embodiments, an FOV provided by a second optical path can be larger at the top surface of a second object than is an FOV at the top surface of the second object along a first optical path.

In some embodiments, a second optical path can include a plurality of fixed mirrors.

In some embodiments, a first optical path can include no fixed mirrors.

In some embodiments, a first optical path can pass between at least two of a plurality of fixed mirrors (e.g., of a second optical path).

In some embodiments, first and second optical paths can correspond to image acquisition of objects at the same location along a transport system.

In some embodiments, a first optical path can be defined by a controllable mirror.

In some embodiments, a first optical path can be defined by a second fixed mirror of a mirror arrangement.

In some embodiments, before acquiring first or second images, one or more objects can be scanned along a third optical path, the third optical path corresponding to image acquisition of objects at a second location along a transport system that precedes a first location. One of a first or a second optical path can be selected for subsequent image acquisition based on the scanning of the one or more objects.

In some embodiments, scanning one or more object can include determining a height of the one or more objects. Selecting one of a first or a second optical path can be based on the height of the one or more objects.

In some embodiments, scanning one or more objects can include scanning an area of the transport system using a distance sensor (e.g., a time-of-flight (ToF) sensor or other known distance sensor).

In some embodiments, scanning one or more objects can include acquiring one or more initial images of the first or second object using the one or more imaging devices.

In some embodiments, scanning one or more objects and acquiring at least one of a first image or a second image can be implemented using the same imaging device.

In some embodiments, determining a height of the first or second object can be based on one or more initial images. Selecting one of a first or a second optical path can be based on the determined height.

In some embodiments, a region of interest can be identified on a first or second object based on one or more initial images. Selecting one of a first or a second optical path can be based on the identified region of interest.

In some embodiments, a third optical path can include a third fixed mirror of the mirror arrangement.

Some embodiments of the technology can provide an imaging system for use with a transport system configured to move objects. One or more imaging devices can include at least one imaging sensor and at least one lens arrangement. A mirror arrangement can include at least one controllable mirror and a plurality of fixed mirrors. A processor device can be configured to execute operations with the one or more imaging devices and the mirror arrangement. A height of an object can be determined. If the height is a first height, the at least one controllable mirror can be moved to define a first optical path that includes the at least one controllable mirror and does not including a first fixed mirror of a mirror arrangement, and an image of the object can be acquired using the first optical path and the one or more imaging devices. If the height is a second height that is larger than the first height: the at least one controllable mirror can be moved to define a second optical path that includes the at least one controllable mirror and the first fixed mirror, and an image of the object can be acquired using the second optical path and the one or more imaging devices.

In some embodiments, a first optical path may include no fixed mirror.

In some embodiments, a second optical path can include at least two fixed mirrors.

In some embodiments, determining the height of an object can be based on scanning the object using a second fixed mirror and at least one of a distances sensor or the one or more imaging devices, before acquiring an image of the object using a first or a second optical path.

Some embodiments of the technology provide a method of acquiring images of objects on a transport system. A height of an object on the transport system can be determined. Based on the determined height, a first optical path for image acquisition or a second optical path for image acquisition can be selected. The second optical path can include a fixed mirror not included in the first optical path. The fixed mirror can effectively increase an imaging distance between an imaging sensor of an imaging device and the transport system along the second optical path as compared to the first optical path. A controllable mirror can be moved to align with the selected first or second optical path. An image of the object can be acquired along the selected first or second optical path using the imaging sensor.

Some embodiments of the technology provide an imaging system for acquiring images of objects that move in a direction of travel along a conveyor. The imaging system can include at least one imaging sensor and at least one lens arrangement, a mirror arrangement that includes a first mirror that is controllably movable, and a control device. The control device can be configured to, as a first object is moved along the direction of travel, using the at least one imaging sensor and the at least one lens arrangement, acquire a first image that can include the first object in a first location along the conveyor. The first image can be acquired along a first optical path defined by the mirror arrangement. A first field of view corresponding to the first optical path can extend across a substantially full width of the conveyor at the first location. The control device can be configured to, as a first object is moved along the direction of travel, move the first mirror to define a second optical path with the mirror arrangement. The second optical path can be different from the first optical path. A second field of view corresponding to the second optical path can extend, at a second location along the conveyor, over a smaller width of the conveyor than does the first field of view at the first location along the conveyor. The control device can be configured to, as a first object is moved along the direction of travel, using the at least one imaging sensor and the at least one lens arrangement, acquire a second image that can include the first object in the second location. The second image can be acquired along the second optical path.

In some embodiments, a second image can be acquired with a different degree of zoom than a first image, relative to a first object.

In some embodiments, a control device can be further configured to selectively move a first mirror to define a second optical path such that the second optical path intersects a set of mirrors that can include one of only the first mirror, or a plurality of mirrors, including at least one fixed mirror.

In some embodiments, a set of mirrors intersected by a second optical path does not include a fixed mirror that is intersected by a first optical path.

In some embodiments, a control device can be configured to move a first mirror to define a second optical path based on a determination of a height of a first object.

In some embodiments, a control device can be further configured to acquire multiple images of a first object, each along a different optical path, with at least one of the different optical paths defined by a controlled movement of one or more mirrors. The control device can be further configured to determine pixel dimensions of a feature of the first object in each of the multiple images, and determine a height of the first object based on the determined pixel dimensions of the feature.

In some embodiments, a control device can be further configured to determine a height of a first object using a distance sensor and one or more mirrors of a mirror arrangement.

In some embodiments, a control device can be configured to move a first mirror to define a second optical path based on a position of a first object on a conveyor in a first image.

In some embodiments, a control device can be further configured to automatically adjust a focus of at least one lens arrangement to acquire a second image along a second optical path.

In some embodiments, a control device can be configured to automatically adjust a focus simultaneously with moving a first mirror.

In some embodiments, a control device can be configured to automatically adjust a focus based on a controlled movement of a first mirror.

In some embodiments, a control device can be further configured to control a first mirror to acquire an image of a calibration target in between acquiring successive images of one or more objects on the conveyor, and control a focus of at least one lens arrangement based on the image of the calibration target.

Some embodiments of the technology provide an imaging system. The imaging system can include an imaging device that can include at least one imaging sensor and at least one lens arrangement. The imaging system can include a first mirror, a second mirror; and a control device. The control device can be configured to with the first mirror in a first orientation, control the imaging device to acquire a first image of an object with a first field of view that can be defined at least in part by the second mirror and that can provide a first degree of zoom. The control device can be configured to move the first mirror from the first orientation to a second orientation, and control the imaging device to acquire a second image of the object using a second field of view that can be defined by the first mirror in the second orientation, can be different from the first field of view, and can provide a second degree of zoom. The control device can be configured to, based on the first image, determine a first pixel dimension of a feature of the object, based on the second image, determine a second pixel dimension of the feature of the object, and based on the first and second pixel dimensions, determine a height dimension of the object.

In some embodiments, a second mirror can be a fixed mirror.

In some embodiments, a second mirror can be not included in an optical path for acquiring a second image.

In some embodiments, a first pixel dimension and a second pixel dimension can be pixel dimensions of a top surface of the object.

In some embodiments, an imaging system can include a third mirror. A control device can be further configured to move a first mirror to a third orientation to define, via the first mirror and the third mirror, a third field of view that can be different from a first and a second fields of view. The control device can be further configured to acquire a third image of an object using the third field of view, the third image providing a third degree of zoom that is different from a first and second degrees of zoom.

In some embodiments, at least one of a first or a second image can include an entirety of a top surface of an object. A third image can include only part of the top surface of the object.

Some embodiments of the technology provide a method of analyzing a symbol on an object, using an imaging system that can include an imaging device with at least one imaging sensor and at least one lens arrangement, a first mirror, and a second mirror. The method can include with the imaging device, acquiring a first image of the object along a first optical path that includes the second mirror. The method can include moving the first mirror to define a second optical path that does not include the second mirror; and with the imaging device, acquiring a second image of the object along the second optical path. The method can include based on the first image, determining a first pixel dimension of a feature of the object, based on the second image, determining a second pixel dimension of the feature of the object; and based on the first and second pixel dimensions, determining one or more of a distance from the object to the imaging device or a height of the object.

In some embodiments, a second image can provide a different degree of zoom than a first image, relative to an object.

Some embodiments of the technology provide an imaging system. The imaging system can include a support structure, and an imaging device coupled to the support structure. The imaging device can include an imaging sensor, and a controllable mirror that is configured to be controllably tilted relative to one or more axes. The controllable mirror can define a field of view (FOV) for the imaging sensor, based on an orientation of the controllable mirror. The imaging device can include a control device that can be configured to implement a scanning pattern to scan a side of an object as the object travels past the imaging device in a direction of travel. The scanning pattern can include the control device moving the controllable mirror about only one axis of the one or more axes to acquire a plurality of images, with a correspondingly plurality of FOVs, that collectively cover the entire side of the object.

In some embodiments, a scanning pattern can include the control device being further configured to acquire, using a first FOV that is defined by the mirror in a first orientation, a first image of the side of an object as an object travels past a imaging device in a direction of travel, move a controllable mirror only about the one axis so that the controllable mirror is in a second orientation as the side of the object travels past the imaging device, and acquire, using a second FOV that is defined by the controllable mirror in the second orientation, a second image of the side of the object as the object travels past the imaging device in the direction of travel.

In some embodiments, a first FOV overlaps vertically with a second FOV. A region of interest of an object, which can be a symbol (e.g., a barcode) can be smaller than the first FOV and the second FOV.

In some embodiments, a scanning pattern can include the control device being configured to move a controllable mirror only about one axis so that the controllable mirror is in a third orientation, and acquire, using a third FOV that is defined by the controllable mirror in the third orientation, a third image of a side of an object as the object travels past a imaging device in a direction of travel. The third FOV can overlap horizontally with at least one of a first FOV, or a second FOV.

In some embodiments, the imaging device can include a transport system that supports and transports an object along the transport system in a direction of travel. An imaging device that can be coupled to a support structure can be mounted adjacent to the transport system. The control device of the imaging device can be configured to acquire multiple images that collectively span the entire height of the object.

In some embodiments, FOVs that correspond to multiple images collectively span, at a transport system, from a height of the transport system to a maximum expected height of objects to be supported by the transport system.

In some embodiments, an optical axis of an imaging device can be substantially perpendicular to a direction of travel of an object.

In some embodiments, the imaging system can include a fixed mirror that faces a side of the object and exhibits a first height between first and second ends of the fixed mirror to direct FOVs that correspond to multiple images to collectively span the entire height of the object.

In some embodiments, a fixed mirror can be obliquely angled relative to a direction of travel. An optical axis of an imaging device, at the imaging device, can be substantially parallel to the direction of travel of an object.

In some embodiments, a fixed mirror can be a first fixed mirror. The imaging system can include a second fixed mirror. A controller of an imaging device can be configured to move a controllable mirror to direct a FOV for a imaging sensor onto a different side of an object, via the second fixed mirror, to acquire an image of a portion of a different side of the object.

In some embodiments, a controllable mirror is configured to be controllably tilted about two or more axes.

In some embodiments, an imaging device can include a distance sensor. The support structure can be configured to be fixed in place for image acquisition of moveable objects. A control device can be configured to determine, using the distance sensor, a distance between an imaging device and a side of the object, and determine a scanning pattern, based on the distance between the imaging device and the object.

In some embodiments, a controller can be configured to determine a scanning pattern based on a predetermined dimension of an object.

In some embodiments, the imaging system can include a presence sensor. The controller can be configured to receive a signal from the presence sensor indicative of a sensing of an object, and begin implementing a scanning pattern, based on receiving the signal from the presence sensor.

Some embodiments of the technology provide an object transport system. The object transport system can include a work vehicle having one or more implements that are configured to engage a load to be moved by the work vehicle, and an imaging device coupled to the work vehicle. The imaging device can include an imaging sensor, and a mirror that is configured to be tilted relative to two axes. The mirror can define a field of view (FOV) for the imaging sensor. The imaging device can include a distance sensor, and a control device. The control device can be configured to determine, using the distance sensor, a distance between the imaging device and the load, determine a scanning pattern, based on the distance between the imaging device and the load, and control the mirror and the image sensor, according to the scanning pattern, to tilt the mirror about one or more of the two axes and acquire a plurality of images of a first side of the load, via the mirror.

In some embodiments, one or more signals from a distance sensor are reflected by a mirror of the imaging device.

In some embodiments, a control device is further configured to determine a scanning pattern based also on a predetermined dimension of a load.

In some embodiments, an imaging sensor can include an aimer that projects an aiming pattern via a mirror. A work vehicle can include a user interface. A control device can be configured to control the mirror to move the aiming pattern, receive, from the user interface, a user input that indicates that the aiming pattern is at a desired location, and further determine a scanning pattern, based on the user input.

Some embodiments of the technology provide a computer-implemented method for scanning a side of an object to identify a region of interest. The method can include determining, using one or more computing devices, a distance between a side of an object and an imaging device, determining, using the one or more computing devices, a scanning pattern for the imaging devices, based on the distance between the side of the object and the imaging device, moving a controllable mirror according to the scanning pattern to acquire, using the imaging device, a plurality of images of the side of the object, and identifying, using the one or more computing devices, the region of interest based on the plurality of images.

In some embodiments, a method can include determining, using one or more computing devices, a dimension of a side of an object, and determining, using the one or more computing devices, a scanning pattern for the imaging device based on the dimension of the side of the object.

In some embodiments, determining a dimension of a side of an object is based on a distance and one or more of a plurality of images.

Some embodiments of the technology provide an imaging system. The imaging system can include a transport system, a distance sensor; and an imaging device. The imaging device can be in communication with the distance sensor. The imaging device can include an imaging sensor, and a controllable mirror that can be configured to be controllably tilted relative to one or more axes. The controllable mirror can define a field of view (FOV) for the imaging sensor, based on an orientation of the controllable mirror. The imaging device can include a control device. The control device can be configured to determine, using a distance sensor, a distance between the imaging device and a side of an object, determine a scanning pattern, based on the distance between the imaging device and the object, and implement the scanning pattern to scan a side of an object. The imaging device can be coupled to the transport system, or the imaging device can be coupled to a support structure and the transport system supports and moves the object in a direction of travel.

In some embodiments, an imaging device can be coupled to the transport system. A transport system can be a work vehicle having one or more implements that can be configured to engage a load to be moved by the work vehicle.

In some embodiments, an imaging system can include a support structure. An imaging device can be coupled to the support structure that can be configured to be fixed in place. A transport system can support and move the object in a direction of travel. A control device can implement the scanning pattern to scan the side of the object as the object travels past the imaging device in a direction of travel along the transport system.

In some embodiments, a scanning pattern can include a control device moving a controllable mirror about only one axis to acquire a plurality of images, with a correspondingly plurality of FOVs, that collectively cover an entire side of an object. The controllable mirror can be configured to be controllably tilted relative to two or more axes.

In some embodiments, implementing a scanning pattern can include a control device being configured to acquire, using a first FOV that is defined by a controllable mirror in a first orientation, a first image of the side of an object, move the controllable mirror only about only one axis of the one or more axes so that the controllable mirror is in a second orientation, and acquire, using a second FOV that is defined by the controllable mirror in the second orientation, a second image of the side of the object.

In some embodiments, a first FOV overlaps vertically with a second FOV.

In some embodiments, implementing the scanning pattern can include a control device being configured to move a controllable mirror only about one axis so that the controllable mirror is in a third orientation, and acquire, using a third FOV that is defined by the controllable mirror in the third orientation, a third image of the side of the object. The third FOV can overlap horizontally with at least one of a first FOV, or a second FOV.

In some embodiments, a control device of an imaging device implementing the scanning pattern includes the imaging device being configured to acquire multiple images that collectively span an entire height of an object.

In some embodiments, a control device can be configured to determine a scanning pattern based on a predetermined dimension of the object.

In some embodiments, a predetermined dimension of the object can be a maximum expected height of an object. A control device can be configured to implement a scanning pattern to acquire, using an imaging device, multiple images having corresponding FOVs that collectively span from a height of a transport system to a maximum expected height of the object.

In some embodiments, an optical axis of an imaging device, at the imaging device, is substantially perpendicular to a direction of travel of an object. The optical axis of the imaging device can be defined by the optical axis that extends out of the imaging device to extend through and bypass a controllable mirror without reflecting off the controllable mirror.

In some embodiments, the imaging system can include a fixed mirror that can be obliquely angled relative to the direction of travel. An optical axis of an imaging device, at the imaging device, can be substantially parallel to a direction of travel of an object. The optical axis of the imaging device can be defined by the optical axis that extends out of the imaging device to extend through and bypass the controllable mirror without reflecting off the controllable mirror.

In some embodiments, the imaging system can include a fixed mirror that faces a side of the object and exhibits a first height between first and second ends of the fixed mirror, to direct the FOVs that correspond to a plurality of images to collectively span the entire height of the object.

In some embodiments, a fixed mirror is a first fixed mirror. The imaging system can include a second fixed mirror. A control device of an imaging device can be configured to move a controllable mirror to direct a FOV for a imaging sensor onto a different side of an object, via the second fixed mirror, to acquire an image of a portion of the different side of the object.

In some embodiments, the imaging system can include a presence sensor. A control device can be configured to receive a signal from the presence sensor indicative of a sensing of the object, and begin implementing a scanning pattern, based on receiving the signal from the presence sensor.

Some embodiments of the technology can provide an object transport system. The object transport system can include a distance sensor, a work vehicle having one or more implements that are configured to engage a load to be moved by the work vehicle, and an imaging device coupled to the work vehicle. The imaging device can be in communication with the distance sensor. The imaging device can include an imaging sensor, and a mirror that is configured to be tilted relative to two axes. The mirror can define a field of view (FOV) for the imaging sensor. The imaging device can include a control device. The control device can be configured to determine, using the distance sensor, a distance between the imaging device and the load, determine a scanning pattern, based on the distance between the imaging device and the load; and control the mirror and the image sensor, according to the scanning pattern, to tilt the mirror about one or more of the two axes and acquire a plurality of images of a first side of the load via the mirror.

In some embodiments, a control device can be configured to determine a scanning pattern based on a predetermined dimension of the load.

In some embodiments, a control device can be configured to determine, using a distance sensor, a height of the load, and determine a scanning pattern based also on the determined height of the load.

In some embodiments, an imaging device can include an aimer that can project an aiming pattern via the mirror. The work vehicle can include a user interface. A control device can be configured to control the mirror to move the aiming pattern, receive, from the user interface, a user input that indicates that the aiming pattern is at a desired location, and determine a scanning pattern, based on the user input.

Some embodiments of the technology provide a computer-implemented method for scanning a side of an object to identify a region of interest. The method can include determining, using one or more computing devices, a distance between a side of an object and an imaging device, determining, using the one or more computing devices, a scanning pattern for an imaging device that includes a controllable mirror, based on the distance between the side of the object and the imaging device, moving a controllable mirror according to the scanning pattern to acquire, using the one or more computing device and the imaging device, a plurality of images of the side of the object, and identifying, using the one or more computing devices, the region of interest based on the plurality of images.

In some embodiments, moving a controllable mirror according to a scanning pattern can include moving, using one or more computing devices and an imaging device, the controllable mirror about only one axis to acquire a plurality of images, with a corresponding plurality of FOVs, that collectively cover an entire side of an object.

In some embodiments, the method can include determining, using one or more computing devices, a dimension of the side of the object, and determining, using the one or more computing devices, a scanning pattern for the imaging device based on a dimension of a side of a object.

In some embodiments, determining a dimension of a side of an object can be based on at least one of data from a distance sensor, or one or more of the plurality of images.

To the accomplishment of the foregoing and related ends, embodiments of the technology comprise the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

BRIEF DESCRIPTION OF THE SEVERAL VIEWS OF THE DRAWINGS

FIG. 2 is an isometric view of an imaging system (and method) with a controllable mirror and multiple fixed mirrors, in accordance with some embodiments of the technology;

FIGS. 4A through 4C are schematic views of still another imaging system (and method) that includes a controllable mirror, in accordance with some embodiments of the technology;

FIGS. 7A through 7C are schematic views of still a further imaging system (and method) that includes a controllable mirror, in accordance with some embodiments of the technology;

FIG. 16B is a perspective view of a mirror of the imaging system of FIG. 16A, in accordance with some embodiments of the technology.

FIG. 16C is another perspective view of another mirror of the imaging system of FIG. 16A, in accordance with some embodiments of the technology.

FIG. 28A is a schematic illustration of a top view of the object transport system of FIG. 27.

FIG. 28B is a schematic illustration of a side view of the object the transport system of FIG. 27 is configured to engage and move.

FIG. 29A is a side view of another imaging system.

Figure 1A:
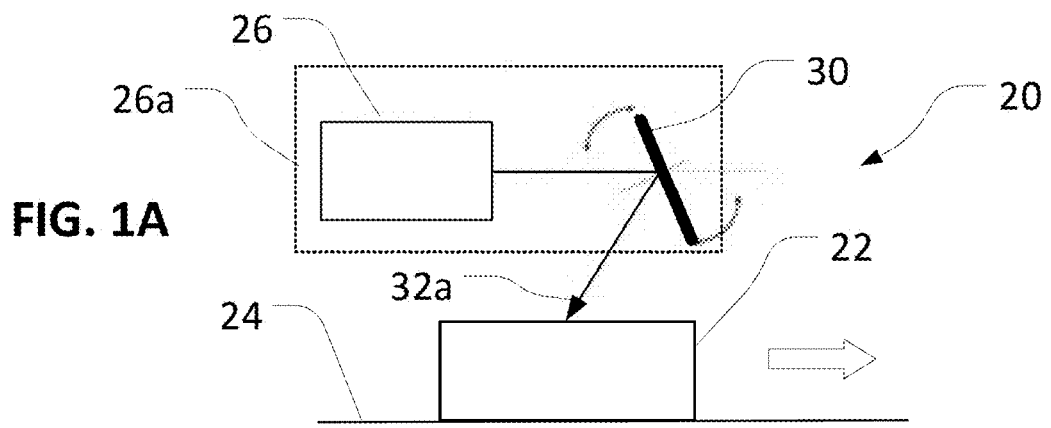
FIGS. 1A-C are schematic views of an imaging system (and method) that includes a controllable mirror, in accordance with some embodiments of the technology.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto, including illustration in the drawings of a particular order of operations for a particular method, are not intended to limit the claimed subject matter to the particular form disclosed. Rather, the intention is to cover all modifications, equivalents, and alternatives falling within the spirit and scope of the claimed subject matter.

In some embodiments, aspects of the disclosure, including computerized implementations of methods according to the disclosure, can be implemented as a system, method, apparatus, or article of manufacture using standard programming or engineering techniques to produce software, firmware, hardware, or any combination thereof to control a processor device, a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a special purpose or general purpose computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.).

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications may be made to these configurations without departing from the scope or spirit of the claimed subject matter.

Certain operations of methods according to the disclosure, or of systems executing those methods, may be represented schematically in the FIGS. or otherwise discussed herein. Unless otherwise specified or limited, representation in the FIGS. of particular operations in particular spatial order may not necessarily require those operations to be executed in a particular sequence corresponding to the particular spatial order. Correspondingly, certain operations represented in the FIGS., or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) may reside within a process or thread of execution, may be localized on one computer, may be distributed between two or more computers or other processor devices, or may be included within another component (or system, module, and so on).

Generally, as also noted above, embodiments of the disclosure can include systems and methods for acquiring images of objects using a controllable (movable) mirror. For example, some embodiments can include an imaging device that is configured to selectively acquire images along optical paths that intersect one or more mirrors that can be controlled for movement relative to two degrees of freedom (e.g., for rotation about two perpendicular axes). For example, despite the imaging device being a fixed-location imaging device, the one or more mirrors can be appropriately controlled to direct optical paths for separate images in separate directions, so that images can be acquired by the imaging device with different FOVs. In this regard, for example, some embodiments can include configurations that allow for images to be acquired with different degrees of zoom, with an object occupying different proportions of the respective FOVs, with an object being imaged at different locations (e.g., along a conveyor), with an object being imaged from different sides, or with different parts of an object being otherwise included in the different FOVs. Similarly, some embodiments can allow for acquired images of an object to be used collectively to analyze object dimension or other parameters.

In some embodiments, one or more fixed (i.e., non-controllable) mirrors can be used in some or all of the optical paths that are implemented using one or more controllable mirrors. For example, multiple fixed mirrors can be disposed at different locations relative to a scanning tunnel for a conveyor. A controllable mirror can then be used to define different optical paths for image acquisition via alignment with different permutations of one or more of the fixed mirrors. Thus, images can be obtained, using the mirrors, of different sides of an object as the object passes into, through, or out of the tunnel. In this way, for example, a single imaging device that is configured to acquire images in conjunction with a controllable mirror can replace multiple imaging devices (e.g., as used in conventional tunnel systems). Further, in other embodiments, similar principles can also be applied in non-tunnel applications, and with different potential combinations of controllable or fixed mirrors.

In different embodiments, different types of controllable mirrors can be used. For example, as generally discussed above, some embodiments can use mirrors that are configured to be tilted relative to multiple axes. In this regard, for example, a variety of known approaches can be utilized to control movement of a mirror for image acquisition. For example, some approaches are disclosed in U.S. Published Patent Application No. 2018/0203249 and U.S. Pat. Nos. 4,175,832 and 6,086,209, which are incorporated herein by reference.

Figure 1B:
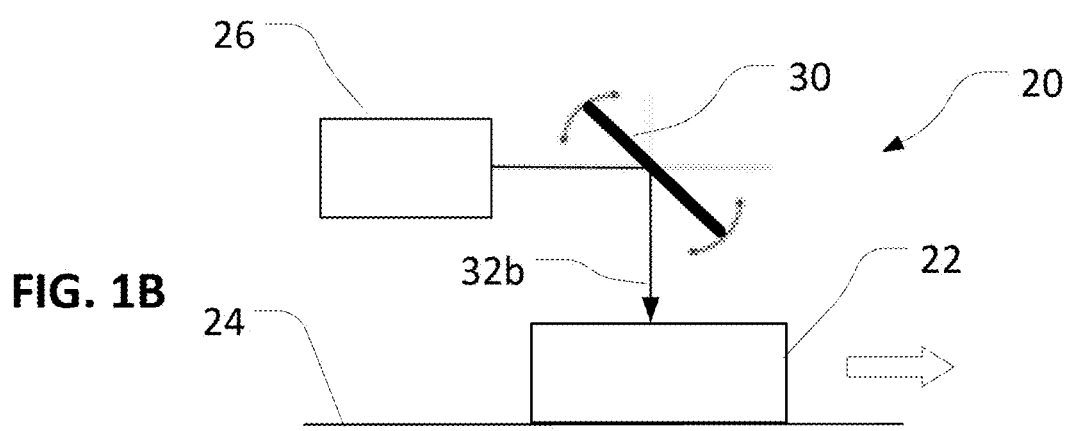
Figure 1C:
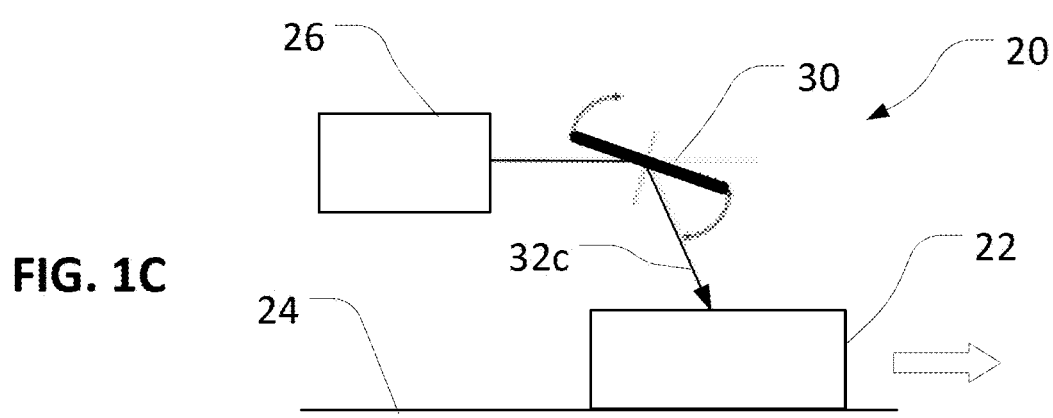

FIGS. 1A through 1C illustrate an example imaging system 20 for use to acquire images of an object 22 (and other objects) on a conveyor 24, such as a conventional conveyor belt system. In the embodiment illustrated, the conveyor 24 is configured to move the object 22 linearly (over time), and with an unchanging (local) direction of travel (i.e., from left to right, as shown). In other embodiments, other configurations are possible, including configurations with conveyors that can move objects non-linearly or in locally changing directions of travel. Correspondingly, those of skill in the art will recognize that the principles discussed herein can generally be adapted without undue experimentation to conveyors of a variety of types. Further, some embodiments of the technology can be used to implement operations relative to objects that are being moved by other means. For example, embodiments discussed relative to movement of objects along a conveyor can be readily adapted by those of skill in the art to operate with user-effected movements, such as may result during pick-and-place operations, during "presentation" mode scanning (in which a user presents an object for scanning by moving the object into a target area), and in various other contexts.

In the illustrated embodiment, the imaging system 20 includes an imaging device 26 that is secured at a fixed location relative to the conveyor 24. Generally, imaging devices as discussed herein, including the imaging device 26, include at least one imaging sensor (e.g., a CCD, CMOS, or other known sensor), at least one lens arrangement, and at least one control device (e.g., a processor device) configured to execute computational operations relative to the imaging sensor. In some embodiments, a lens arrangement can include a fixed-focus lens. In some embodiments, a lens arrangement can include an adjustable focus lens, such as a liquid lens or a known type of mechanically adjusted lens.

In some embodiments, an imaging device can be configured as an image processing device, which can be operated to process images that are acquired by an associated imaging sensor and lens arrangement. For example, an imaging device can be configured as a computing device or other arrangement of modules for decoding symbols in images that are received from an associated imaging sensor. In some embodiments, an imaging device can be configured to communicate image data (e.g., binary pixel values) to a remote processor device (e.g., within a cloud computing or local-network system) for further processing.

In addition to the imaging device 26, the imaging system 20 also includes a mirror 30. In particular, the mirror 30 is a controllable mirror that is configured to be tilted relative to at least one axis. For example, in the embodiment illustrated, the mirror 30 is controllable by a processor device to tilt (i.e., rotate) relative to an axis that extends into the page of FIG. 1A, in alignment with a pivot point of the mirror 30. In other embodiments, other types of controllable movement are possible, including multi-axis movement, as noted above and discussed further below. In some embodiments, the mirror 30 can be controlled by a processor device and associated software (or other) modules that form part of the imaging device 26. In some embodiments, the mirror 30 can be controlled by other devices (not shown), including other devices that are also configured to control operation of the imaging device 26.

In some embodiments, a control device can be configured to operate the imaging device 26 and the mirror 30 based on information relating to the conveyor 24. For example, an actual or virtual encoder (not shown) associated with the conveyor 24 can be configured to provide signals to a processor device of the imaging device 26. Based on the signals from the encoder, the processor device can then control movement of the mirror 30 and acquisition of images by the imaging device 26, including as discussed in further detail below.

As illustrated collectively in FIGS. 1A through 1C, as the object 22 is moved along the direction of travel of the conveyor 24, the imaging device 26 can acquire a series of images of the object, such as a series that includes one image for each of the positions of the object 22 along the conveyor 24 that are illustrated in FIGS. 1A through 1C. In particular, a control device (e.g., a processor device of the imaging device 26) can operate to tilt the mirror 30 between the angular orientations illustrated in FIGS. 1A through 1C, so that images can be acquired of the object 22 for the positions of each of the FIGS. 1A through 1C, with each of the images being acquired along a different optical path 32a, 32b, 32c that is defined by the respective orientations of the mirror 30.

Thus, without necessarily moving the imaging device 26 itself, multiple images can be obtained of the object 22, with each of the images exhibiting a unique FOV. Further, the mirror can be readily returned to a starting orientation (e.g., as in FIG. 1A) for acquisition of images of a subsequent object (not shown). Accordingly, multiple views of the object 22 can be obtained, with corresponding benefits for monitoring and analysis.

In some embodiments, multiple views of the object 22, as facilitated by the controllable mirror 30 can include views of multiple sides of the object 22. For example, an image acquired using a configuration similar to that illustrated in FIG. 1A may sometimes include front and top sides of the object 22, and an image acquired using a configuration similar to that illustrated in FIG. 1C may sometimes include front and back sides of the object 22. Similar approaches can also be utilized in a variety of other implementations, including for each of the other embodiments expressly discussed below, to acquire images of multiple sides of an object, including left and right sides in some cases.

In some embodiments, discrete predetermined orientations of a mirror can be used. For example, in some implementations, the mirror 30 can be tilted between two or more (e.g., three) predetermined angular orientations, so that similar images of different objects can be independently acquired with two or more predetermined FOVs. In some embodiments, mirrors can be moved adaptively, with a particular orientation of a mirror for acquisition of a particular image being determined based on a location or other characteristic (e.g., size) of an object or feature thereof, or on other factors, as appropriate.

In some embodiments, a controllable mirror can be used to track an object along a particular path of travel, so that multiple images can be easily acquired of the object at multiple different locations. For example, the imaging system 20 can be configured to process signals from an encoder and information regarding an initial position of the object 22, such as indicated via a light gate (not shown) or analysis of an initial image, and to thereby determine an expected position of the object 22 along the conveyor 24 at any given time. (Similar principles can also be applied relative to motion not drive by a conveyor.) The mirror 30 can then be controlled, as appropriate, in order to acquire multiple images of the object 22 over time, at multiple different locations along the conveyor 24 (or otherwise). In some embodiments, the mirror 30 can be adjusted in a stepped fashion, and images acquired at discrete intervals along the conveyor 24. In some embodiments, the mirror 30 can be adjusted continuously during image acquisition, such as may allow continuous acquisition of images of the object 22 over time or may mitigate motion blur.

In some embodiments, a controllable mirror can be used to adjust an FOV of a lens for movements of an object that are not caused by a mechanical conveyor. As also noted above, for example, some systems (e.g., similar to the imaging system 20) can be configured to acquire images at different locations based on movements of a human operator. For example, a system similar to the imaging system 20 can be configured to move a controllable mirror in order to capture one or more initial images of an object as an operator carries the object towards a scanning area, then adjust a controllable mirror to acquire subsequent images of the object within the scanning area. In some embodiments, such a system may determine an expected motion of the object based on predetermined operator tasks or bounded imaging areas, prior operator movements, or analysis of initial images of the object or the operator, and then adjust a controllable mirror accordingly for subsequent image acquisition.

In some embodiments, a control device can be configured to adjust a focus of a lens arrangement depending on an orientation of an associated mirror. For example, the processor device of the imaging device 26 can be configured to automatically adjust a focus of the lens arrangement of the imaging device 26 depending on the orientation of the mirror 30 so that an object can be captured with a focused image for multiple FOVs. In this regard, for example, the imaging device 26 may be configured to automatically adjust focus for image acquisition for each of the orientations of the mirror 30 that are shown in FIGS. 1A through 1C (or other orientations). Such adjustments to lens arrangements can generally be made in a variety of known ways, including by electronic control of a liquid lens (not shown), electronic or other control of a mechanically focused lens arrangement (not shown), or otherwise.

In some embodiments, an appropriate focal plane can be predetermined using pre-runtime calibration (e.g., as discussed below). In some embodiments, an appropriate focal plane can be determined more adaptively (e.g., in real time), including as based on information from other sensors (e.g., 3D sensors) or, as also discussed below, from other image acquisition using controllable mirrors.

In some embodiments, focus adjustments can be synchronized with controlled movements of a mirror, so that a relevant lens arrangement is automatically moved into appropriate focus for acquisition of images via the mirror with the mirror at any given orientation. In some embodiments, focus adjustments can be made simultaneously with controlled movements of a mirror, to provide efficient and rapid transitions between FOVs. However, the speed of focus adjustments for some known types of lenses (e.g., liquid lenses) may be an order of magnitude (or more) faster than the speed of adjustments to the orientation of a mirror. Accordingly, some implementations may adjust lens focus before or after adjusting mirror orientation without substantial loss in performance or detriment to user satisfaction.

Further, in some embodiments, the relative speed of focus and mirror adjustments may be orders of magnitude faster than movement of a relevant conveyor. Accordingly, for some implementations, the relatively slow movement of an object along a conveyor (or otherwise) may be a more significant time-limiting factor than the speed of lens or mirror adjustments. In this regard, as also discussed below, lens and focus adjustments may sometimes be made quickly enough, relative to object movement, so that an object can be successively imaged with different lens and mirror configurations while the object is effectively stationary relative to the relevant imaging device.

In the example illustrated in FIGS. 1A through 1C, the mirror 30 is disposed externally to and remotely from the imaging device 26. In other embodiments, other configurations are possible. For example, some configurations can include a controllable mirror that is mounted within a housing of an imaging device, such as is illustrated for the mirror 30 and an example imaging device 26*a* (see FIG. 1A).

As another example, some configurations can include a controllable mirror that is mounted to an imaging device, but is disposed externally to a housing of the imaging device. For example, as illustrated in FIG. 2, another example imaging device 40 includes a housing 42 that encloses a lens arrangement (not shown), an imaging sensor (not shown), and a processor device of any of a variety of known (or other) configurations. In addition, the housing 42 supports a mounting structure 44 that supports a two-axis tiltable mirror 46 and a plurality of fixed mirrors 48.

In addition to other operations, the processor device of the imaging device 40 can be configured to control tilting of the mirror 46 so that optical axes for acquisition of images by the imaging device 40 can be directed in a variety of directions, via the controllable mirror 46 and a respective one of the fixed mirrors 48. In some embodiments, a different number or orientation of fixed mirrors can be provided, with corresponding effects on possible FOVs. However, the illustrated arrangement of four of the mirrors 48 may provide a useful balance between complexity and range, allowing the imaging device 40 to selectively acquire images using multiple FOVs that collectively cover a relatively large total area in all four lateral directions from the imaging device 40. In some embodiments, as also discussed below, fixed mirrors may additionally or alternatively be positioned remotely from an imaging device, to be selectively used in combination with a controllable mirror and, as appropriate, with other fixed mirrors that are attached to the relevant imaging device.

In the illustrated embodiment, the imaging device 40 is configured as a top-mounted, downward-looking imaging device, such as may be suitable, for example, to acquire images of objects moving along a conveyor, through a tunnel, or in various other contexts. In other embodiments, other configurations are possible. For example, imaging devices with similar mirror arrangements as the imaging device 40 (or other mirror arrangements) can be used as sideways or upward-looking mirrors, and imaging devices with different mirror arrangements than the imaging device 40 can be used as downward-looking imaging devices.

Figure 3:
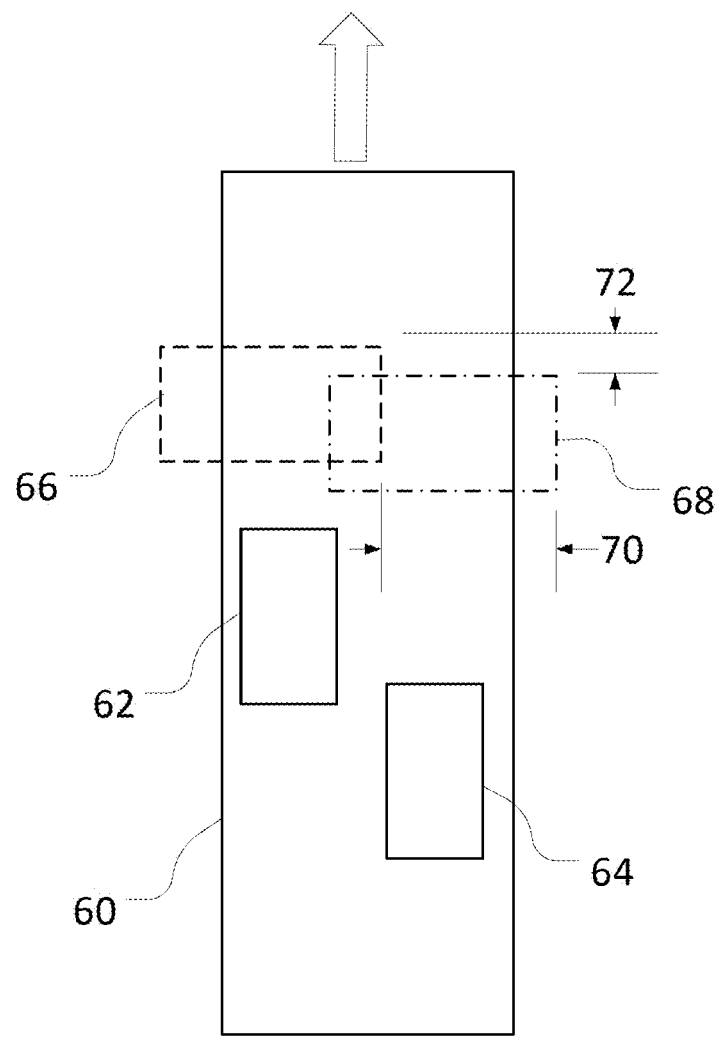
FIG. 3 is a schematic view of aspects of another imaging system (and method) that includes a controllable mirror, in accordance with some embodiments of the technology.

In some embodiments, a controllable mirror can be used to move an FOV for an imaging device in multiple directions relative to a target area, including relative to a conveyor or a relatively large object. For example, FIG. 3 shows a top schematic view of a conveyor 60 that is moving multiple objects 62, 64 in a direction of travel (e.g., bottom to top, as shown). In some implementations, the mirror 30 of the imaging system 20 (see FIG. 1A) or controllable mirrors of other imaging systems can be tilted relative to at least two axes in order to acquire images with separate FOVs that are displaced relative to each other in multiple directions. For example, as illustrated in FIG. 3, the mirror 30 (see FIG. 1A) can be controlled so that a first image is acquired with a first FOV 66 and a second image is acquired with a second FOV 68 that is not aligned with the first FOV 66. In particular, in the example illustrated, the FOV 68 is shifted relative to the FOV 66 by a first distance 70 along the direction of travel and a second distance 72 transverse to the direction of travel, so that the geometric center and edges of the FOV 66 are not aligned (or coincident), respectively, with the geometric center and edges of the FOV 68. Thus, for example, appropriate images can be acquired, using the single imaging device 26 (see FIG. 1A) of both of the objects 62, 64, without necessarily requiring a wide-angle lens or a conventional FOV-expander. In other implementations, however, a controllable mirror can be moved to shift FOVs between separate images in a variety of other ways relative to each other (e.g., along only a single direction), including so that some edges or other areas of two different FOVs may be aligned or coincident with each other.

In some embodiments, a controllable mirror can be moved to allow an imaging device with an FOV that is narrower than a target area to acquire images of an entire width (or other dimension) of a target area without necessarily requiring the imaging device or a lens thereof to be moved and without necessarily requiring the use of a conventional FOV-expander or other similar conventional arrangements. For example, as illustrated in FIG. 3, the FOVs 66, 68 collectively cover more than the full width of the conveyor 60, so that any object moving along the conveyor 60 can be readily imaged.

In some embodiments, an imaging system (e.g., the imaging system 20) can be configured so that a controllable mirror allows acquisition of images that cover at least a substantially full width of a conveyor or other target area, i.e., a width that includes all or nearly all (e.g., 95% or more) of a width of the conveyor or other target area. Accordingly, for example, it may be possible for any object of expected dimensions carried by the conveyor or disposed in the target area to be fully included in an image, at least along a dimension of the object corresponding to a direction of the width of the conveyor or other target area. Accordingly, as also noted above, embodiments of the disclosed technology can be used to replace conventional FOV-expanders, or to selectively acquire images of objects at different lateral (i.e., width-wise) locations on a conveyor.

In some embodiments, use of a controllable mirror to change an FOV for image acquisition can effectively result in changes in a degree of zoom between different images, without necessarily requiring the use of a zoom lens or other similar optical arrangement. For example, as illustrated in FIG. 4A, an imaging system 78 can include an imaging device 80 with a movable mirror (not shown) that is installed in conjunction with another (e.g., fixed) mirror 82 to acquire images of objects 84, 86 that are carried by a conveyor 88. In some implementations, the imaging device 80 can control the movable mirror so that a first image of the object 84 is acquired with a first FOV 90 (see FIG. 4B), at a first location 92 along the conveyor 88, via the movable mirror and the mirror 82. Further, the movable mirror can also be controlled to acquire a later image of the object 84 with a second FOV 94 (see FIG. 4C), at a second location 96 along the conveyor 88.

In the illustrated example, as shown in FIG. 4A, an optical path 98 for the first image, as acquired via the mirror 82, is longer than an optical path 100 for the second image, as acquired without the mirror 82 (e.g., but still using the controllable mirror). Accordingly, as shown in FIGS. 4B and 4C, the FOV 94 is smaller than the FOV 90 and the object 84 is represented in a larger proportion of the FOV 94 than of the FOV 90. This may be useful, for example, so that a symbol 102 on the object 84 occupies a relatively large proportion of the FOV 94, which may sometimes support more effective identification or decoding of the symbol 102 or other image-analysis operations.

In some embodiments, a method or system similar to that illustrated in FIGS. 4A through 4C, or as otherwise disclosed herein, can be used to identify a region of interest in a first image and adjust an FOV for a second image to zoom in on the region of interest in a second image. For example, due to the size of the FOV 90, the first image of the object 84 can be acquired to cover a substantially full width of the conveyor 88 at the first location 92 along the conveyor 88. Accordingly, the first image can be expected to represent an entire width of the object 84, and any features on the object 84 across the imaged width, while the object 84 is disposed on the conveyor at the first location 92. Thus, an image acquired with the FOV 90 can be used to identify a location of the symbol 102, or another region of interest on the object 84, anywhere across the width of the conveyor 88 at the first location 92. For example, using any of a variety of known symbol-identification algorithms, the imaging device 80 can identify a location of the symbol 102, as represented in the first image, at a particular location across the width of the conveyor 88 at a particular time.

Continuing, once the location of the symbol 102 has been determined, the controllable mirror of the imaging device can be selectively tilted for a later image acquisition so that the smaller FOV 94 is aligned with (e.g., centered on) the expected location of the symbol 102 at the time of the later image acquisition (e.g., as determined using an encoder). Further, due to the shorter length of the optical path 100, the symbol 102 can occupy a relatively large proportion of an image acquired with the FOV 94, so that decoding (or other analysis) of the symbol 102 may proceed more efficiently or with a higher rate of success or reliability.

In some implementations, a focus of a lens arrangement of an imaging device may need to be adjusted in order to allow successive images of appropriate quality to be acquired despite changes in a length of respective optical axes and changes in size of respective FOVs. In this regard, for example, as also discussed above, a lens arrangement of the imaging device 80 can be adjusted before, simultaneously with, or after adjustment of the controllable mirror. In some embodiments, for example, a liquid lens can be brought to a predetermined focus as or after the controllable mirror is moved, based on a prior focus calibration or a prior determination of a height (or other dimension) of an object to be imaged. In some embodiments, an autofocus operation can be executed after movement of the controllable mirror, in order to focus the imaging device 80 appropriately.

In the example illustrated in FIGS. 4A through 4C, the FOVs 90, 94 do not overlap with each other. In some embodiments, however, first and second images can be acquired with FOVs that do overlap. For example, in a different arrangement, the imaging device 80 can be configured to acquire an image of the object 84, via an optical path 104 (see FIG. 4A) that is defined by the controllable mirror and excludes the fixed mirror 82. Accordingly, the object 84 can be imaged with a greater degree of zoom and a smaller FOV than images acquired with the FOV 90, but with the object 84 at or near the location 92 corresponding to the FOV 90.

Figure 5A:
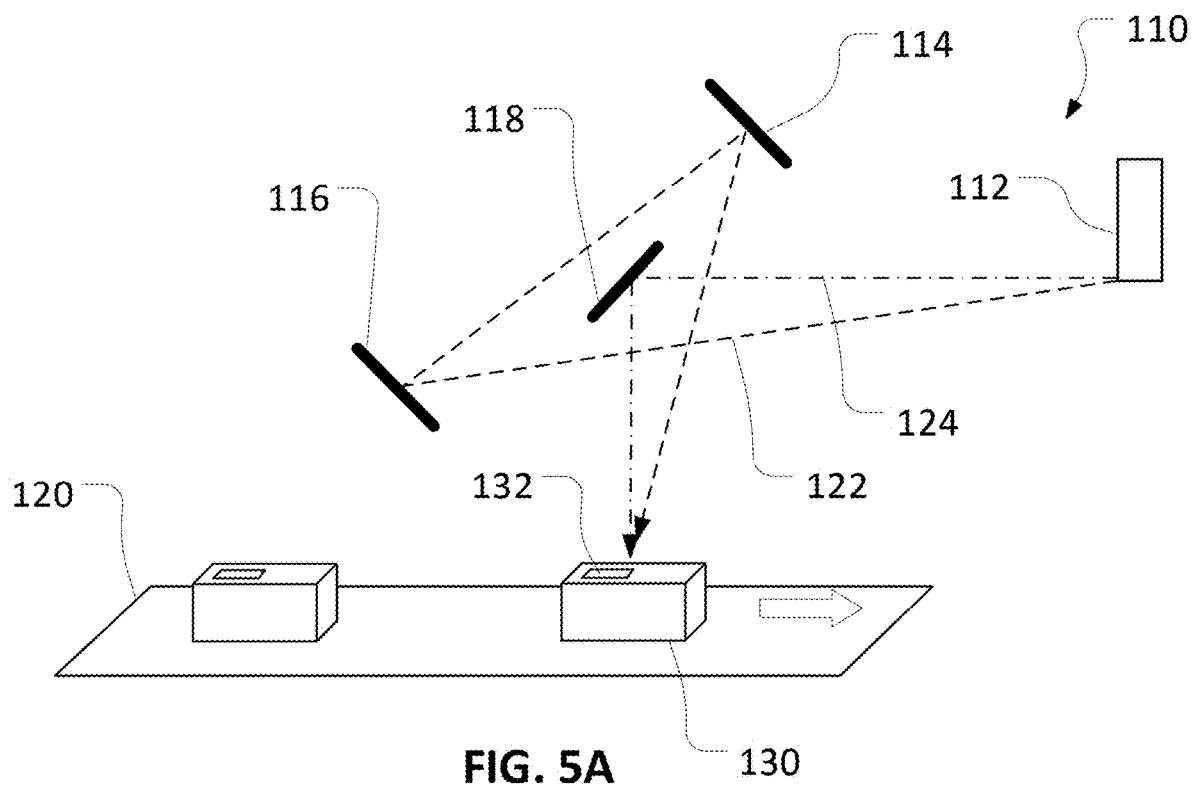
FIGS. 5A and 5B are schematic views of yet another imaging system (and method) that includes a controllable mirror, in accordance with some embodiments of the technology.

As another example, some embodiments may allow for acquisition of overlapping images with a different (e.g., reduced) angle of incidence of a second optical path than is illustrated for the optical path 104. In some embodiments, overlapping FOVs with similar angles of incidence for the respective optical paths can be acquired using multiple fixed (or other) mirrors in addition to a controllable mirror. For example, as illustrated in FIG. 5A, an imaging system 110 includes an imaging device 112 with a controllable mirror (not shown) and a set of remotely installed fixed mirrors 114, 116, 118. The mirrors 114, 116, 118 and the imaging device 112 are arranged relative to a conveyor 120 so that a first optical path 122 defined by the movable mirror and the fixed mirrors 114, 116 (but not the fixed mirror 118) is longer than a second optical path 124 defined by the movable mirror and the fixed mirror 118 (but not the fixed mirrors 114, 116).

Figure 5B:
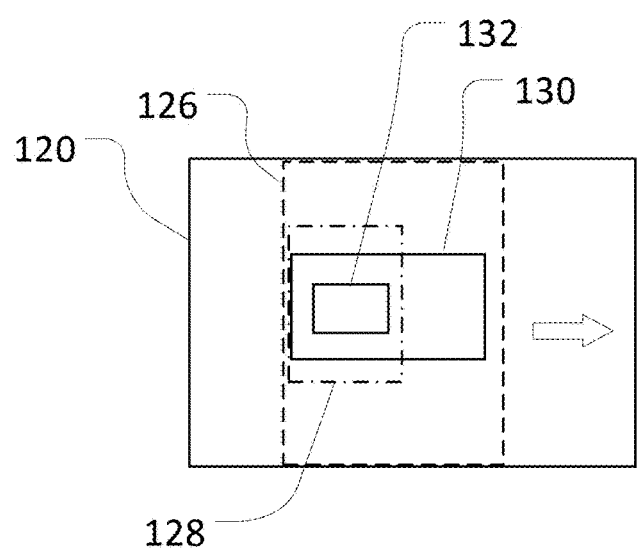

Accordingly, as illustrated in FIG. 5B, an image acquired along the first optical path 122 can exhibit an FOV 126 that is larger than an FOV 128 of an image acquired along the second optical path 124, and an object 130 and an associated symbol 132 can occupy a larger proportion of the FOV 128 than of the FOV 126. Thus, as similarly described above, the object 130 and the symbol 132 can be initially imaged via the FOV 126, then re-imaged via the FOV 128 in order to increase a degree of zoom relative to the symbol 132.

Further, with sufficiently fast adjustment of the movable mirror of the imaging device 112 and of the focus of the lens arrangement, an image of the object 130 can be obtained via both of the FOVs 126, 128 with the FOVs 126, 128 substantially coinciding with each other on the conveyor 120. In other words, substantially overlapping images can be acquired via both of the FOVs 126, 128 with the object 130 at substantially the same location on the conveyor 120. In some embodiments, this substantial overlap can be readily obtained due to the potential adjustment time for a controllable mirror and focus (e.g., using a liquid lens) being of an order of magnitude (or more) smaller than an amount of time for an object to move substantially along a conveyor. As used herein, two images are considered to substantially overlap if the FOV of one of the images is entirely contained by or coincident with the FOV of the other image, or if at least 90% (e.g., 95% or 99%) of the FOV of one of the images overlaps with the FOV of the other image. Similarly, an object is considered to be at substantially the same location at two different times for imaging if the object has not changed locations between two images or has only moved so that a later position of the object varies from an earlier position of the object by less than 10% (e.g., 5% or 1%) of a length of the object along the direction of movement.

As also noted above, it may sometimes be useful to determine a dimension of an object. For example, it may be useful in logistical operations to know one or more dimensions of a particular object that is traveling along a conveyor. Or it may be helpful for focusing operations for image acquisition to know a distance from an object to an imaging device, such as may be determined, for example, based on a known (or measured) distance from the imaging device to a conveyor and a determined height of the object relative to the conveyor.

Figure 6:
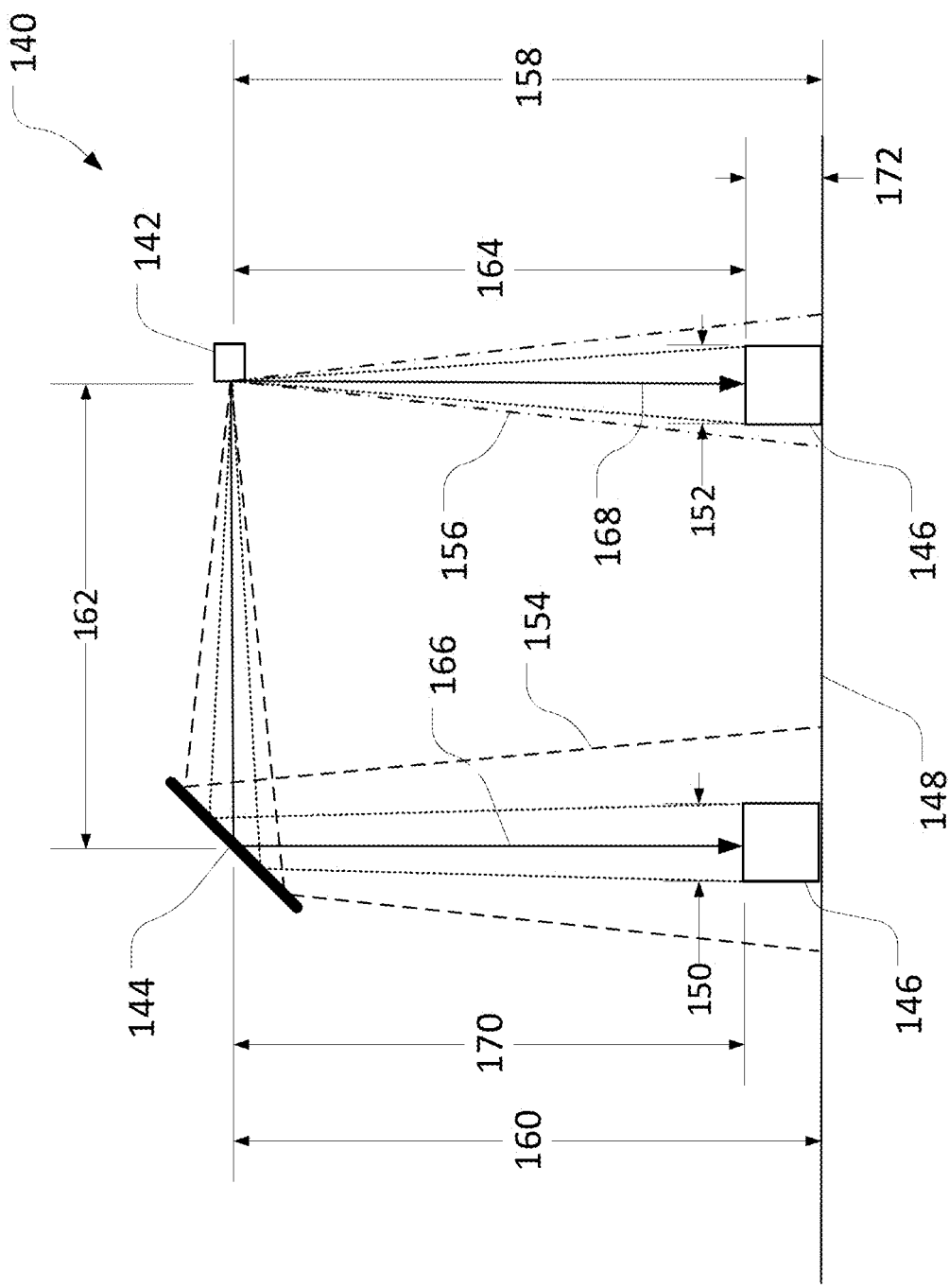
FIG. 6 is a schematic view of a further imaging system (and method) that includes a controllable mirror, in accordance with some embodiments of the technology.

In some embodiments, an imaging system with a controllable mirror can be operated in order to determine a dimension of an object, without necessarily requiring the use of a separate dimensioner (e.g., a time-of-flight or triangulation device). For example, FIG. 6 illustrates an imaging system 140 that includes an imaging device 142 with a controllable mirror (not shown) and a remotely installed fixed mirror 144 (e.g., similar to the imaging device 80 and mirror 82 illustrated in FIG. 4A). Similarly to the imaging system 78, the imaging system 140 can be controlled to acquire a different image of an object 146 as the object 146 moves along a conveyor 148 (e.g., at substantially different locations along the conveyor 148, as shown).

In addition, a processor device of the imaging system 140 is configured to analyze the acquired images in order to identify, in acquired images, pixel dimensions of a common feature of the object 146 (e.g., a top surface of the object 146). For example, using known edge location techniques the imaging system 140 can identify leading and trailing edges of a top surface the object 146, and a respective pixel distance 150, 152 therebetween, both for an image that is acquired via a larger FOV 154 defined by the mirror 144 and for an image that is acquired via a smaller FOV 156 not defined by the mirror 144.

Accordingly, for example, known trigonometric principles (e.g., triangular equivalences) can then be applied to determine a distance 164, 170 from the imaging device 142 or the mirror 144 to the object 146 and, correspondingly, a distance 172 that the object 146 extends away from the conveyor 148 (e.g., an object height). For example, any one of the distances 164, 170, 172 can be determined based on the determined pixel distances 150, 152, and appropriate consideration of one or more of a known (or determined) distance 158 from the imaging device 142 to the conveyor 148, a known (or determined) distance 160 from the mirror 144 to the conveyor 148, a known (or determined) distance 162 from the imaging device 142 to the mirror 144, and known (or determined) relative angles of optical paths for the FOVs 154, 156. As a specific example, with optical paths 166, 168 for the FOVs 154, 156 traveling in parallel with and at right angles to the conveyor 148 and with the imaging device 142 and the mirror 144 at equal distances 158, 160 above the conveyor 148 (and thereby equal the distances 164, 170 from the object during respective image acquisitions), the distance 172 (e.g., the height of the object 146, as shown) can be calculated by solving, for $h_0$, $$L_1/(h_i-h_0)=L_2/(h_i+d-h_0) \quad (1)$$

where $L_1$ and $L_2$ indicate spatial equivalents to the pixel distances 150, 152 (e.g., as determined based on known calibration techniques), $h_i$ indicates the distance 158 (or 160) of the imaging device 142 (or the mirror 144) from the conveyor, and d indicates the distance 162 from the imaging device to the mirror 144.

It will be recognized that other approaches can also effectively provide similarly useful information. For example, rather than (or in addition to) solving directly for the height of an object, the imaging system 140 can use a similar approach to determine the distance 164 from the imaging device 142 to the object 146 (e.g., the distance from the imaging device 142 of a focal plane for imaging the object 146), such as by solving, for f, $$L_1/f=L_2/(f+d) \quad (2)$$

Where $L_1$, $L_2$, and d are defined as above. This solution in particular assumes, for example, that equal values for the distances 158, 160 between the conveyor 148 and the imaging device 142 and between the conveyor 148 and the mirror 144. In other approaches, however, this equality (or other assumptions above) may not hold, and corresponding adjustments, based on known trigonometric principles, can be made.

Indeed generally, although the examples above assume particular geometric arrangements of the imaging device 142, the mirror 144, and the optical paths 166, 168, similar trigonometric principles can be readily used to determine a distance from an imaging device to an object, a height or other dimension of an object, or other relevant dimensions, including for other arrangements illustrated in the various FIGS. For example, similar trigonometric calculations can be implemented to determine appropriate distances for the arrangement illustrated in FIG. 5A, with known distances and relative angular orientations between the imaging device 112, the mirrors 114, 116, 118, and the conveyor 120 allowing for ready determination, based on images acquired with both of the FOVs 126, 128, known types of pixel analysis, and known trigonometric principles, of a height of the object 130 relative to the conveyor, a length of the optical path 122, or other related dimensions.

In some embodiments, determining a distance can be useful for other reasons, including for determining real-world (i.e., actual, physical) dimensions of an FOV (or portion thereof) for a particular image. For example, the size of the real-world area included in an FOV at a particular focus plane can be determined using known trigonometric relationships based on a determined distance between an imaging device and a target (e.g., the distance of the optical path 168), along with characteristics of the relevant imaging device and other optical devices (e.g., lens or mirror assemblies). Similar principles can also be applied to determine the scale of an object within an FOV.

Figure 7A:
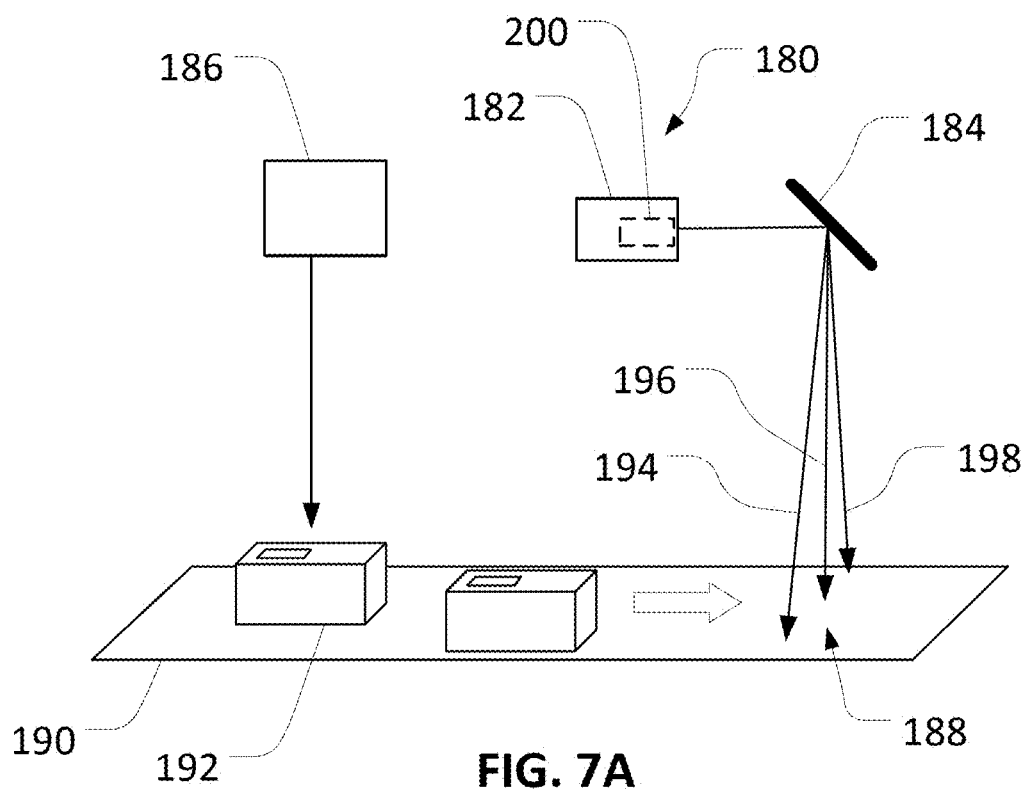
Figure 7B:
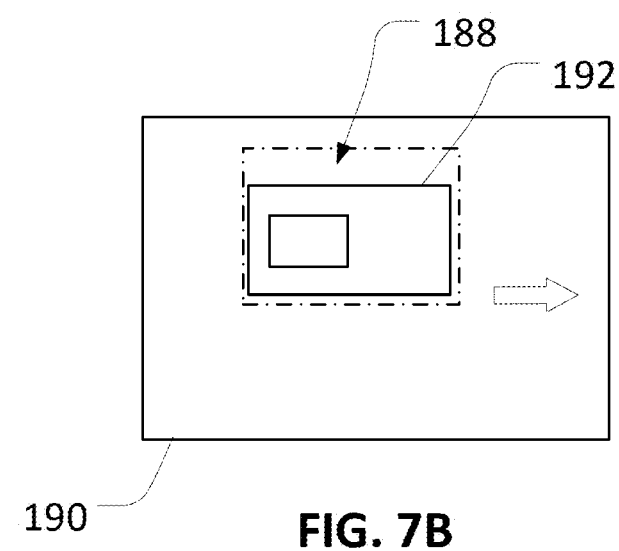

In some embodiments, the principles disclosed herein (e.g., as detailed above) can be implemented in combination with additional sensors. For example, as illustrated in FIG. 7A, an imaging system 180 can include an imaging device 182 with a controllable mirror 184, and a sensor 186 located rearward of an imaging location 188 for the imaging device 182, relative to a direction of travel of a conveyor 190. In some embodiments, the sensor 186 can be a presence sensor such as a photo eye, array of photo eyes, laser curtain, and so on. Based on detection of objects by the sensor 186 and on a known rates of movement of objects on the conveyor 190 (e.g., as determined via an encoder (not shown)), the mirror 184 can be controlled to direct an FOV for a particular image of an object 192 to a portion of the imaging location 188 in which the object 192 can be imaged (see FIG. 7B). For example, the mirror 184 can be controlled to selectively redirect optical paths 194, 196, 198 for acquisition of images at different laterally directed angles relative to the conveyor 190. Thus, for example, the disclosed control of the mirror 184 and imaging device 182 can allow acquisition of images of objects, with a relatively high degree of zoom, regardless of the lateral location of the objects on the conveyor 190 and without requiring an FOV for the imaging device 182 that covers a full width of the conveyor 190 for a given image.

In other embodiments, other configurations are possible. For example, the sensor 186 can be configured as a 3D sensor, such as a time-of-flight or triangulation sensor, that can determine a height of an object relative to the conveyor 190. This information, in combination with information regarding where on the conveyor 190 an object is located (e.g., as also determined by the sensor 186), can then be used to determine an appropriate focus for imaging of a particular surface of the object as well as, for example, an appropriate optical path and FOV.

In this regard, and relative to other embodiments disclosed herein, reference to determination of object "height" is generally provided as an example only, as is reference to operations relating to a "top" surface of a particular object. Those of skill in the art will recognize, based on the disclosure herein, that similar principles can be used, for example, to determine other relevant dimensions of objects and to acquire images of surfaces of objects other than top surfaces. Correspondingly, for example, in some configurations a sensor (e.g., the sensor 186) can be used to determine a distance of a relevant optical (e.g., imaging) axis, and focus for image acquisition can then be determined accordingly (e.g., as also based on known characteristics of a lens assembly, imaging sensor, and so on).

In some embodiments, a distance sensor or other component can be provided that also utilizes a controllable mirror to direct outgoing or incoming optical signals. In some embodiments, such signals can be directed with a controllable mirror that is also used for image acquisition, although dedicated mirrors are also possible. For example, referring again to FIG. 7A, an optical device 200 can be configured to direct (or receive) an optical signal via the mirror 184, which also controls the orientation of an FOV for the imaging device 182, in order to project a signal onto (or receive a signal from) a target area. In some embodiments, the device 200 can be configured as an aimer that projects an aiming pattern via the mirror 184, so that operators can visually identify a center, outside boundaries, or other aspect of an FOV of the imaging device 182.

In some embodiments, the device 200 can be configured as a distance sensor. For example, the device 200 can be configured as a time-of-flight sensor that directs a pulse onto an object via the mirror 184 and then receives a reflection of the pulse also via the mirror 184, in order to determine a distance of an current optical path for imaging as provided by the mirror 184. Or various other distance sensors can be used.

In some embodiments, the optical device 200 can be configured to provide or receive on-axis signals relative to the imaging axis of the imaging device 182. For example, as illustrated in FIG. 7C, the optical device 200 can include a signal generator (or receiver) 202 that is out of alignment with an optical (e.g., imaging) axis 206 for the imaging device 182 (e.g., perpendicular thereto). Further, a dichroic mirror 204, or other similar arrangement to permit light for imaging to pass while appropriately redirecting light from (or for) the signal generator (or receiver) 202, can be disposed in alignment with (i.e., along) the optical axis 206. Accordingly, the dichroic mirror 204 can redirect signals from the signal generator (receiver) 202, via the mirror 184, to a target (not shown), and can also redirect signals from the target, via the mirror 184, to the signal generator (or receiver) 202.

Similar principles can also be implemented in other embodiments. For example, other embodiments expressly discussed and illustrated herein can be similarly equipped with on-axis or other aiming or measurement devices. In some embodiments, similar principles can also be applied even without inclusion of an imaging device. For example, an imaging device such as the imaging device 182 of FIG. 7A or the imaging device 26 of FIG. 1A (and so on) can be replaced with a projector or other similar device that is configured to direct signals onto an associated controllable mirror (e.g., the mirror 184 or the mirror 30) and thereby controllably project a signal onto a target. Such an arrangement may be useful, for example, in order to provide targets to guide picking, placement, calibration, or other operations by human operators, or to otherwise improve visibility or operability for aspects of certain objects or environments.

Figure 8A:
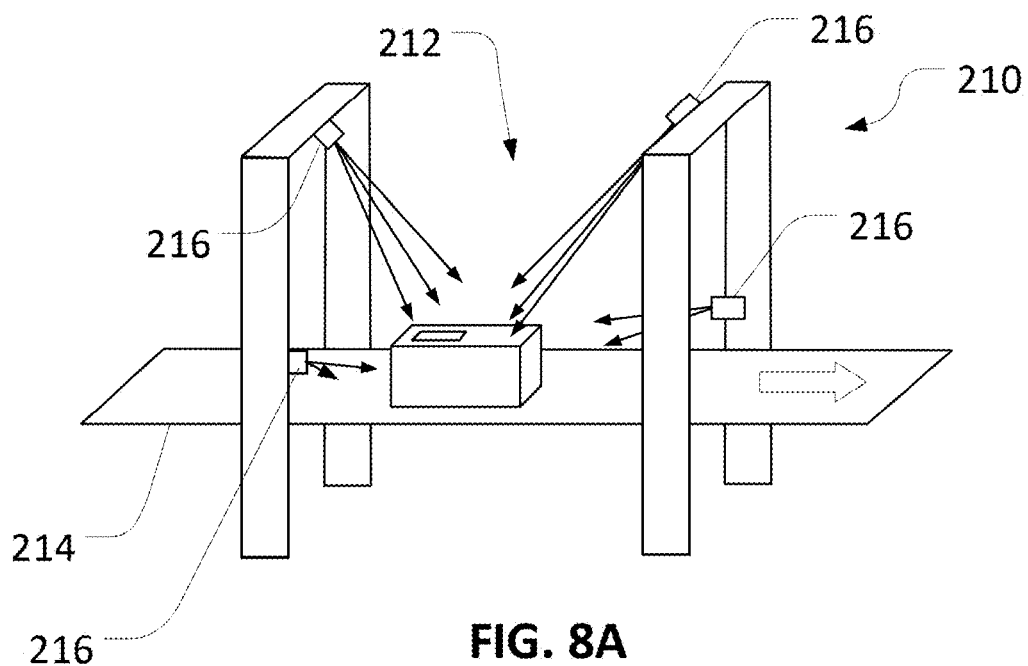
FIGS. 8A and 8B are schematic views of an imaging system (and method) that includes a controllable mirror and is configured as (or for use with) a tunnel for a conveyor, in accordance with some embodiments of the technology.

Correspondingly, in some embodiments, a controllable mirror can be used to acquire images of multiple sides of an object, including for tunnel applications in which images are to be acquired of five or more sides of an object as the object passes through a particular area (e.g., along a particular length of a conveyor). For example, in the imaging system 210 illustrated in FIGS. 8A and 8B, a tunnel 212 along a conveyor 214 can include a plurality of imaging devices 216, at least some (e.g., each) of which include a controllable mirror (not shown). Accordingly, via appropriate control of the mirrors, the imaging devices 216 can be used to acquire images over a full span of desired FOVs, in lieu of image acquisition with a much larger number of conventional imaging devices. For example, in the example illustrated in FIG. 8A, four of the imaging devices 216 can be used to replace fourteen (or more) imaging devices in conventional arrangements for imaging of all five exposed sides of an object passing through the tunnel 212.

Figure 8B:
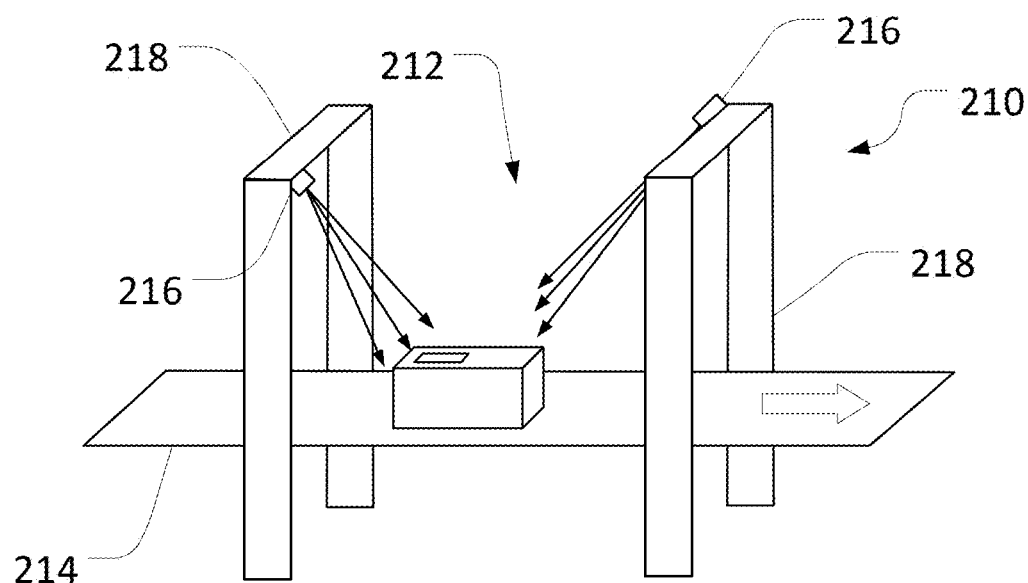

In other embodiments, however, a different number of imaging devices for use with controllable mirrors can be used, or can be in place of a different number of conventional imaging devices. For example, as illustrated in FIG. 8B, some arrangements may include only two of the imaging devices 216, arranged so that controllable mirrors for the imaging devices 216 can be manipulated in order to capture images of all exposed sides of an object as the object moves through the tunnel 212. In the example of FIG. 8B, the imaging devices 216 are supported at the top of support structures 218 of the tunnel 212 on opposing lateral and front-to-back sides of the tunnel 212, although other configurations are possible. For example, other arrangements of the imaging devices 216 with the imaging devices still located above a maximum expected height of objects passing through the tunnel 212 may also allow all five exposed sides of 3D rectangular objects—including the tops of the objects—to be imaged.

Figure 9A:
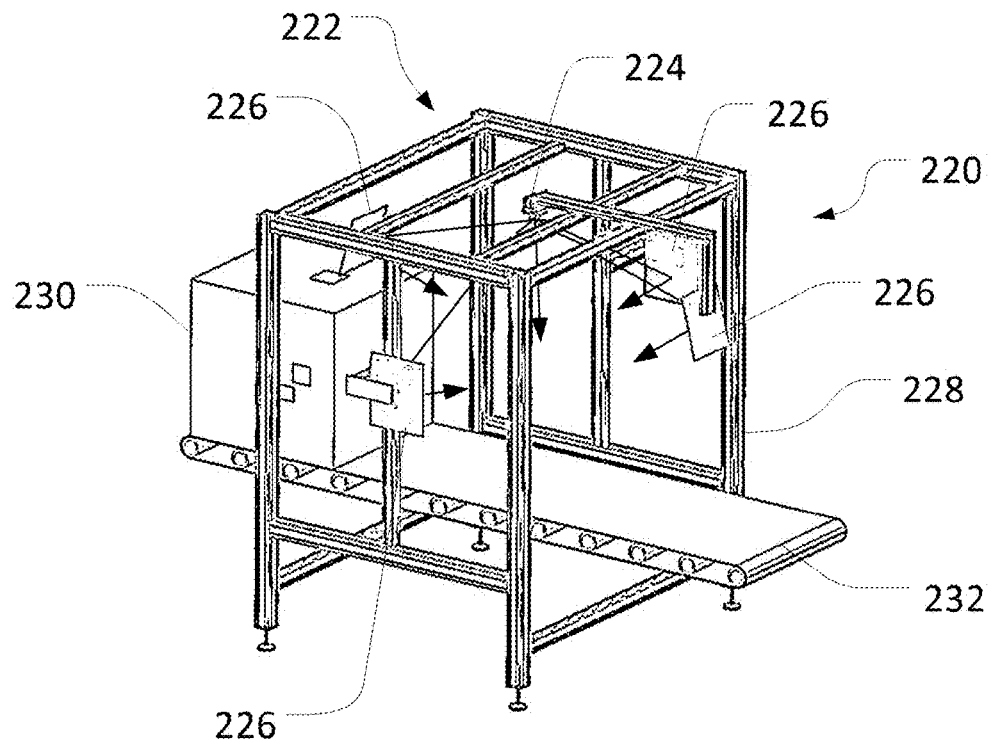
FIG. 9A is a schematic view of another imaging system (and method) that includes a controllable mirror and is configured as (or for use with) a tunnel for a conveyor, in accordance with some embodiments of the technology.

In some embodiments, a combination of controllable and fixed mirrors can be used to acquire images of multiple sides of an object, including in tunnel applications. For example, as illustrated in FIG. 9A, an imaging system 220 for a tunnel 222 can include a single imaging device 224 with a controllable mirror, such as an imaging device configured similarly to the imaging device 40 of FIG. 2. Further, the tunnel 222 can include a plurality of fixed mirrors 226 supported on different sides of a support structure 228 for the tunnel 222. With this arrangement and other similar arrangements (e.g., with different numbers or configurations of imaging devices or fixed mirrors), the controllable mirror can be moved to allow successive acquisition of images, via different reflections off of the fixed mirrors 226, of all five visible sides of an object 230 as a conveyor 232 moves the object 230 through the tunnel 222. For example, as the object 230 moves through the tunnel 222, images can be successively acquired, using different instances of the mirrors 226, of a front, top, left, right, and back side of the object 230.

Figure 9B:
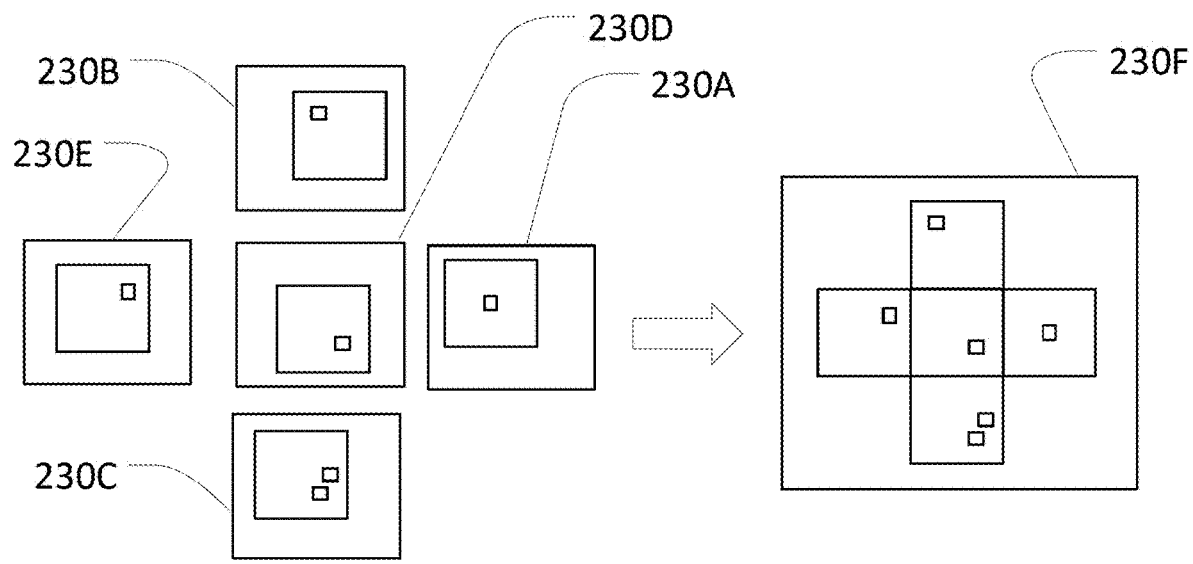
FIG. 9B is a schematic view of a stitching operation for images acquired using the imaging system of FIG. 9A.

In some embodiments, multiple images acquired using a controllable mirror can be stitched together to provide a composite representation of a particular object or environment. As illustrated in FIG. 9B, for example, the imaging system 220 can be configured to acquire images 230A through 230E of the front, right, left, top, and back sides of the object 230 as the object 230 moves through the tunnel 222. Using known image processing techniques the images 230A through 230E can then be stitched together in order to provide a composite image 230F that represents all five exposed sides of the object 230. For example, known edge-finding techniques can be used to identify the edges of each of the sides of the object 230 in the images 230A through 230E, and thereby to identify relevant boundaries of the object 230 in the images 230A through 230E. These identified boundaries can then be used to construct the composite image 230F, such as by aligning identified common boundaries from different images, with appropriate perspective and scaling adjustments, as needed.

In the illustrated example, for simplicity of presentation, only one side of the object 230 is represented in each of the images 230A through 230E. In some implementations, each of the images 230A through 230E may also include a representation of part or all of one or more other sides of the object 230. In some implementations, these additional sides can be ignored. In some implementations, they can be used in order to assist in constructing a composite image, such as by identifying common or overlapping features between the various images 230A through 230E and using those features to assist in determining relative alignment, necessary scale or perspective adjustments, or other parameters to effectively stitch the images together.

In some embodiments, known orientations of controllable mirrors as well as other known parameters (e.g., parameters of lens assemblies, encoder information to identify current object positions, etc.) can be used in order to automatically determine necessary perspective and scaling adjustments for composite images. For example, using known trigonometric principles, a relative scale and perspective of different images acquired via the mirrors 226 can be determined, and then images acquired via one or more of the mirrors 226 can be adjusted accordingly so that the images can be more readily combined.

Also as illustrated in FIG. 9B, the image 230F is a two-dimensional (2D) image that provides a "flattened" representation of the sides of the object 230. In other embodiments, different 2D representations can be used, such as different flattened representations. In some embodiments, a composite image can be a 3D image or model, with a 3D representation of a particular object, as constructed from multiple images acquired using a controllable mirror.

Figure 10:
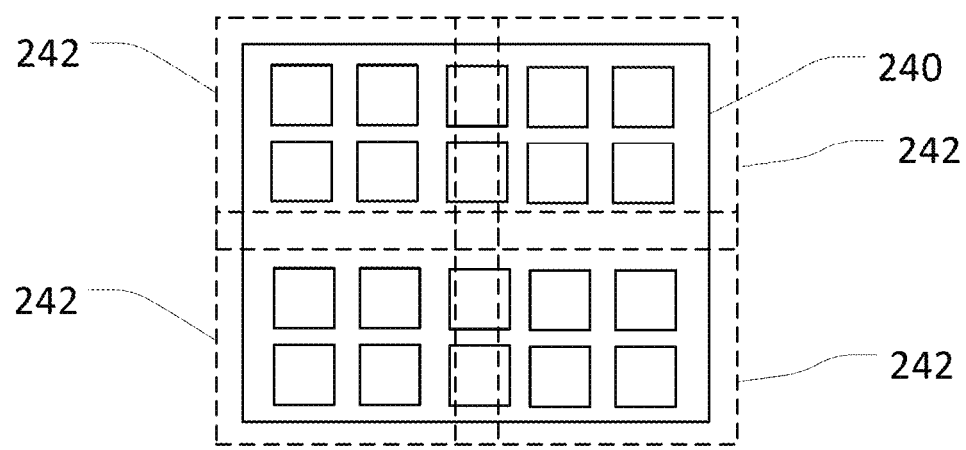
FIG. 10 is a schematic view of images acquired using an imaging system or method, in accordance with some embodiments of the technology.

In some embodiments, the principles disclosed herein can be used to acquire multiple images of a single object or of an array of objects. In some embodiments, multiple overlapping images can be acquired, such as may be useful to allow inspection of objects (or arrays) that are relatively large as compared to an FOV of a relevant imaging device. For example, as illustrated in FIG. 10, an imaging device (not shown) with a controllable mirror (e.g., similar to the examples discussed above) can be controlled to capture multiple images of a printed circuit board panel 240, with multiple overlapping FOVs 242. Accordingly, for example, without the use of a conventional FOV-expander or wide-FOV imaging device, the entire panel 240 can still be readily imaged and analyzed. In some embodiments, for example, images for all of the FOVs 242 can be stitched together using known techniques, in order to provide a single composite image of the panel 240 for analysis.

Figure 11:
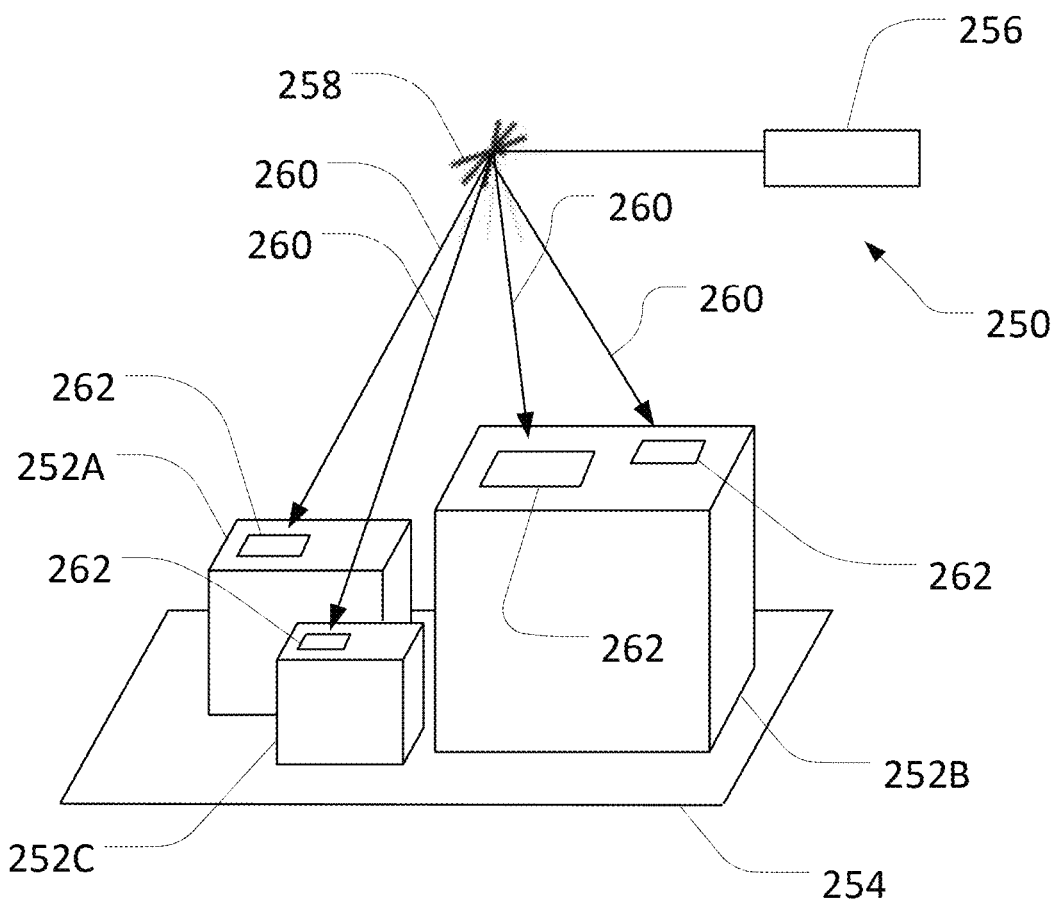
FIG. 11 is a schematic view of an additional imaging system (and method), in accordance with some embodiments of the technology.

As another example, some embodiments can be configured to selectively acquire different images of different portions of an object. For example, the imaging system 250 illustrated in FIG. 11 can be used to selectively acquire images of multiple discrete portions of a single object, such as may be useful to identify and analyze particular symbols (e.g., direct part marking symbols) on the object, or to selectively acquire images of multiple objects within a particular target area. In particular, in the embodiment illustrated, the imaging system 250 includes an imaging device 256 (e.g., as discussed above) and a controllable mirror 258 (e.g., a two-axis mirror). During operation, the mirror 258 can be controlled in order to selectively direct optical paths 260 for image acquisition to different locations within a target area 254 that includes multiples objects 252A, 252B, 252C. Thus, images can be acquired of each of multiple symbols 262 on the objects 252A, 252B, 252C, even though the symbols 262 may be at different focus planes and dispersed over a relatively large footprint. Accordingly, for example, the imaging system 250 can readily acquire high quality images of each the symbols 262, at different focus planes and over a large total scan area, without necessarily requiring the high resolution and large depth of field imaging devices that may be required under conventional approaches. Further, the imaging system 250 can readily acquire images of multiple symbols on a single particular object, such as is shown for two of the symbols 262 on the object 252B, whether in one image or multiple images.

In some embodiments, a focus setting and angular orientation for each of the optical paths 260 can be pre-determined, such as through pre-runtime manual or automated calibration, based on expected characteristics of the object 252 and expected locations of the symbols 262. In some embodiments, focus settings and angular orientations for the optical paths 260 can be determined according to other techniques presented above, such as through combined operation with a 3D sensor or through distance analysis accomplished via acquisition of multiple images in order to determine an appropriate optical path or focus for each relevant image acquisition.

In some embodiments, a controllable mirror can be used to provide runtime recalibration of an imaging system, such as to protect against temperature-induced focus drift or other effects. For example, a controllable mirror can be configured to occasionally direct an FOV for imaging towards a calibration target, to verify or determine necessary corrections for a current focus or other operational setting.

Figure 12:
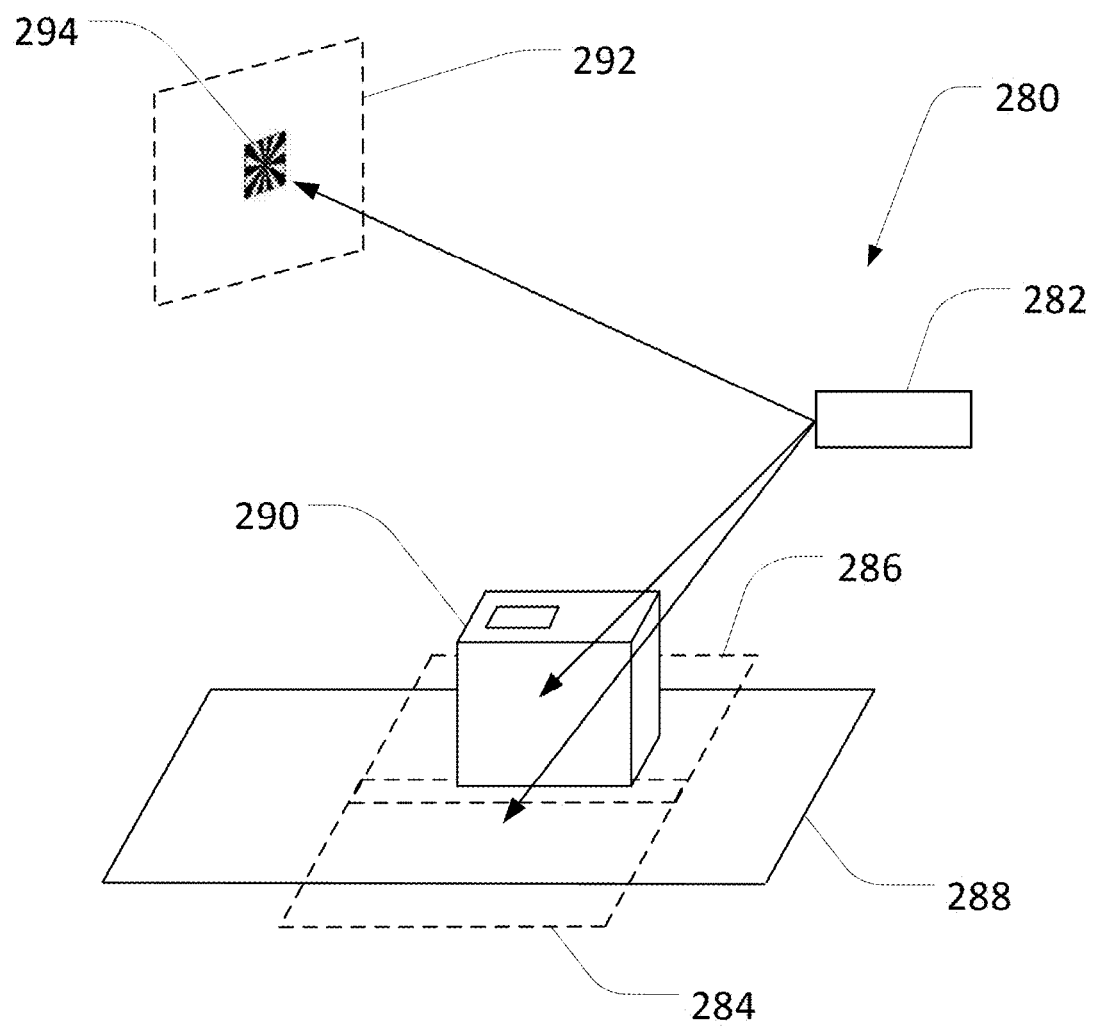
FIG. 12 is a schematic view of another imaging system (and calibration method) in accordance with some embodiments of the technology.

As illustrated in FIG. 12, for example, an imaging system 280 includes an imaging device 282 that is equipped with a controllable mirror (not shown) that is configured to selectively direct an FOV of the imaging device 282 for image acquisition. For operational image acquisition, the controllable mirror can be manipulated to allow the imaging device 282 to acquire successive images. For example, in some applications the mirror can be successively aligned for image acquisition via FOVs 284, 286 that cover an entire lateral width of a conveyor 288. Thus, for example, useful images of an object 290 can be acquired regardless of where the object 290 is disposed along the width of the conveyor 288.

Further, the controllable mirror can also be manipulated to sometimes provide a third (or other additional) FOV 292 that includes a calibration target 294. Thus, for example, based on known trigonometric principles, and known aspects of the calibration target and the imaging device 282, calibration of focus (or other aspects) of the imaging device 282 can be continually and automatically confirmed or corrected, even during active runtime operations. In some embodiments, the mirror can be controlled to allow imaging of the calibration target for each imaging cycle (i.e., so that each imaging cycle includes one image for each of the FOVs 284, 286, 292). In other embodiments, however, other sequences are possible.

Figure 13:
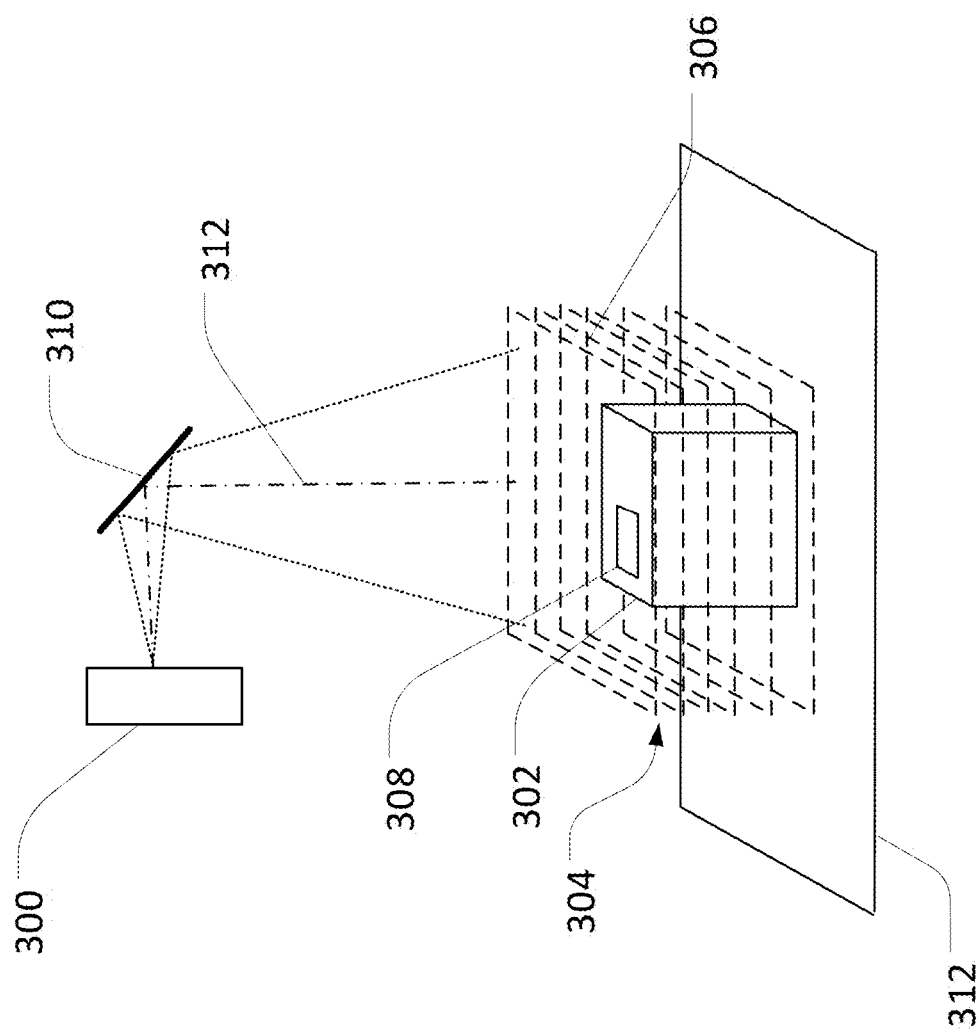
FIGS. 13 and 14 are schematic views of further imaging systems (and methods) in accordance with some embodiments of the technology.

In some embodiments, a controllable mirror can be used for acquisition of images of a particular object or area using multiple different focus settings (e.g., as discussed above), or can otherwise be used to optimize focusing operations. In some embodiments, controllable mirrors can be used to assist in autofocus operations or image acquisition subsequent to autofocus operations. For example, as illustrated in FIG. 13, an autofocus operation for an imaging device 300 can include acquisition of different images of an object 302 at each focal plane of a set of different focal planes 304. Once an optimal focal plane has been determined, the focus settings for subsequent image acquisition, at least for imaging the object 302, can then be limited accordingly. For example, once a focal plane 306 has been identified to be aligned for sharp focus on a symbol 308 on the object 302, subsequent image acquisition for the object 302 may be limited to only the focal plane 306, or to an acceptable or intended deviation therefrom.

In some embodiments, a set of one or more controllable or fixed mirrors (e.g., including a controllable mirror 310) can assist in autofocus operations, such as by appropriately aligning an FOV or optical axis for autofocus image acquisition or providing a particular optical path length for a particular FOV and focus setting (e.g., according to one or more of the various approaches discussed above). In some embodiments, after initial autofocus operations have completed, an arrangement of one or more controllable or fixed mirrors (e.g., including the controllable mirror 310) can be operated in conjunction with focus adjustments (e.g., using a high speed liquid lens) for subsequent image acquisition.

In some embodiments, with an optimal focal plane having been determined using controllable mirrors or otherwise (e.g., as discussed above), subsequent adjustments to the focus of a lens can be determined based in part on adjustments of a controllable mirror for subsequent image acquisition, such as by applying known trigonometric principles to determine changes in (or a current value of) an optical path length based on adjustments of the controllable mirror. For example, as the mirror 310 is adjusted to track movement of the object 302 by a conveyor 314 (or other movement), known trigonometric principles can be used to determine a current length of an optical path 312 based on a current orientation and location of the mirror 310 and the orientation and location of any other mirrors (not shown) or relevant optical devices (e.g., the imaging device 300) along the optical path 312. A focus of a liquid lens (not shown) or other lens assembly for the imaging device 300 can then be adjusted accordingly, to retain the previously determined focus at the focal plane 306 or to provide a particular (e.g., predetermined or maximum) deviation therefrom. Thus, for example, rather than execute autofocus operations multiple times over a tracking (or other) operation for imaging an object, an optimal focal plane can be determined just once and subsequent focus adjustments can be made automatically based on mirror-driven changes in optical path length.

In some embodiments, an arrangement of one or more controllable or fixed mirrors can be used to acquire images of an object or target area at multiple focal planes. This may be useful, for example, to support creation of a depth map of a particular area, to analyze symbols at multiple focal planes, or for various other reasons.

Figure 14:
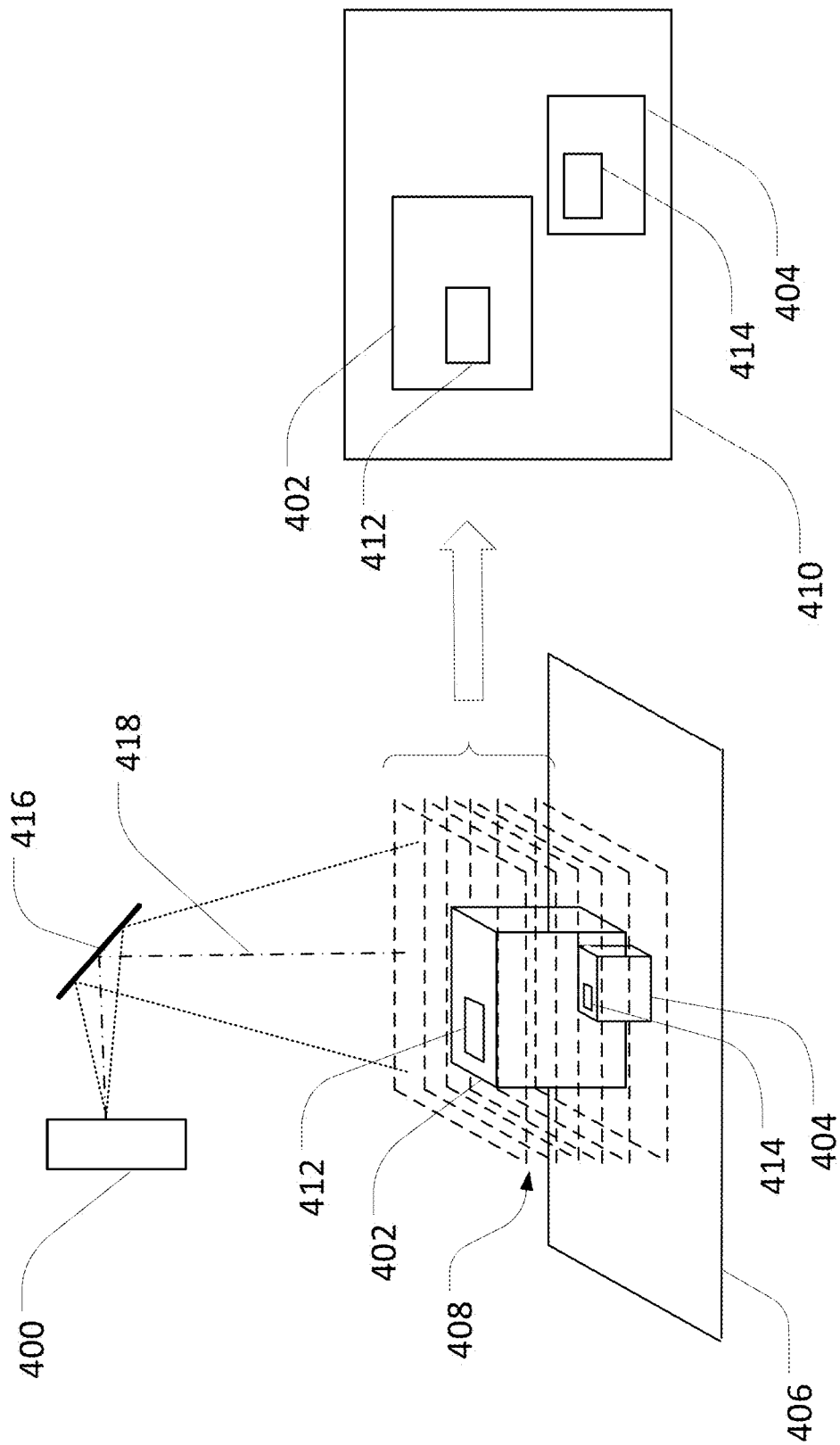

As one example, as illustrated in FIG. 14, an imaging device 400 can be configured to acquire images of objects 402, 404 as the objects 402, 404 rest in a target area or move through space (e.g., along a conveyor 406). Through adjustment of the focus of a liquid lens or other lens assembly (not shown) of the imaging device 400, and other relevant adjustments (e.g., of a controllable mirror) at least one image can be acquired of the objects 402, 404 at each of a plurality of focal planes 408. As appropriate, information from these images can then be combined, using known image processing techniques, in order to create a depth map of a target area that includes the objects 402, 404 or to otherwise create a composite image 410, such as may present multiple surfaces and multiple symbols 412, 414 of the differently sized objects 402, 404 as being simultaneously in focus.

In some embodiments, adjustment of the current focal plane can be based on adjustments of a controllable mirror, including for mirror adjustments that change an optical path length, as also discussed above. For example, control of a mirror 416 can be used to determine appropriate focus adjustments for image capture at the different focal planes 408 as the objects 402, 404 are moved, as well as to maintain the objects 402, 404 within an FOV of the imaging device 400. For example, as similarly discussed above, once a reference focus adjustment has been determined (e.g., for one or more of the focal planes 408) adjustments to maintain the reference focus, or to predictably vary a current focus from the reference focus, can be determined. For example, as also discussed above, focus adjustments can be determined based on adjustments of the orientation of the mirror 416, which can indicate, via the application of known trigonometric principles, a current length of an optical path 418.

As with other embodiments discussed herein, these focus-related applications can also be implemented in combination with other approaches. For example, a distance measuring device or operations based on manipulation of a controllable mirror (e.g., as described relative to FIG. 6) can be used to determine a particular height of one or both of the objects 402, 404, which may be used to refine or otherwise further adjust the focus of the imaging device 400 for imaging of the objects 402, 404.

Some embodiments of the technology can be used to implement other set-up or run-time calibration or other adjustments beyond those expressly discussed above. Additional examples in this regard are presented below, each of which can be operated alone or in conjunction with one or more of the other disclosed approaches. Generally, as detailed in various examples below, a mirror arrangement with at least one controllable mirror can be manipulated in order to efficiently implement set-up or runtime search operations or other similar tasks based on a variety of optimization criteria and other factors. This may be useful, for example, to identify a particular scan area to be covered during runtime operations, to find one or more symbols or objects within a particular scan area, or for other tasks.

Figure 15:
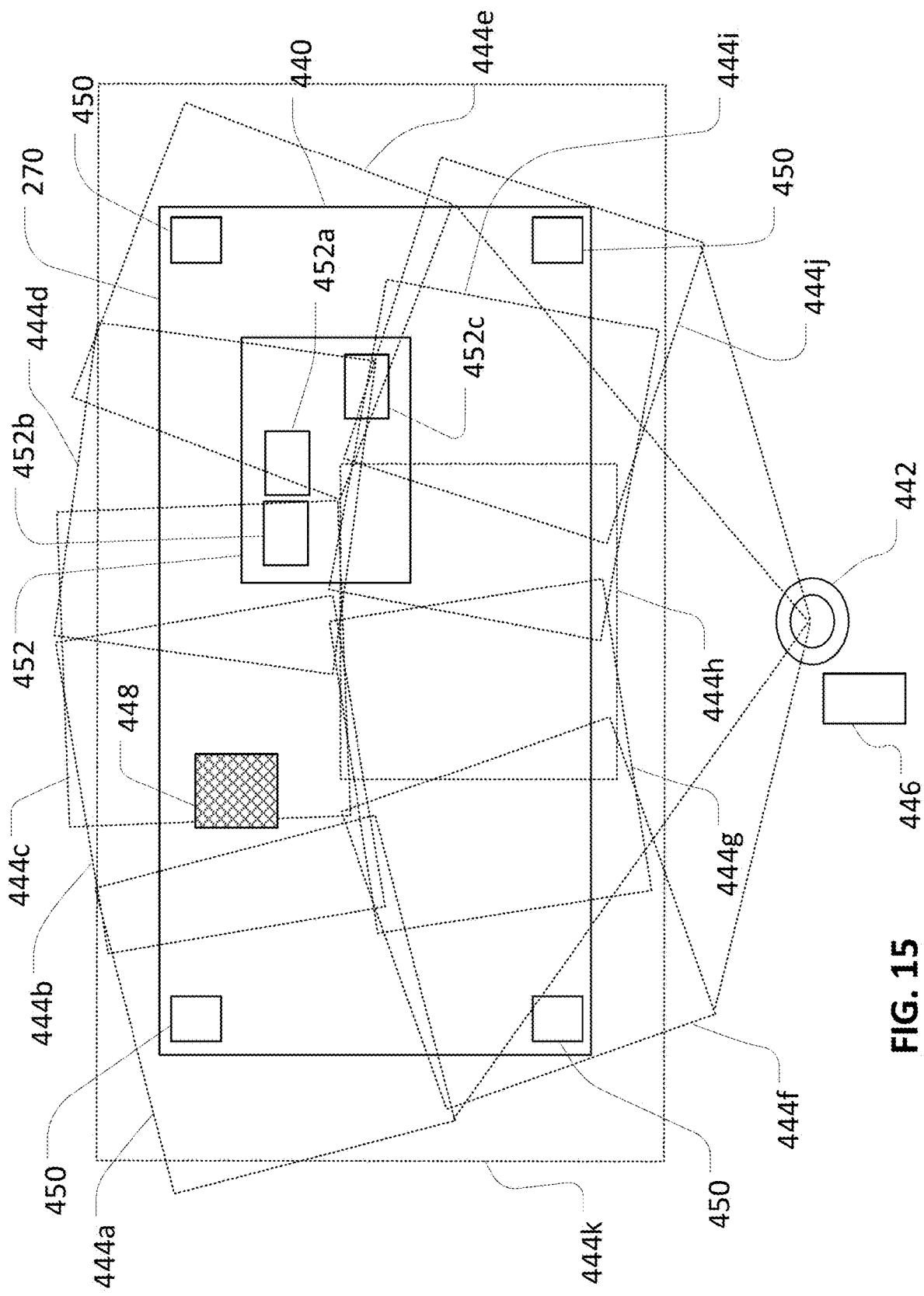
FIG. 15 is a schematic view of calibration and scan methods (and systems), in accordance with some embodiments of the technology.

In some embodiments, a user can manually identify a particular area to be scanned, such as by interacting with a user interface for machine vision software, and a mirror can then be controlled accordingly for a set of image acquisitions. For example, as illustrated in FIG. 15, after a user has manually specified a scan (target) area 440, a two-axis mirror 442 can be controlled based on earlier calibration of mirror movement to an FOV location in order to capture one or more images using a set of FOVs 444a-444j that fully cover the scan area 440. In some embodiments, however, including as discussed below, only a subset of the FOVs 444a-444j may be used, so that at least one imaging cycle may not necessarily cover every part of the scan area 440.

In some embodiments, a control device can determine the scan area 440 (or in other words the scan pattern) based on one or more standard or otherwise predetermined dimensions of, for example, a standard dimension of a standard object (e.g., a pallet). As a more specific example, a control device can determine the scan area 440 based on a length, a width, a height, or area of a surface of a side of the standard object, etc., each of which can be predetermined. In this way, the scan area 440 can be of a predetermined consistent size, which can be used for multiple objects of the same type. For example, for each object of the same type, the mirror 442 and the corresponding imaging device (not shown) can scan the object according to the predetermined scan area 440, which can itself be determined (e.g., pre-determined), based on one or more relevant dimensions of the objects of that type. In some cases, the imaging device and mirror 442 can utilize different predetermined scan areas 440. For example, when the imaging device and mirror 442 scan objects of a first similar type (e.g., a pallet) as they travel along a transport system (not shown), the imaging device and the mirror 442 can scan each of these objects according to a first predetermined scan area 440 (e.g., that is determined based on one or more dimensions of the first type of object). Then, when objects of a second similar type (different from the first) travel along the transport system, the imaging device and the mirror 442 can scan each of these objects according to a second predetermined scan area 440 that is different than the first predetermined scan area 440.

In some embodiments, a user can specify a scan area via management software for a relevant imaging device (not shown in FIG. 15) or machine vision system, along with other relevant information as appropriate. For example, in addition to a designated scan area, a user may specify information such as parameters for a currently-attached lens assembly, a distance from the imaging device to a focal plane of the scan area, whether a particular multiple-mirror (e.g., fixed-mirror) assembly is to be used (e.g., to provide a particular optical path length), real-world dimensions of the desired FOV, whether and by how much adjacent FOVs should overlap, and so on. In this regard, for example, a user may specify the location and size of the scan area 440, a distance from the imaging device to the scan area 440, and a desired degree of overlap of adjacent images, and the mirror 442 can then be automatically controlled to acquire images of the entire scan area 440.

In some embodiments, certain parameters can be determined automatically. For example, a controllable mirror arrangement or distance measurement device can be used to determine a distance to a scan area, and associated information can be derived therefrom, including real-world dimensions of the scan area. For example, a time-of-flight measurement device 446 (or other device, such as a 3D sensor) can be configured to determine a distance between the scan area 440 and the imaging device (not shown) and the mirror 442 can then be controlled accordingly (e.g., using known trigonometric principles) to allow images to be acquired for a relevant set of the FOVs 444a-444j. Similarly, for large scan areas, it may be necessary to adjust focus for certain FOVs (e.g., the exterior FOVs 444a, e, f, j). In some cases, this adjustment can be made automatically, including based on analysis of the movement of a controllable mirror as discussed above.

As another example, a symbol 448 of known type and dimensions can be provided within the scan area 440. An image can be acquired of the symbol 448 (e.g., via the FOV 444c as a default starting FOV) and a correlation between image dimensions (i.e., pixels) and real-world dimensions (e.g., mm) can then be determined using known image analysis techniques. This correlation can then be used, again based on known trigonometric principles, to determine a distance between the symbol 448 and the imaging device, and the mirror 442 can be subsequently controlled accordingly, to provide one or more of the FOVs 444a-444j.

In some embodiments, other analysis of symbols can otherwise help to determine a relevant scan area. In some embodiments, particular symbols may indicate key portions of a scan area, such as vertices or other boundaries that collectively specify part or all of the outer profile of the scan area. For example, as illustrated in FIG. 15, a set of symbols 450 have been disposed at the four corners of the rectangular scan area 440. When a setup (or other) operation is started, the mirror 442 can then be controlled in order to acquire images of (and around) the scan area 440, such as by successively capturing images of the FOVs 444a-444j in a particular (e.g., predetermined) order. From analysis of the images, the image location of the symbols 450 can be identified and, as needed, the real-world location of the symbols 450 can be determined (e.g., based on trigonometric analysis using the location within the FOVs 444a, e, f, j, a known or measured distance to the scan area 440, and the angular orientation of the mirror 442 during the relevant image acquisitions). The location of the scan area 440 can then be specified, whether in terms of angular orientations of the mirror 442 or real-world location, in order to guide subsequent (e.g., runtime) image acquisition.

In some implementations, searching a particular area for symbols can proceed in different optimized ways, including as may depend on particular parameters of the relevant image-acquisition and analysis devices. For example, in systems for which image acquisition may take a generally long time but image analysis may be relatively quick, image acquisition to search for symbols may sometimes be executed to minimize the number of images acquired. In contrast, in systems for which image acquisition may be relatively quick but image analysis may take a relatively long time, image acquisition to search for symbols may sometimes be executed to minimize the expected time to find all symbols. Examples of optimization approaches that may address either of these priorities are further discussed below.

In some cases, images may initially be acquired for FOVs that correspond to real-world locations where a particular symbol may be expected to be found. Expected locations for symbols can include, for example, locations that are readily within reach of typical users, or that are within proximity to (or sufficiently removed from) particular locations. For example, initial image acquisition may concentrate on locations at particular physical locations in which it is likely that a user may have placed a symbol or object, such as at locations around (e.g., within a threshold distance from) particular heights corresponding to a height or each of a user, or around particular distances (e.g., within a threshold distance) from a reference point, such as the edge of a conveyor, staging area, or imaging area. In this regard, for example, with the scan area 440 considered as extending vertically and the top of the scan area 440 being around chest height for a user (e.g., between 1-2 m above the ground or other user-support surface), initial image acquisition may proceed with the upper FOVs 444a-444e based on the expectation that a user is more likely to place symbols for identification of a scan area (or otherwise) at or near their own chest-height (e.g., between 1-2 m above the ground).

Similarly, if symbols are expected to be placed in the corners of a scan area and one or more of the boundaries of the scan area can be reasonably approximated, initial image acquisition may preferentially include expected locations of one or more corners (or other boundary points) of the scan area. For example, with a distance to the scan area 440 and an approximate size of the scan area 440 being known, the mirror 442 can be controlled to initially acquire images only using the corner FOVs 444a, e, f, j. If the symbols 450 can be identified in these images, the virtual (or real-world) location of the corners of the scan area 440 can then be specified to guide later control of the mirror 442 to acquire images of the entire scan area 440, and acquisition of further setup images (e.g., using the FOVs 444b, c, d, f, h, i) may not be necessary. In contrast, if no symbols can be identified in these images, further images can be acquired at the corner FOVs 444a, e, f, j, or other FOVs, including based on example rules for expanded searches as further detailed below.

In any case, once the boundaries of the scan area 440 have been specified, a map of FOV locations (or scope) corresponding to particular orientations of the mirror 442 can be determined accordingly, and can be used, during runtime or during further setup operations, to appropriately orient the mirror 442 for image acquisition using a particular FOV.

As another example, initial image acquisition may concentrate on locations that previous user inputs or previous image analysis have suggested are high-likelihood areas for images. For example, when searching the scan area 440 for an object, initial image acquisition may preferentially employ FOVs in which a similar object (or relevant symbol) was previously found. For example, in a presentation scanning application, if analysis of previously acquired images indicates that an object is likely to be presented in one or more particular locations in a scan area, initial image acquisition may employ only FOVs that cover those locations. For example, if analysis of previous images indicate that a group of users (or one user in particular) tend to present objects within the scan area 440 at a location similar to that shown for the object 452 (see FIG. 15), initial image acquisition to find a subsequent object (or symbol) may preferentially employ the FOVs 444*d, e, i, j* (e.g., the FOVs within which the object 452 was previously successfully imaged). Similarly, if corner locations for a scan area were previously successfully identified using the FOVs 444*a, e, f, j*, initial scans to identify the boundaries of the scan area 440 may preferentially use only one or more of those FOVs.

In some embodiments, a degree of overlap can be specified in order to optimize searches for symbols or objects, or identification of a scan area, including by specifying a binary degree of overlap (i.e., YES or NO to overlapping images) or by specifying a non-binary degree of overlap (e.g., one or more percentages of overlap for adjacent images in one or more directions). Thus, in some cases, in order to reduce the number of images acquired when searching for an object or symbol over a search area, images covering the search area may initially be acquired with a relatively coarse non-overlapping search, i.e., with no or relatively minimal (e.g., 10% or less) overlap between adjacent FOVs.

For example, initial acquisition of images to specify the scan area 440 via identification of the symbols 450 or to locate the symbol 448 or the object 452 may initially proceed with non-overlapping FOVs 444*a, c, e, f, g, j*, with images of those FOVs being analyzed to search for the symbols 450 before additional images are acquired (or analyzed). In some cases, although this approach may not necessarily cover the entirety of the scan area 440 with the initial image acquisitions, appropriate setup (or runtime) information, such as the location of the object 452, the symbol 448, or the corner symbols 450—and thus the boundaries of the scan area 440—may nonetheless still be determined with relatively high efficiency. (As generally used herein relative to FOVs and images, "non-overlapping" refers to zero overlap, overlap that is less than 5% of a total dimension of the FOV or image in the overlapping dimension, or overlap that is less than 25% of a maximum dimension of a largest expected symbol.)

If further images are needed, additional images using one or more of the overlapping FOVs 444*b, d, g, i* can then be introduced as appropriate. In some cases, overlapping images can be acquired as a matter of course for an entire scan area, based on user input for initial scanning, after a failure of non-overlapping initial scans to provide sufficient information, or for other reasons. For example, after acquiring a set of non-overlapping images in sequence and if further information is needed (e.g., if a relevant symbol or object has not been found), a search operation may proceed to fully cover the relevant scan area with a set of overlapping images that, along with the initially-acquired non-overlapping images, provide appropriately increased (e.g., complete) coverage of the relevant scan area. In this regard, for example, the initial non-overlapping images can facilitate a rapid, initial coarse search and the subsequent overlapping images can facilitate a somewhat slower, subsequent fine search. (Similar "coarse" and "fine" approaches can also be adopted relative to FOV size, as also discussed below.)

In some cases, only select overlapping images may be acquired as part of a fine (or other) search, including as based on information from initial non-overlapping (or other) coarse-search image acquisition. For example, machine vision analysis of the non-overlapping images 444*c, e, h, j* (e.g., edge finding, symbol identification, etc.) may indicate a likely position of the object 452 within the scan area 440, while also indicating that certain symbols, such as a symbol 452*a* on the object 452, have not been fully captured by the acquired images. Accordingly, a subsequent round of image acquisition may utilize the overlapping FOV 444*d*, in order to supplement the non-overlapping FOVs 444*c, e, h, j*, for a more complete imaging and analysis of the symbols on the object 452. On the other hand, if no partial feature of interest has been identified in the initial non-overlapping search, a subsequent overlapping search may proceed in ordinary course (e.g., sequentially in space for an entire scan area or portion thereof, as discussed above).

In some embodiments, use of overlapping FOVs to succeed an initial acquisition (and analysis) of non-overlapping FOVs may proceed using predetermined scan patterns. For example, after acquiring images in sequence for the FOVs 444*a, c, e, f, h, j* and upon identification of a need for further images, a subsequent round of image acquisition may proceed sequentially through the FOVs 444*i, g, d, b*. (In other embodiments, other sequences of acquisitions of non-overlapping or overlapping images are also possible.) In some embodiments, as also discussed below, use of overlapping FOVs can be guided by analysis of images from previously imaged (e.g., non-overlapping) FOVs. For example, upon identifying that the symbol 448 or another potential feature of interest is partially captured by the FOV 444*c* but extends somewhat to the left thereof, a subsequent overlapping round of scanning may begin with the FOV 444*b* or other proximate (e.g., adjacent) FOV that has been selected based on a high likelihood of that FOV helping to more fully capture the partially imaged feature of interest.

In some embodiments, whether initial (or other) image acquisition uses overlapping FOVs or the amount by which FOVs overlap can be determined based on user input, or based on other factors. In some embodiments, a degree of overlap for a particular search (or part thereof) may be determined based on the size of a symbol relative to the size of an FOV. For example, if a smallest expected size for a set of symbols to be found forms a relatively small proportion (e.g., 10% or less) of an FOV, it may be expected that the likelihood of the symbol being only partially imaged by any given FOV may be relatively small. Accordingly, it may be efficient to initially look for the symbols with no overlap between FOVs or with an FOV that corresponds to the proportional size of the symbol in the FOV (e.g., overlap of 10% or less) and to proceed to acquisition or analysis of overlapping FOVs only if the initial search is unsuccessful.

In some embodiments, a size of an FOV can be controlled via controllable mirrors (or otherwise) in order to optimize searching. For example, as discussed above, some systems can include mirrors that are controllable to provide imaging of the same or different scan areas with different sizes of FOVs (see, e.g., FIGS. 4A-5B). In some cases, an initial search for a symbol or object, such as to find the object 452 or to specify the boundaries or size of the scan area 440, may proceed with a first controllable mirror arrangement (e.g., including the mirror 442) that provides a relatively large FOV 444k. Once a relevant symbol or object has been located (e.g., the symbols 450, the symbol 448, or the object 452), a second controllable mirror arrangement (e.g., also including the mirror 442) can be used in order to acquire images using one or more of the smaller FOVs 444a-j.

In some embodiments, predetermined arrangements of particular symbols can be used to determine a relevant FOV for an image acquisition or analysis. For example, if an arrangement illustrated by symbols 452a-c on the object 452 is a typical (e.g., standardized) arrangement, an identified location of one of the symbols 452a-c may indicate a likely relative (or absolute) location of the other symbols 452a-c, whether considered in isolation or in combination with information about the object 452 (e.g., edge locations). Accordingly, in some cases, if an initial acquisition of an image using the FOV 444c allows a location of the symbol 452b to be determined, likely locations for the symbols 452a, 452c may sometimes also be determined on that basis. A subsequent image acquisition may then beneficially proceed by controlling the mirror 442 to provide an FOV relevant to the determined symbol locations, such as by providing an adjacent, potentially overlapping FOV (e.g., the FOV 444d, e, or j) or an intermediary FOV (not shown) that is shifted relative to the FOV 444c by an appropriate amount.

Similarly, if a predetermined target number of symbols has been identified, further image acquisition for a search operation may not be required. For example, if initial image acquisition to specify the scan area 440 has identified the four corner symbols 450, it may not be necessary to proceed with subsequent image acquisition for set up, and runtime operations can proceed based on the specified scan area 440. Similarly, if all three of the symbols 452a, b, c have been identified and no further symbols are expected (e.g., based on a standardized symbol arrangement for the object 452), subsequent image acquisition may not be needed—at least as concerns finding further symbols on the object 452.

In this and other approaches, other types of analysis may also provide useful information to guide control of a mirror for image acquisition. For example, in some embodiments information from 3D scanning may be used in order to determine optimal FOVs for image acquisition. As another example, known types of machine vision analysis, such as identification of whole or partial symbols, of object faces or edges, and so on, can also help to guide identification of appropriate FOVs and, correspondingly, appropriate adjustment of a controllable mirror, including as alluded to above. These and similar types of information may also be useful, for example, in order to help identify what types of adjustments to a mirror may be needed in order to provide a particular FOV.

Although particular systems and corresponding methods are presented individually above, aspects of any number of the disclosed embodiments can be combined or interchanged with each other in some implementations. For example, the principles of mirror control and image acquisition presented relative to FIGS. 1A through 3 can generally be used to implement the zooming, dimensioning, focusing, selective imaging, and other functionality discussed with regard to FIGS. 4A through 15. Similarly, trigonometric analysis as described relative to FIG. 6 and known variations thereupon (e.g., with certain initially unknown quantities in FIG. 6 being otherwise determined) can be applied in a variety of contexts, including with respect to some variations of each of the other embodiments discussed above. Further, other aspects can also be combined or interchanged. For example, configurations with three or more mirrors along particular optical paths (e.g., as shown in FIG. 5A) can be used in, or used to implement similar functionality as, any number of other systems presented herein as having only two mirrors along particular optical paths. Indeed, in general, additional fixed or controllable mirrors can be added to any of the optical paths discussed herein, with results following according to the principles disclosed above, although this may increase complexity in various ways. Additionally, in some implementations, mirrors that are discussed expressly above as being fixed mirrors can be replaced with controllable mirrors, such as remotely installed secondary controllable mirrors that may be controlled synchronously with primary controllable mirrors included in imaging devices.

Figure 16A:
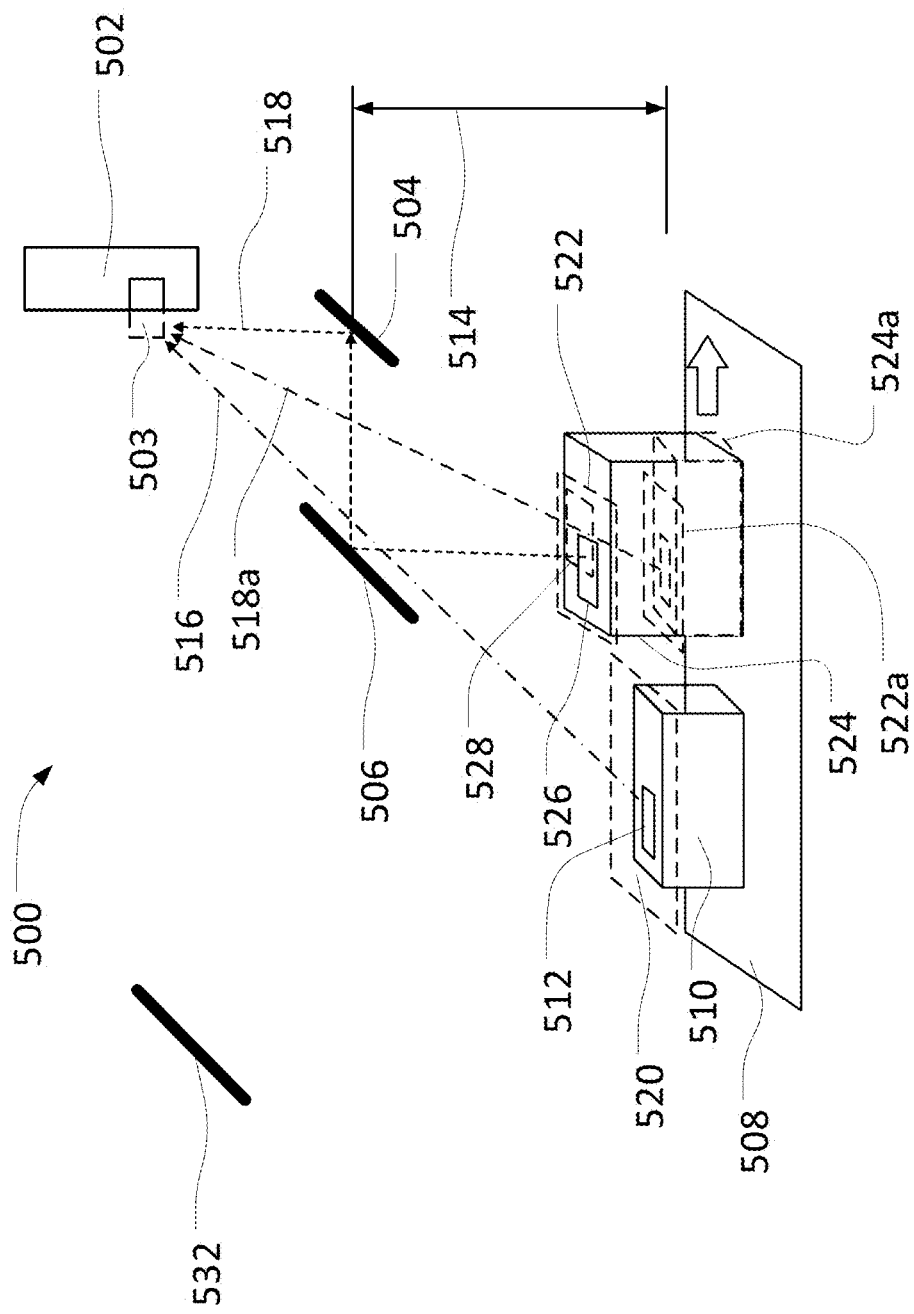
FIG. 16A is an schematic view of another imaging system, in accordance with some embodiments of the technology.

FIG. 16A shows an example of another imaging system 500 that is similar to, and a potential extension or modification of imaging systems discussed above, including the imaging systems 20, 78, 110, 140, 180, and so on. Thus, the imaging system 500 can include similar features or be configured for similar functionality as other imaging systems discussed herein, as appropriate. In the illustrated example, the imaging system 500 includes an imaging device 502 and a set of remotely installed fixed mirrors 504, 506. Although this example includes two fixed mirrors and one controllable mirror 503 (as also discussed below), in other examples other configurations are possible. For example, a mirror arrangement for use with the imaging system 500 (or other systems) can include a different number or configuration of fixed mirrors and controllable mirrors.

The imaging device 502 can include any features (or combination of features) as described with reference to the imaging devices above. For example, the imaging device 502 can include at least one (e.g., two or more) imaging sensor(s), at least one lens arrangement (e.g., two or more lens arrangements corresponding to respective imaging sensors), and at least one control device (e.g., a processor device) configured to execute computational operations relative to the imaging sensor(s) or other modules.

As shown in FIG. 16A, the imaging device 502 includes a controllable mirror 503 (e.g., a one axis, two axis, etc., controllable mirror) that can be configured as similarly described for the controllable mirrors of other examples herein. Thus, the imaging device 502 can selectively acquire image data from different FOVs depending on the orientation of the controllable mirror. In some configurations, the controllable mirror 503 of the imaging device 502 can be positioned within the housing of the imaging device 502, while in other configurations the controllable mirror 503 can be positioned externally to a housing of an imaging device, even remotely from such a housing. When a controllable mirror is positioned externally to a housing, in this example and others, the controllable mirror can sometimes be removably coupled and positioned externally to the housing of the imaging device, including as part of a larger attachment for the imaging device. For example, the controllable mirror 503 (and other components including, for example, a distance sensor, an aimer, etc., and corresponding circuitry) can be positioned within an attachment housing that can be coupled to (and removably coupled from) the housing of the imaging device 502. In some cases, the attachment housing can be coupled to the housing of the imaging device 502 at a front side of the imaging device 502 that includes a lens arrangement of the imaging device 502. In addition, the attachment housing can be coupled to the housing of the imaging device 502 so that an optical axis of the imaging device 502, prior to redirection by the controllable mirror 503, intersects with the attachment housing (and relevant components therein) when the attachment housing is coupled to the housing of the imaging device 502. Accordingly, for example, when the attachment housing is coupled to the housing of the imaging device 502, the optical axis of the imaging device 502 (prior to redirection by the controllable mirror 503), is aligned with the controllable mirror 503 (e.g., so that the optical axis of the imaging device 502 would intersect with the controllable mirror 503).

As shown, the fixed mirrors 504, 506 are positioned above a conveyor 508 (or other transport system) that moves objects including an object 510 with a symbol 512 along the conveyor 508. The fixed mirrors 504, 506 are positioned at substantially the same vertical height 514 (e.g., deviating by less than 5%) above the conveyor 508, although other configurations are possible. The fixed mirror 504 is positioned closer to the imaging device 502 and has a smaller surface area than the fixed mirror 506, although in other configurations the surface areas of the fixed mirrors 504, 506 can be substantially the same or a smaller mirror may be disposed farther from an imaging device. The fixed mirrors 504, 506 also have substantially the same orientation (e.g., being angled along the plane defined by the vertical and horizontal axis at substantially the same angle), although it can be appreciated that the relative orientations between the fixed mirrors 504, 506 need not be identical (or substantially the same) in order to function properly.

Additionally, although the mirrors 504, 506 are described as being fixed in the illustrated embodiment, in other configurations, one or more similarly arranged mirrors may be translationally fixed (i.e., prevented from translating) but may be configured for controllable changes to their respective orientations (e.g., can be configured as movable mirrors, controlled by an imaging device or another system) including as described relative to other embodiments. In a specific example, a mirror similar to the mirror 506 can be configured to controllably rotate, relative to a mirror similar to the mirror 504 to acquire relatively high resolution images along different horizontal locations of a conveyor or other transport system. In some cases, for example, as also discussed relative to other embodiments, this arrangement may allow for higher resolution or otherwise improved imaging of objects having different heights.

In the illustrated embodiment of FIG. 16A, the imaging device 502 is configured to selectively acquire imaging data along two different optical paths 516, 518 having respective FOVs 520, 522. In particular, in the illustrated example, the optical path 516 with the FOV 520 extends between the mirrors 504, 506, which does not utilize the mirrors 506, 504 at all (e.g., light from the FOV 520 does not reflect off the mirrors 504, 506). In contrast, the optical path 518 with the FOV 522 is defined by the mirrors 504, 506, so that light from the FOV 522 is directed at and reflected off the mirror 506, which is then directed at and reflected off the mirror 504 to be directed at the imaging device 502 (e.g., an imaging sensor of the imaging device 502). In other examples, a variety of additional or alternative other optical paths are also possible, including paths that include other mirror arrangements discussed herein.

Through adjustment of the orientation of the controllable mirror, the imaging system 500 can select which of the optical paths 516, 518 (or others) to utilize for acquisition of imaging (or other) data using the imaging device 502. For example, based on a first orientation of the controllable mirror, the imaging device 502 can utilize the optical path 516 to acquire image data from the FOV 520. Similarly, based on a second orientation of the controllable mirror, the imaging device 502 can utilize the optical path 518 having the FOV 522.

In some embodiments, different optical paths can be used to effectively change an imaging distance between an imaging device and a target and, for example, thereby provide differently sized FOVs for different images or imaging locations. As shown in FIG. 16A, for example, the optical path 516 is longer than the optical path 518, and, correspondingly, the FOV 522 is larger than the FOV 522. Thus, as also similarly discussed above, images using the optical path 516 may cover a larger area than images using the optical path 518. Accordingly, for example, images taken using the optical path 516 may help to initially locate a particular area of interest (e.g., to locate a barcode on a larger box) and then images taken using the optical path 518 can be used to acquire high resolution data regarding the area of interest.

In some embodiments, different optical paths can be used in order to effectively extend the imaging distance for a particular target location (or otherwise). For example, an object such as the object 524a may exhibit relatively smaller heights than objects such as the object 524 (e.g., so that the top surface of the object 524a is farther from the imaging device 502 at any given position than the top surface of the object 524). Correspondingly, for a direct optical path 518a (or other similar optical path), the top surface of the object 524 may sometimes be too close for effective focusing of the imaging device 502, or an FOV 528 at the top surface may be too small (e.g., may not include the entire symbol 512). In this case, for example, the imaging device 502 can utilize the optical path 518 (or another similar optical path), the effective length of which is extended by the mirrors 504, 506, to acquire image data of the FOV 522 (or another similar FOV). With appropriate configuration, the FOV 522 may be larger than the FOV 528 of the optical path 516a at the same height, so that appropriate image data of the entire symbol 526 can be acquired (e.g., with appropriate focus or scope for finding or decoding the symbol 526). In contrast, for example, the direct optical path 518a can be used during image acquisition for the object 524a at a similar location along the conveyor 508, to provide a different FOV 522a, with similar beneficial effects.

In some cases, a direct optical path and an alternative mirror-directed optical path can exhibit similar (e.g., the same) path lengths. Correspondingly, a focus or size of an FOV for the direct and the alternative optical paths may be similar. For example, with particular configurations of the mirrors 504, 506, the FOVs 522, 522a can be of the same size and the same focus setting can be used for in-focus image acquisition at both. In some cases, to acquire images of a particular area, fixed or controllable mirrors for a mirror-directed optical path can be arranged to provide a similar optical path length as a direct optical path for one or more characteristic object sizes (e.g., for two common box heights).

In some cases, two mirror-directed optical paths can be used to provide similar beneficial effects relative to image acquisition at different heights. For example, two mirror-directed optical paths, including as generally discussed relative to FIG. 5A, can be used for operations similar to those descried above for the optical paths 518, 518a. In some embodiments, alternative optical paths can be used in combination with other approaches discussed herein, including arrangements for finding focus or acquiring images at multiple depths (e.g., as discussed relative to FIGS. 13 and 14).

In some embodiments, the imaging system 500 can be used to determine a height of an object in accordance with other examples discussed herein (e.g., using time-of-flight sensors, multiple images and associated trigonometric calculations, etc.), or to similarly determine other object dimensions. In some embodiments, the imaging system 500 can be configured to use a dimensional determination to determine whether to utilize an optical path that does not include one or more of the mirrors 504, 506 (e.g., the optical path 516 or 518a), or utilize an optical path that does include one or more of the mirrors 504, 506 (e.g., the optical path 518). For example, the imaging device 502 can compare the determined height of the object to a threshold height (e.g., 400 mm), and if the determined height is greater than the threshold height, the imaging device 502 can utilize the optical path 518. As another example, if the determined height is less than a threshold height the imaging device 502 can utilize the optical path 518a. Thus, for example, based on dimensional information (e.g., as determined using a controllable mirror arrangement), an imaging system can determine a particular optical path, with or without one or more fixed or movable mirrors, that may be better suited for acquiring images of and decoding symbols on an object.

In some configurations, an imaging device can utilize a different optical path (e.g., switch optical paths) after an unsuccessful read for a symbol using image data that corresponds to an FOV of an initial optical path. For example, if the imaging device 502 utilizes a first optical path that (e.g., an optical path that includes one or more fixed mirrors, such as the optical path 518) to acquire image data from a corresponding FOV but fails to identify or decode a symbol (e.g., symbol 526) in that image, the imaging device 502 can then utilize a second, different optical path (e.g., an optical path that does not include one or more fixed mirrors, such as the optical path 518a) to acquire image data from a corresponding FOV for a subsequent attempt to identify or decode a symbol. In some cases, this process can be completed using a first optical path that does not include one or more fixed mirrors, and a second optical path that does include one or more fixed mirrors, or other combinations of optical paths that do or do not include one or more fixed or movable mirrors.

FIGS. 16B and 16C show a more detailed representation of the optical path 518. In particular FIG. 16B shows a perspective view of the object 524, and the fixed mirror 506 to visually depict the projected image of the FOV 522, while FIG. 16C shows a perspective view of the mirror 504 to visually depict the twice projected image of the FOV 522 that is directed to the imaging device 502 (not shown in FIGS. 16B, 16C). As shown, the FOV 522 is projected as a projected image 530 onto the mirror 506, which does not utilize the entire surface of the mirror 506. However, in alternative embodiments, the imaging device 502 can be moved vertically so that the entire or substantially the entire (e.g., 95% of the) area of the mirror 506 is utilized. In other words, in this case, the projected image 530 may span the entire or substantially the entire surface of the mirror 506 (e.g., 95% of the mirror).

The projected image 530 is reflected off the fixed mirror 506 and is directed to the mirror 504 to generate a projected image 536. Similarly to the projected image 530, the projected image 536 does not span the entire surface of the fixed mirror 506, although in some configurations the size (e.g., the surface area) of the mirror 504 can be decreased or the spacing between the imaging device 502 and the mirror 504 can be expanded so that the entire or substantially the entire (e.g., 95% of the) area of the mirror 504 is utilized. The projected image 536 is reflected by the mirror 504 and is directed to an imaging sensor of the imaging device 502.

Although not shown in FIGS. 16B, 16C, the orientation of the controllable mirror of the imaging device 502 at least partly dictates the relative positioning of the FOV relative to the surface of the conveyor 508 (or other transport system). For example, as shown, the controllable mirror is oriented such that the upper right portion of the projected image 536 on the mirror 504 corresponds with the lower right projected image 530 on the mirror 506, which provides the FOV 522 to the imaging sensor of the imaging device 502. By adjusting the orientation of the controllable mirror, the location of the projected image 536 on the fixed mirror 504 can be adjusted, thereby shifting the location of the projected image 530 on the fixed mirror 506, which ultimately shifts the location of the FOV 522.

In some examples, as noted above, one or more other fixed mirrors can be used. For example, referring again to FIG. 16A, another mirror 532 can be provided, which is not necessarily aligned to be included in a common optical axis as one or both of the mirrors 504, 506. In some cases, the mirror 532 can be a fixed mirror. Generally, the mirror 532 can be used similarly to the fixed mirrors 82, 144 of FIGS. 4A and 6 (or the controllable mirror 30 of FIG. 1A, as appropriate) in order to acquire images of objects on the conveyor 508 at different locations than images acquired using one or more of the mirrors 504, 506 (and not the mirror 532). In some cases, the mirror 532 can be used to scan objects before the objects reach a designated area for subsequent imaging and to control the subsequent imaging based on the results of the scan. In some cases, the mirror 532 or another arrangement can be used to help determine a dimension of an object, to inform control of a movable mirror for subsequent image acquisition. In some cases, the mirror 532 or a mirror arrangement similar to that of FIG. 6 can be used to scan an object as the object moves along the conveyor 508, approaching the area covered by the optical path 516, 518, 518a (and so on). Based on the scan, a particular optical path (e.g., the path 516, 518, or 518a) can be selected for subsequent image acquisition. For example, using a distance sensor (e.g., a ToF sensor) included in or cooperating with the imaging device 502, an optical path that includes the mirror 532 can be used to determine a height of an object and one of the optical paths 516, 518, 518a can be selected for a subsequent image acquisition accordingly. (As similarly discussed above, an initial image along the optical path 516 can be similarly used, in some implementations.)

In some embodiments, multiple imaging sensors arranged in an array relative to a target area can cooperate with each other and with one or more controllable mirrors in order to acquire images of multiple sides of an object (or target area, more generally). In some embodiments, for example, a tunnel system may be configured similarly to the tunnel 222 (see FIG. 9A), but may include multiple imaging sensors arrayed around a target area within a tunnel. Further, one or more controllable mirrors can also be arrayed relative to the tunnel with the imaging sensors, so that each imaging sensor, in cooperation with an associated one or more controllable mirrors, can acquire images of part or all of one or more sides of an object within the tunnel. In some embodiments, a particular imaging sensor may be configured to cooperate with a particular mirror arrangement or sub-part of a mirror arrangement in order to acquire images with a particular set of one or more sides of an object (or target area). For example, some embodiments may include a plurality of imaging sensors, each of which is configured to acquire images of a corresponding one or more sides (e.g., an exclusive, respective side) of an object in a target area, using a corresponding (e.g., exclusive) controllable mirror. Correspondingly, some embodiments may include plurality of sets of imaging sensors and corresponding controllable mirrors, with an imaging sensor and a controllable mirror of each of the sets being configured to acquire images for a different respective side of an object or target area. For example, some arrangements may include six imaging sensors, each with an associated controllable mirror, and each configured to acquire images of a respective one of six sides of an object in a target area: e.g., top, bottom, front, back, left, and right sides). Or, more generally, some arrangements may include a plurality of imaging sensors and a plurality of controllable mirrors, with each associated set of an imaging sensor and a controllable mirror being dedicated to acquisition of images of at least one particular, respective side of an object or target area.

Figure 17:
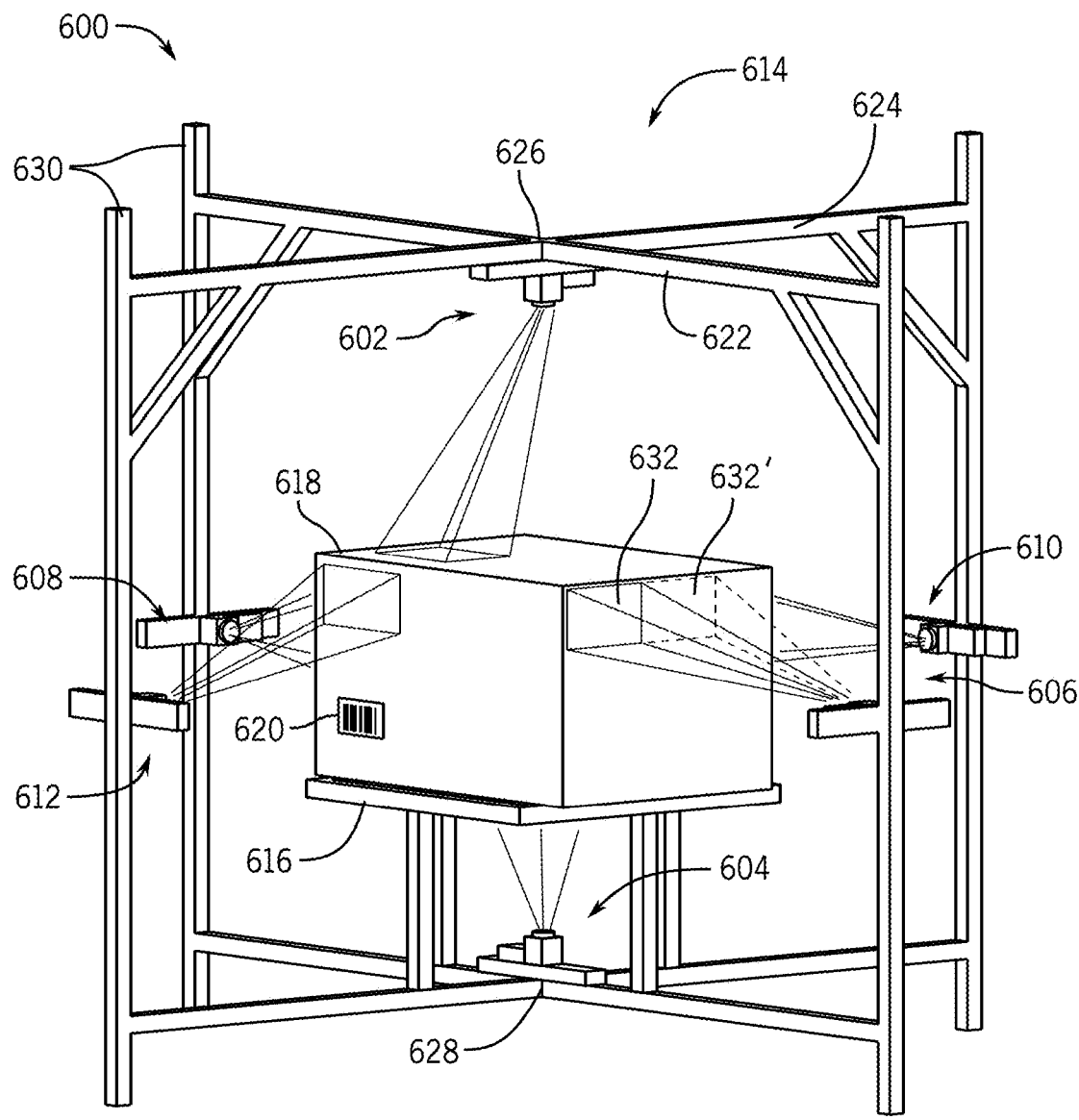
FIG. 17 is a perspective view of another imaging system for imaging multiple sides of an object in accordance with some embodiments of the technology.
Figure 18:
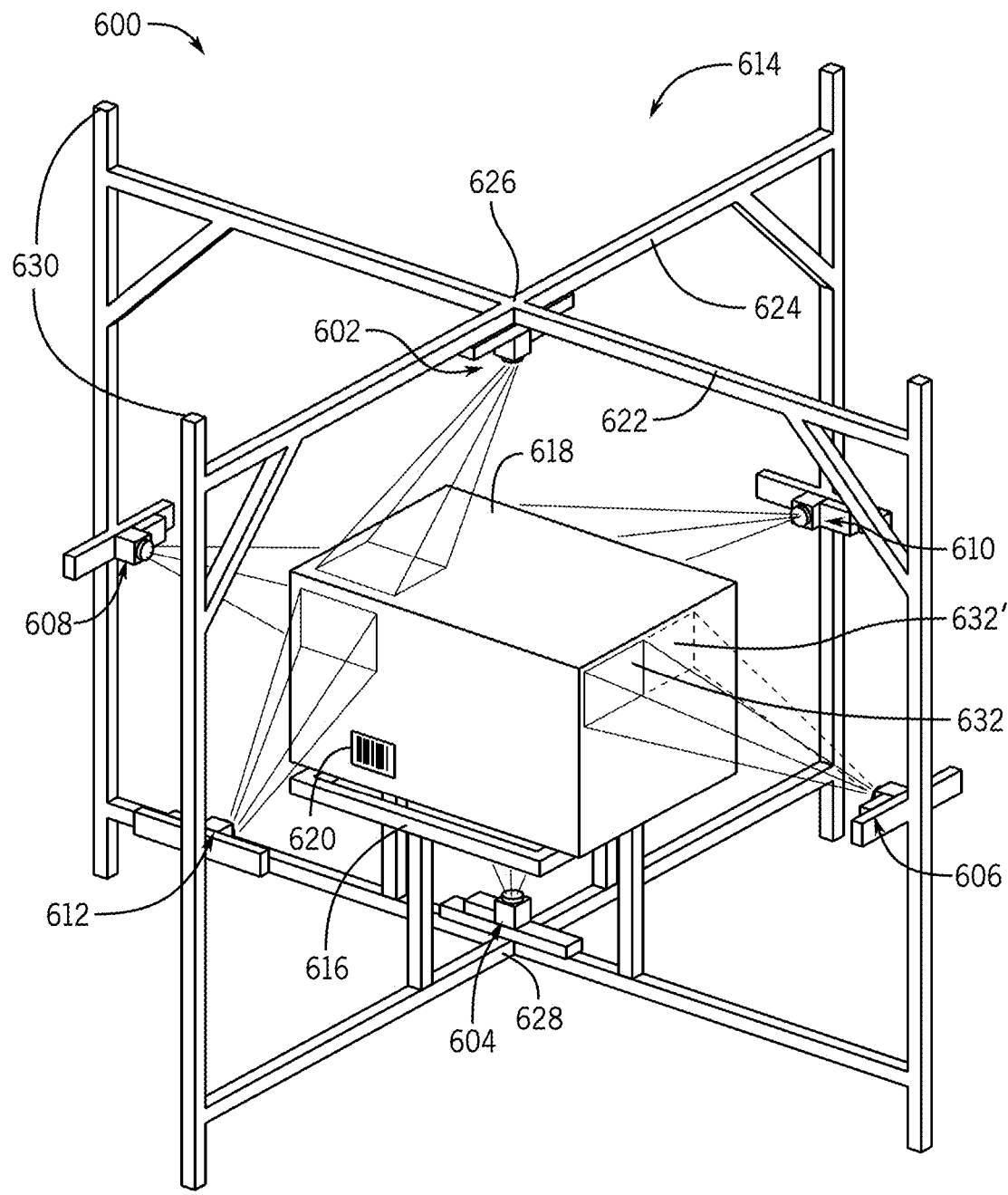
FIG. 18 is another perspective view of the imaging system of FIG. 17.

In this regard, for example, FIGS. 17 and 18 show an example of another imaging system 600 that is similar to, and a potential extension or modification of imaging systems discussed above, including the imaging systems 210, 220. Thus, the imaging system 600 can include similar features or be configured for similar functionality as other imaging systems discussed herein, as appropriate. In particular, the imaging system 600 includes imaging devices 602, 604, 606, 608, 610, 612 each having at least one imaging sensor, at least one lens arrangement, and at least one control device (e.g., a processor device) configured to execute computational operations relative to the imaging sensor. Each imaging device 602, 604, 606, 608, 610, 612 can include a controllable mirror. Each of the imaging devices 602, 604, 606, 608, 610, 612 can selectively acquire image data from different FOVs, depending on the orientation of the associated controllable mirror. Thus, for example, as further described below, the imaging system 600 can be utilized to acquire images of each side of an object, including, in some cases, partial representations of each of the sides to focus on a particular feature (e.g., a barcode) or a high resolution composite representation created from multiple adjacent or overlapping images.

In general, the imaging system 600 can be used to acquire images of an object that is presented for image acquisition. In the particular configuration shown in FIGS. 17 and 18, the imaging system 600 also includes a support structure 614 that supports each of the imaging devices 602, 604, 606, 608, 610, 612 and a platform 616 for supporting an object 618 with a symbol 620. Although a variety of other configurations are possible, in the illustrated example, the support structure 614 is a caged support structure, with two rectangular sections 622, 624 that are joined together at an upper bisection point 626 and a lower bisection point 628 of each rectangular section 622, 624, and a legs 630 that emanate away from each vertex of each rectangular section 622, 624. Likewise, the platform 616 is configured as an open-center platform, as may allow image acquisition of a bottom side of the object 618, although other configurations may include transparent platforms, mesh or grid platforms, or various other configurations. For example, in some cases, the platform 616 can be replaced with one of the transport systems described herein (e.g., a conveyor belt) that is configured to support and move objects in a travel direction. Thus, one or more imaging devices 602, 604, 606, 608, 610, 612 can scan a respective side of the object 618 as the object 618 travels along the transport system.

Continuing, each of the imaging devices 602, 604, 606, 608, 610, 612 is oriented to acquire images of (e.g., faces towards) a particular side of the platform 616 so that when an object, such as the object 618, is placed on and supported by the platform 616 each of the imaging devices 602, 604, 606, 608, 610, 612 can acquire image data of a particular side of the object. For example, in the illustrated arrangement, the imaging device 602 is coupled to the support structure 614 at the joined upper bisection point 626 and faces an upper surface of the platform 616, the imaging device 604 is coupled to the support structure 614 at the joined lower bisection point 626 and faces the lower surface of the platform 616, the imaging device 606 is coupled to a central region of a first side of the rectangular section 622 and faces a first lateral side of the platform 616, the imaging device 608 is coupled to a central region of an opposing second side of the rectangular section 622 and faces a second lateral side of the platform 616, the imaging device 610 is coupled to a central region of a first side of the rectangular section 624 and faces a third lateral side of the platform 616, and the imaging device 612 is coupled to a central region of an opposing second side of the rectangular section 624 and faces a fourth lateral side of the platform 616.

In some embodiments, particular sets of imaging devices may be arranged with optical axes that are in parallel with or perpendicular to each other. For example, in the illustrated embodiment, the imaging devices 602, 604 face each other, the imaging devices 606, 608 face each other, and the imaging devices 610, 612 face each other. Correspondingly, in this example, the optical axes (e.g., as defined by a respective imaging sensor) of the imaging devices 602, 604 can be substantially parallel, the optical axes of the imaging devices 606, 608 can be substantially parallel, and the optical axes of the imaging devices 610, 612 can be substantially parallel. Additionally, the optical axis of the imaging device 602 can be substantially perpendicular to the other imaging devices (except the imaging device 604), the optical axis of the imaging device 604 can be substantially perpendicular to the other imaging devices (except the imaging device 602), the optical axis of the imaging device 606 can be substantially perpendicular to the other imaging devices (except the imaging device 608), the optical axis of the imaging device 608 can be substantially perpendicular to the other imaging devices (except the imaging device 606), the optical axis of the imaging device 610 can be substantially perpendicular to the other imaging devices (except the imaging device 612), and the optical axis of the imaging device 612 can be substantially perpendicular to the other imaging devices (except the imaging device 610).

Although the illustrated mounting positions of the imaging devices 602, 604, 606, 608, 610, 612 relative to one another can be advantageous, in some configurations, arrays of imaging devices for imaging different sides of an object can be reoriented relative the illustrated positions of FIG. 17 and still remain configured to acquire image data from a respective side of an object. Similarly, while there are advantages (e.g., increased acquisition speed) to having six imaging devices 602, 604, 606, 608, 610, 612 each acquiring image data from a respective side of an object (e.g., the six sided object 618), some arrangements can include a different number or configuration of imaging devices or may utilized other fixed or movable mirrors to allow a particular imaging device to acquire images of multiple sides of an object (e.g., as similarly discussed relative to FIG. 9A). For example, a fixed mirror (e.g., the mirror 226) can be used to avoid a need to use the imaging device 608, and another mirror can be used to avoid a need to us the imaging device 612. Correspondingly, a different imaging device (e.g., the imaging device 602), by a reorienting of the associated movable mirror, can utilize the fixed mirror to acquire image data from one or more of the object sides associated with the imaging devices 608, 612 (e.g., similarly to the imaging system 220).

In some embodiments, an imaging device that is dedicated to acquire images of a particular side of an object (e.g., as in the imaging system 600) can be configured to acquire images only of that side of the object. In some embodiments, an imaging device can be dedicated to acquire images of multiple sides of an object, including with overlapping acquisition areas relative to other imaging devices included in the same system. In some embodiments, an imaging device can be configured to acquire a single image that encompasses an entire side of an object (e.g., an entire side of a presented box). In some embodiments, an imaging device can be configured to acquire single images of a smaller portion of a side of an object, with the potential to acquire one or more images of a particular region of interest or to acquire multiple adjacent, overlapping, or other images of the same side of the object via control of a movable mirror.

In this latter regard, for example, the FOV of each imaging device 602, 604, 606, 608, 610, 612 in the illustrated arrangement is substantially smaller than (e.g., less than 25% of) the surface area of a respective side of the object 618. This arrangement may, for example, allow for the acquisition of a high resolution image of a particular region of interest on the object 618 or of a composite final image of a side of the object 618, including as described below or using other approaches described above (e.g., relative to FIGS. 10 and 15).

For example, an imaging device, such as imaging device 606 can be used to acquire an image of the entire surface of the side of the object (that the imaging device faces, for example) by successively acquiring image data for different spatial locations of the corresponding FOV. In particular, the imaging device 606 can utilize the moveable mirror (e.g., move the mirror) to acquire image data of the FOV 632, then subsequently, the imaging device 606 can utilize the moveable mirror (e.g., move the mirror) to translate the FOV 632 (indicated as FOV 632' in FIG. 17) to acquire image data of the FOV 632 at a different location. This process can proceed iteratively (e.g., movement of the mirror and FOV 632 followed by acquisition of image data at each location) until image data is acquired for the entire surface of the side of the object 618. In some embodiments, a similar process can alternatively (or additionally) be used to acquire multiple images of an entire region of interest (e.g., only part of a side of the object 618). As also noted above, in some cases, successively acquired images may be adjacent to each other, as shown with the FOVs 632, 632'. In some cases, successively acquired images may also overlap or may be spaced apart from each other on a particular object.

In some embodiments, a set of images (each image of which is also referred to herein as a "sub-image") can be combined together to provide a composite representation (e.g., a composite image) of a particular object or region of interest. In some embodiments, sub-images can be stitched together (e.g., using appropriate edge detection or image-matching algorithms) so that a high resolution final image of a particular side of the object or other region of interest can be generated. In some cases, this procedure can be completed for each imaging device of an array (e.g., as in the imaging system 600) to acquire image data and to generate a high resolution for each side of the object or for another set of multiple regions of interest.

In some cases, an imaging device can implement a predesignated image acquisition sequence that spans a predetermined region of interest. In other words, a predefined imaging region, such as an area that can be larger than the FOV of the imaging device at a particular imaging distance, can be imaged using the iterative process described above. In this way, for example, the imaging device can automatically compensate for various sized objects (e.g., objects having different heights, or different positioning of respective objects), and may prevent the need for the imaging device to first locate edges of the side of the object. Other approaches to acquiring multiple images of a particular area can also be utilized, including as discussed above relative to FIGS. 10 and 15, and so on.

Although the FOV 632 is illustrated, and the other FOVs of the other imaging devices 602, 604, 606, 608, 610, 612 were described as being smaller than a respective side of the object, in other configurations, the FOV can be different sizes. For example, the FOVs can be even smaller than those illustrated, and can be larger than those illustrated such as being the same size or larger than a particular side of the object 618. In the illustrated embodiment of FIG. 17, each imaging device 602, 604, 606, 608, 610, 612 includes a two-axis controllable mirror configured to translate a respective FOV (e.g., the FOV 632) in two dimensions within a plane defined by a respective side of the object 618. However, in alternative configurations, some of the imaging devices 602, 604, 606, 608, 610, 612 may be configured for operation with other mirror arrangements. For example, one or more of the imaging devices 602, 604, 606, 608, 610, 612 may have a larger FOV than illustrated, at least in one dimension, and may be configured for operation with a one-axis moveable mirror. For example, an FOV may exceed an expected largest height or other dimension of an object to be imaged. In this way, for example, the one-axis controllable mirror can be adjusted in orientation to scan an FOV in one dimension across a relevant surface or other feature, while still allowing the relevant imaging device to acquire image data for the entire surface or other feature.

As also noted above, the imaging device 604 is positioned below the platform 616, and thus the platform 616 can be configured to allow light to pass from the lower side of the object 618 to the imaging sensor of the imaging device 604. As such, the platform 616 can be transparent, or can have apertures, such as a hole(s), or slots, so that light may appropriately pass through (e.g., unimpeded by the platform 616 over a region of interest) to the imaging device 604.

Although the illustrated embodiment of FIGS. 17 and 18 depicts a stationary support cage 614 and platform 616, in alternative embodiments a similar configuration (e.g., with an array of imaging devices and controllable mirrors similar to the imaging system 600) could be utilized for movable platforms (e.g., conveyors, transport systems, etc.). For example, with the appropriate modifications to the support cage 614 or by utilizing different support structures, such as the tunnel 222, an array of imaging devices configured similarly to a plurality of the imaging devices 602, 604, 606, 608, 610, 612 could be configured to acquire image data for each side of an object as it travels through the modified support cage 614. In some cases, a moving platform or support portion associated therewith can be transparent so that an imaging device positioned under the moving platform can receive light from the underside of the object as the object travels through an imaging area.

In some embodiments, an imaging system can be configured to simultaneously (i.e., at the same time or over a common time interval) acquire images of multiple sides of an object, including as part of a single trigger event. For example, returning to FIG. 17, each of the imaging devices 602, 604, 606, 606, 608, 610 can be configured to acquire a respective set of one or more images over a common time interval. Similarly, in some cases, the imaging devices 602, 604, 606, 608, 610 can be configured to acquire the images based on a single trigger event. For example, based on a sensor (e.g., a contact or presence sensor or an imaging devices) determining that the object 618 has been placed on the platform 616, the imaging devices 602, 604, 606, 608, 610 can simultaneously acquire images of the respective sides of the object 618. As another example, in some cases, a trigger event may result from an operator input. For example, after placing the object 618 on the platform 616, an operator may step out of the fields of view of the imaging devices 602, 604, 606, 608, 610 and then electronically indicate that image acquisition should begin.

Figure 19:
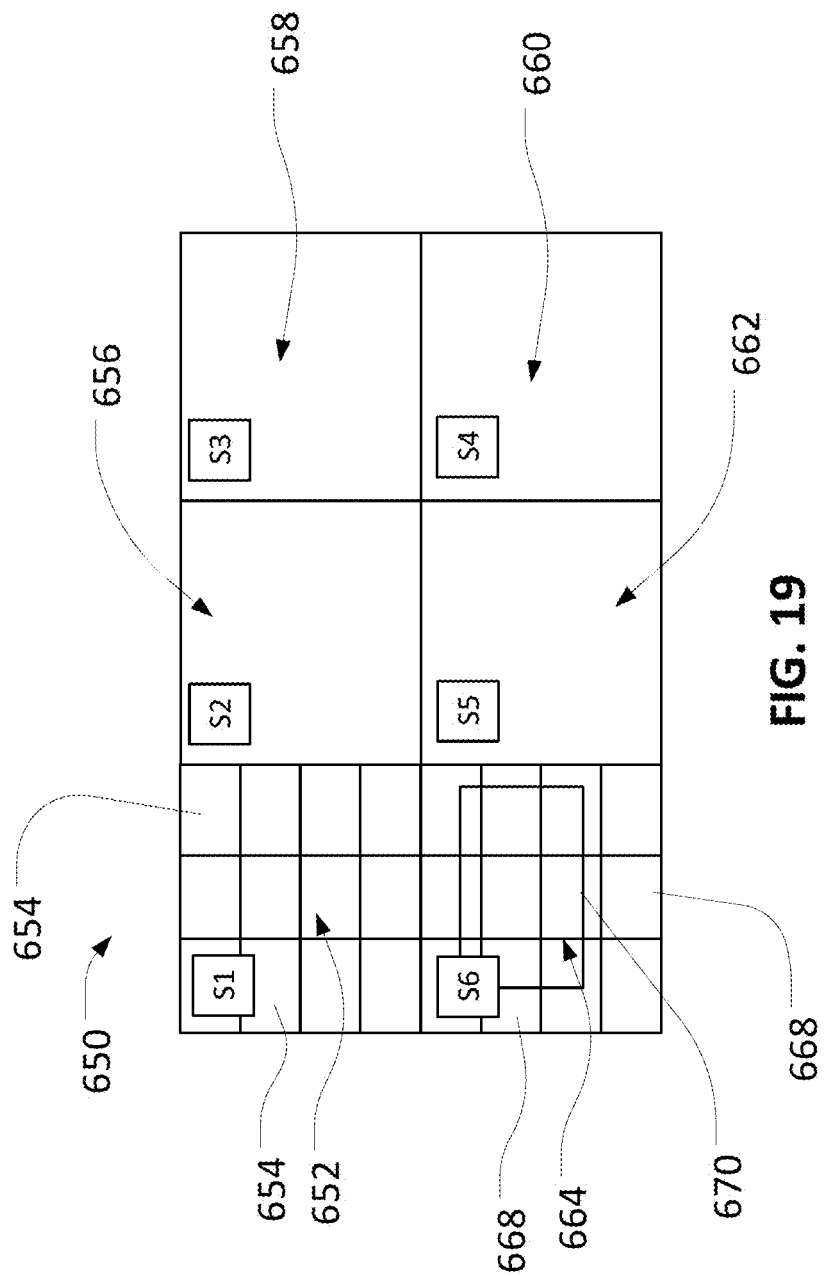
FIG. 19 is a schematic view of an example composite image generated using the imaging system of FIG. 17.

Returning to the discussion above relative to acquisition of multiple images of a region of interest, FIG. 19 shows an example of a composite (e.g., stitched) image 650 that can be generated using the imaging devices 602, 604, 606, 608, 610, 612. For example, an image 652 formed from a plurality of sub-images 654 is of a first side (S1) of an object, an image 656 is of a second side (S2) of the object, an image 658 is of a third side (S3) of the object, an image 660 is of a fourth side (S4) of the object, an image 662 is of a fifth side (S5) of the object, and an image 664 formed from a plurality of sub-images 668 is of a sixth side (S6) of the object. As described above, the sub images 654 can be stitched together or otherwise combined to form (i.e., generate) the composite image 654. Similarly, the sub-images 668 can also be stitched together or otherwise combined to form the composite image 664. As shown, image 664 was acquired using a predetermined imaging sequence, such as described above, and includes an outline 670 of edges of the object that are only in a subset of the plurality of sub images 668. Thus, the predetermined imaging sequence can compensate for various sizes of boxes without first finding edges. In other embodiments, other approaches to creating composite images are possible, including as discussed above relative to other implementations.

The images 654, 656, 658, 660, 662, 664, which each correspond to a particular side of the object, can be stitched or otherwise combined together to generate the composite image. Although the composite image 650 is illustrated as being represented in a relatively compact orientation, with the various sub-images organized in columns and rows, other representations can be utilized. For example, a two-dimensional deconstruction of a box (e.g., the object 618) with the central image being of the bottom side of the box could be constructed and, as appropriate, presented to a user for relatively quick analysis. Additionally, different sides of an object can be arranged within a composite image in a variety of ways that may or may not correspond to a simple unfolding or other manipulation of the object. In some cases, as with any other image discussed herein, a composite image in its entirety, each (or one or more) image of particular sides of an object, or each (or one or more) sub-image can be processed to locate or analyze (e.g., decode) a symbol.

In some embodiments, an imaging system can be configured to produce a three-dimensional (3D) representation of a particular object. In this regard, for example, distance measurement techniques (e.g., time-of-flight sensing or other measurement techniques described above or known in the art) can be combined with various imaging techniques described herein that utilize controllable mirrors, and a 3D representation of an object or a particular region of interest on the object can be generated accordingly. For example, relative to the imaging system 600, one or more ToF or other similar sensors can be configured to identify surface features of the object 618, including for one or more (e.g., all) of the sides of the object 618. In some cases, the surface features can then be overlaid onto images of the sides of the object 618, as acquired by the imaging devices 602, 604, 606, 608, 610, 612, to provide a comprehensive, all-sided, 3D representation of the object 618. In some embodiments, a ToF or other distance sensor can be included in an imaging device that includes one or more imaging sensors (e.g., any of the imaging devices 602, 604, 606, 608, 610, 612 or other imaging devices discussed herein). In some embodiments, a ToF or other distance sensors can be separate from an imaging device that is used to acquire images of a particular side of an object or to execute other imaging operations discussed herein.

Figure 20:
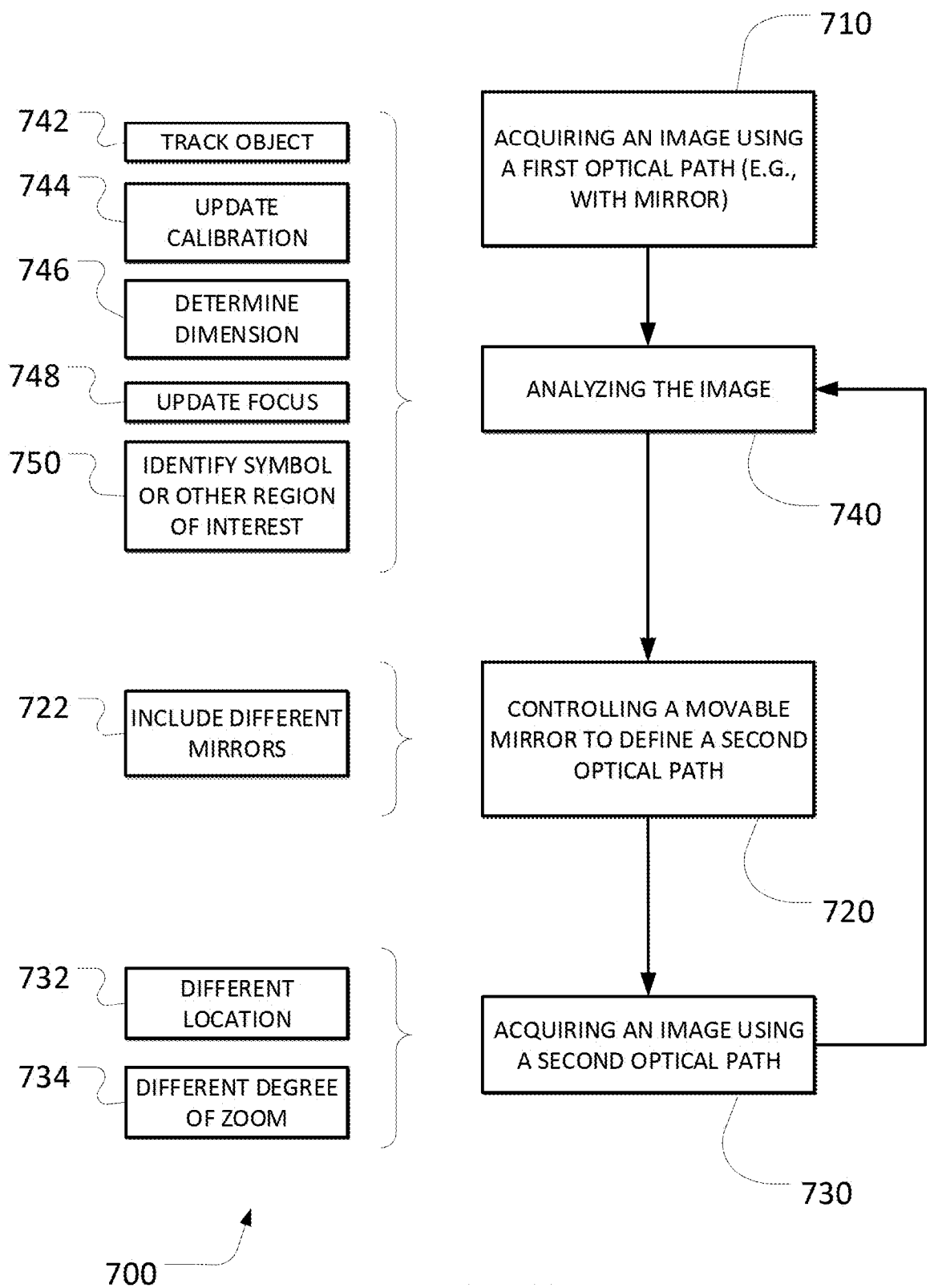
FIG. 20 is a flowchart of a process for acquiring images of objects using one or more controllable mirrors.

As generally noted above, discussion herein of particular vision systems, mirror arrangements, imaging devices, and so on is intended to also disclose methods of assembling, configuring, calibrating, and otherwise using such systems, arrangements, devices and so on. In this regard, FIG. 20 illustrates an example process 700 according to some embodiments of the disclosure, that generally includes using controllable mirrors to acquire images, as variously discussed above. In general, aspects of the process 700 can be implemented using one or more of the imaging systems discussed above, alone or in combination with each other, or can be implemented using other imaging systems that include one or more imaging sensors, a mirror arrangement with at least one controllable mirror, and a control device (e.g., a specially programmed general purpose computer) that is configured to control image acquisition with the one or more imaging sensors and movement of the at least one controllable mirror.

In particular, in the illustrated example, the process 700 includes acquiring 710 an image using a first optical path (e.g., any of the optical paths discussed above), controlling 720 a movable mirror to define a second optical path (e.g., any other of the optical paths discussed above), and acquiring 730 an image using the second optical path.

In some cases, a second optical path can be different from a first optical path, including relative to overall path length, incidence location or angle on an object or target area, or in other ways. In some cases, multiple optical paths may both include one or more movable mirrors (e.g., the same movable mirror) or may both be associated with a single imaging sensor or single imaging device. In some cases, different optical paths can include 722 different mirrors, (i.e., a mirror that is included in a first or second optical path may sometimes not be included in the second or first optical path). In some case, different included 722 mirrors can be fixed mirrors, including as discussed relative to FIGS. 5A and 16A.

Correspondingly, different acquired 710, 730 images can generally include different subjects. For example, in some cases a movable mirror can be controlled 720 to define a second optical path so that one or more images can be acquired 730 of a different location 732 relative to a previous image, including to span an area of a conveyor (e.g., as discussed relative to FIGS. 3 and 7A), to track movement of an object or acquire 710, 730 images along a path of travel of an object (e.g., as discussed relative to FIGS. 1A-1C and 4A-4C), or to acquire 710, 730 images of multiple objects or multiple portions of a particular object (e.g., as discussed relative to FIGS. 9A-11, 15, 16A, and 17-19). As further examples, a movable mirror can be controlled 720 to define a second optical path to acquire 710, 730 images with different degrees of zoom 734, or to otherwise accentuate a particular region of interest (e.g., as discussed generally herein).

In some cases, one or more acquired 710, 730 images can be analyzed 740 (e.g., automatically, using a control device). For example, a first image can be analyzed 740 in order to track 742 an object (e.g., as discussed relative to FIGS. 1A-1C), to update 744 a calibration (e.g., as discussed relative to FIG. 12), to determine 746 a dimension of an object or another dimension (e.g., based on analysis of multiple images, as discussed relative to FIG. 6) to determine 748 an updated focus value (e.g., as discussed relative to FIGS. 11, 13, and 14), to identify 750 a symbol or other region of interest (e.g., as discussed generally herein), or for other purposes.

In some cases, as discussed in further detail in the examples above, controlling 720 a mirror to define an optical path can be based on analysis 740 of an image, although a mirror can also be controlled 720 separately from image analysis 740 in some implementations. In some cases, as also discussed in further detail in the examples above, analysis 740 of an image may sometimes occur after multiple images have been acquired and may sometimes include analysis 740 of multiple images (e.g., for multi-side imaging and generation of composite images, as discussed relative to FIGS. 8A-9B, 14, 15). In some cases, analysis 740 of images may include analysis of images that are acquired 710, 730 using multiple imaging sensors (e.g., as discussed relative to FIGS. 8A-9B and 17-19).

Figure 21:
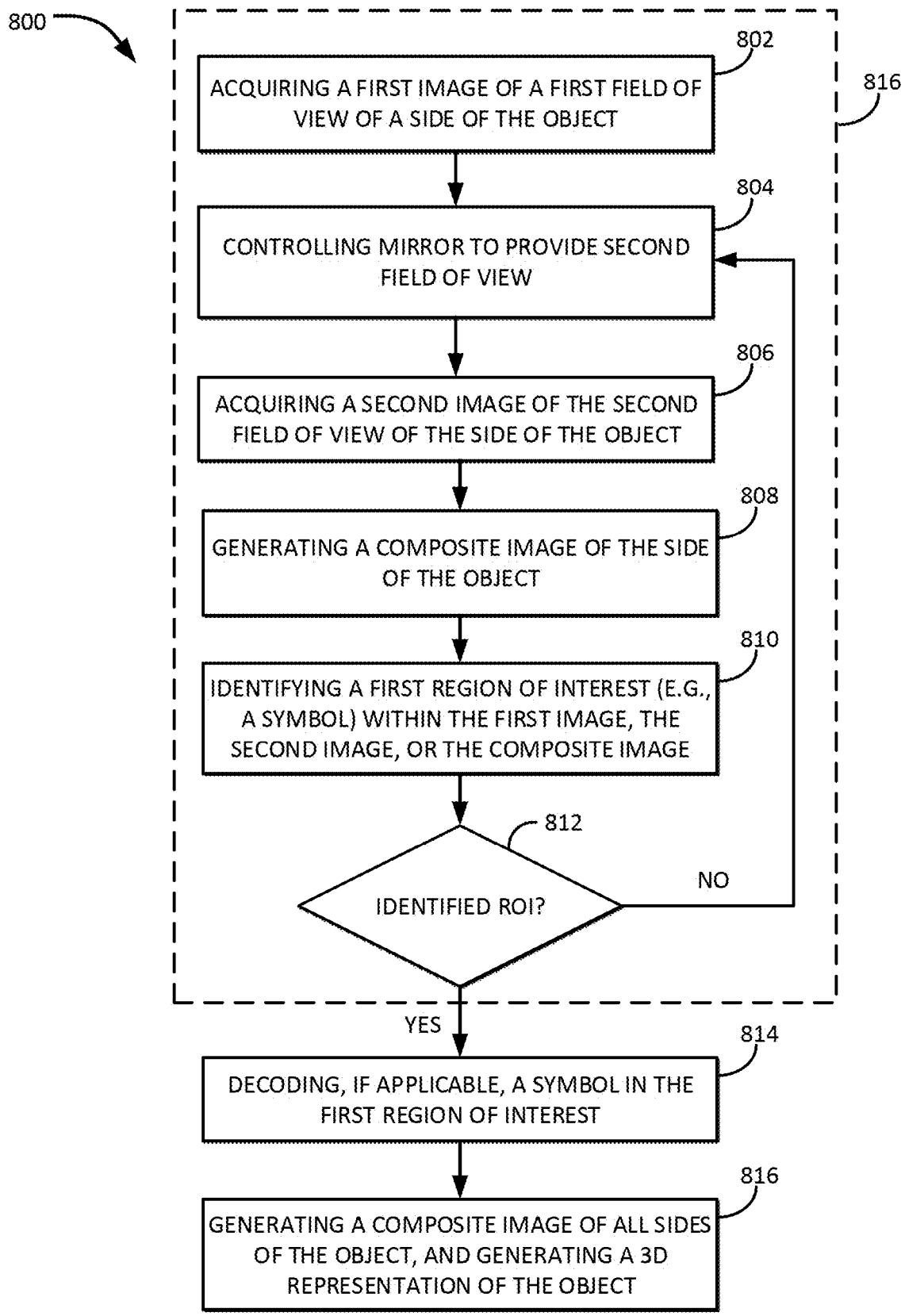
FIG. 21 is a flowchart of a process for scanning multiple sides of an object.

As a more detailed example, FIG. 21 shows a flowchart of a process 800 for scanning multiple sides of an object, which can be implemented using one or more suitable computing devices (e.g., the computing devices of any of the previously described imaging devices). For example, parts (or all) of the process 800 can be implemented using various suitable computing devices of the configurations of the previous imaging systems, such as, for example, the imaging system 20 of FIGS. 1A-1C, the imaging system 40 of FIG. 2, the imaging system 210 of FIGS. 8A and 8B, the imaging system 220 of FIG. 9A, the imaging system 600 of FIGS. 17 and 18, etc.

At 802, the process 800 can include a suitable imaging device acquiring a first image of a first FOV of a side of an object (e.g., a six-sided box or other structure). In some cases, the first FOV is smaller than a surface area of the side of the object, while in other cases, the first FOV is larger than or the same size as a surface area of the side of the object. In some cases, block 802 of process 800 can also include acquiring 3D data of the first FOV (e.g., using a ToF sensor). In some cases, 3D information can be obtained without necessarily acquiring an image, although such 3D information may correspond to a particular image.

At 804, the process 800 can include a suitable computing device (e.g., of an imaging device as disclosed herein) controlling a moveable mirror (e.g., a two-axis movable mirror) to move or change its orientation to provide a second FOV for one or more imaging sensors of a particular imaging device. In some configurations, the first FOV can partially or wholly overlap with the second FOV (e.g., with different centers or degrees of zoom). In some configurations, the first FOV may not overlap with the second FOV.

At 806, the process 800 can include a suitable imaging device (e.g., the same imaging device as at block 802) acquiring a second image of the second FOV. In some cases, block 806 of process 800 can also include acquiring three-dimensional ("3D") data of the second FOV or 3D information may be obtained without necessarily acquiring an image).

In some cases, as noted above, acquired images may include an entirety of a side of an object. In some cases, acquired images may include only part of a side of an object. In some cases, at 808, the process 800 can include generating a composite image of a side of an object. In some cases, such as described above with regard to FIG. 19, blocks 804, and 806 can be repeated (e.g., iteratively) for additional FOVs of the respective side of the object (e.g., to acquire a third image of a third FOV including 3D information, a fourth image of a fourth FOV including 3D information, etc.). For example, the suitable computing device can follow a predetermined imaging area (e.g., received from a user input) where the FOVs are defined within the predetermined imaging area. Thus, this iterative process can proceed until the suitable computing device has acquired images from FOVs that span the entire predetermined imaging area.

In some cases, generating a composite image can include stitching together multiple images (e.g., the first image and the second image and others), which can be facilitated by locating edges or other features within each image. Additionally, the 3D information as acquired from each FOV can be appropriately merged with a corresponding composite image. For example, some 3D information of a FOV can be omitted if the corresponding portion of the image of the FOV has been omitted in the composite image. In some cases, 804 and 806 (and 808) can be omitted if, for example, the first FOV is larger than the side of the object.

At 810, the process 800 can include a suitable computing device (e.g., of an imaging device as disclosed herein) identifying a first region of interest within the first image, the second image, the composite image, (or the other acquired images used to form the composite image). In some cases, once the region of interest is identified, this region of interest (e.g., the pixels defined by this region) can be extracted. In some configurations, the region of interest is a symbol (e.g., a barcode).

At 812, the process 800 can include a suitable computing device (e.g., of an imaging device as disclosed herein) determining whether or not the first region of interest (e.g., a barcode to be decoded) has been identified. For example, if the suitable computing device determines that the first region of interest has not been identified, then the process 800 can proceed back to block 804. In some configurations, the suitable computing device can increase the overlap between respective FOVs (e.g., the first and second FOVs), which can include decreasing the respective movements of the movable mirror. In other cases, the suitable computing device can, as appropriate, such as if the imaging device is configured as the imaging device 400 of FIG. 14, adjust the zoom (e.g., decrease the zoom) thereby adjusting the spatial footprint of each FOV (e.g., decreasing the FOV). This can, for example, create a higher resolution composite image (formed of respective sub-images), which can increase the likelihood (e.g., after a failure) of identifying and locating the first region of interest (and subsequent decoding of the first region of interest as appropriate).

At 812, if the computing device determines that the first region of interest (e.g., a barcode to be decoded) has been identified, the process 800 can proceed to block 814 to decode one or more features in the first region of interest. In this regard, for example, a variety of known image analysis (e.g., decoding) tools can be used.

As shown, blocks 802-812 can define sub-process 816. The sub-process 816 can be completed for multiple sides (e.g., each side) of an object, such as a six-sided object. In some configurations, such as for the imaging system 600 of FIGS. 17 and 18, each side can be associated with a respective imaging device that can acquire image(s) of the respective side. Alternatively, in other configurations, a particular imaging device may be associated with multiple sides of an object (e.g., as shown in FIG. 9A).

At 816, the process 800 can include a suitable computing device (e.g., of an imaging device as disclosed herein) generating a composite image of all (or some) sides of the object. For example, after multiple iterations of the sub-processes 816 have been completed for each (desired) side of the object (e.g., six sides of the object), which can include generating a composite image of each (desired) side of the object, these images can be combined into a further composite image that includes images of the desired sides of the object. In some configurations, this further composite image can be analyzed for a region of interest (e.g., a symbol), and if the first region of interest is identified, the computing device can decode the region of interest (as applicable).

In some cases, including as shown at 816, the process 800 also includes generating a 3D representation of the object, including as may proceed using any variety of known techniques. In some cases, the computing device can identify edges in each composite image (or single image) of a side of the object and combine the images (e.g., along adjacent edges) to generate a 3D representation of the object.

Figure 22:
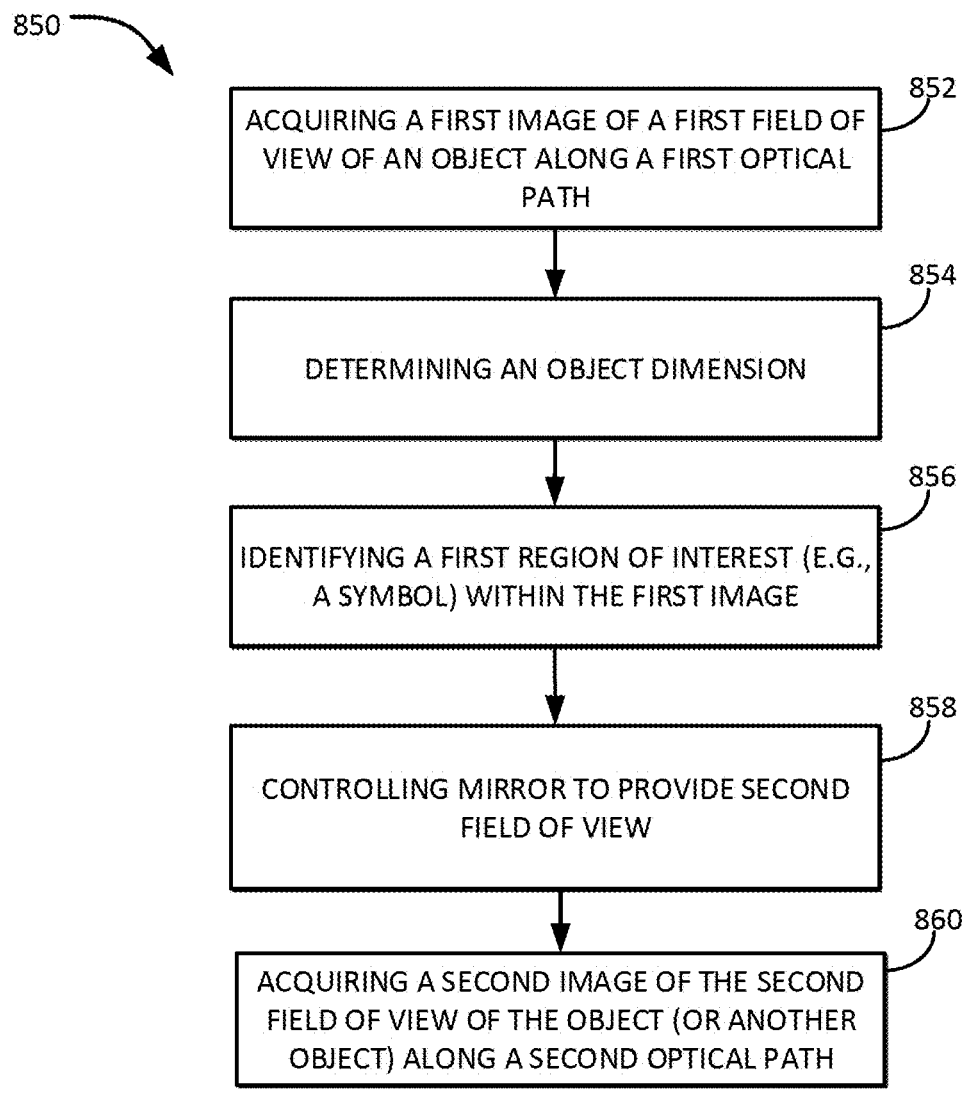
FIG. 22 is a flowchart of a process for acquiring multiple fields of view of one or more objects.

FIG. 22 illustrates another process 850 for acquiring multiple FOVs of one or more objects, including objects traveling along a transport system, such as a conveyor system, which can be implemented using one or more suitable computing devices (e.g., the computing devices of any of the previously described imaging devices). For example, parts (or all) of the process 850 can be implemented using various suitable computing devices of the configurations of the previous imaging systems, such as, for example, the imaging system 20 of FIGS. 1A-1C, the imaging system 40 of FIG. 2, the imaging system 78 of FIG. 4A, the imaging system 110 of FIG. 5A, the imaging system 140 of FIG. 6, the imaging system 180 of FIGS. 7A and 7C, the imaging system 250 of FIG. 11, the imaging system 280 of FIG. 12, the imaging system as illustrated and described for FIG. 13, the imaging system as illustrated and described for FIG. 14, the imaging system as illustrated and described for FIG. 15, the imaging system 500 of FIGS. 16A-16C, etc.

At 852, the process 850 can include an imaging device disclosed acquiring a first image of a first field of view of an object along a first optical path. In some cases, the first optical path can include a fixed mirror (e.g., or a rotatable mirror that is locked in a particular orientation) that defines a first FOV. In some configurations, the first optical path is further defined by a moveable mirror (e.g., as attached to the imaging device used to acquire the first image). In some configurations, the first optical path may not be defined by any fixed mirrors or other mirrors besides a moveable mirror associated with the imaging device, such as the optical path 516 of FIG. 16A. In some embodiments, the first optical path can be defined by a plurality of fixed mirrors, such as the optical path 518 of FIG. 16A or the optical path 122 of FIG. 5A.

At 854, the process 850 can include a suitable computing device (e.g., of an imaging device disclosed herein) determining a dimension (e.g., a height) of an object based on sensor data. In some cases, the sensor data can include pixel dimensions from one or more images, to be used in combination with other known dimensions (e.g., a length of the first optical path), so that the suitable computing device can determine the height using trigonometric relationships (see, e.g., FIG. 6). In other cases, the sensor data can include ToF data (e.g., from a ToF sensor), data from a light curtain, distance sensor data, etc., each of which can enable the computing device to determine a height of the object relative to a surface that the object is supported by such as a transport system (e.g., a conveyor).

In some cases, at 856, the process 850 can include a suitable computing device (e.g., of an imaging device disclosed herein), identifying a first region of interest (e.g., a symbol) within the first image. As appropriate, the computing device can attempt to decode a symbol within the first region of interest.

At 858, the process 850 can include a suitable computing device (e.g., of an imaging device disclosed herein) controlling a movable mirror to change a FOV for imaging from the first FOV (i.e., along the first optical path) to a second FOV (i.e., along a second optical path). In some configurations, parameters for the second FOV (e.g., mirrors to be included in an associated optical path) can be determined based on the dimension determined at 904. In some cases, a second FOV can be determined based on comparing a determined dimension of an object to a dimensional threshold. For example, if the determined height of the object is larger than a threshold height, the computing device can sometimes cause the moveable mirror to move so that the second optical path is longer than the first optical path (as used to acquire the first image) and, correspondingly, a FOV at the determined height may be appropriately sized for acquisition of useful images of the objects. In some cases, this can be accomplished by utilizing a plurality of fixed mirrors so that the second optical path is defined by the plurality of fixed mirrors (e.g., mirrors 504, 506 of FIG., 16A, or mirrors 114, 116, 118 of FIG. 5A). Alternatively, for example, if the determined height of the object is smaller than a threshold height, the computing device can cause the movable mirror to move so that the second optical path is not defined by any of the fixed mirrors (e.g., such as shown the optical path 518 of FIG. 16A).

In some implementations, the second FOV that is along the second optical path can include the same object that is imaged at block 852, or can include a different object (e.g., having a different height, such as a greater height than the object of block 852). In some implementations, the computing device can select the second optical path based on the location of the identified region of interest (e.g., a symbol) within the first image. For example, if the region of interest (such as a symbol) is not entirely viewable in the first image, the computing device can select a second optical path so that the FOV of the second optical path includes the entire region of interest. Similarly, if the region of interest is in the first image, but not of a sufficient quality (e.g., for decoding purposes), the computing device can select the second optical path so that the FOV of the second optical path also includes the determined region of interest, but the FOV of the second optical path is smaller than the first FOV, which can increase the image resolution needed for decoding.

At 860, the process 850 can include a suitable computing device (e.g., of an imaging device disclosed herein), acquiring a second image of the second FOV of the object (or another object) along the second optical path. The process 850 can also include a suitable computing device (e.g., of an imaging device disclosed herein), decoding a symbol of the first image, the second image, or a different image.

Figure 23B:
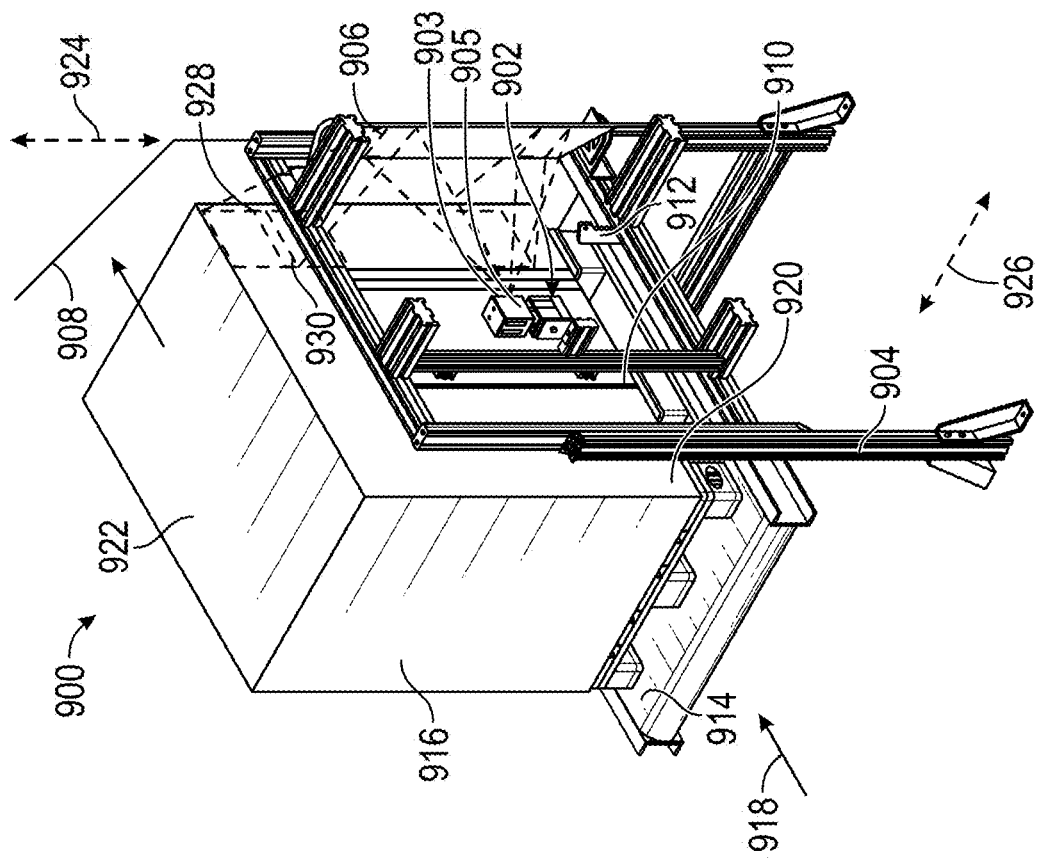
FIG. 23B is as rear isometric view of the imaging system of FIG. 23A.
Figure 23A:
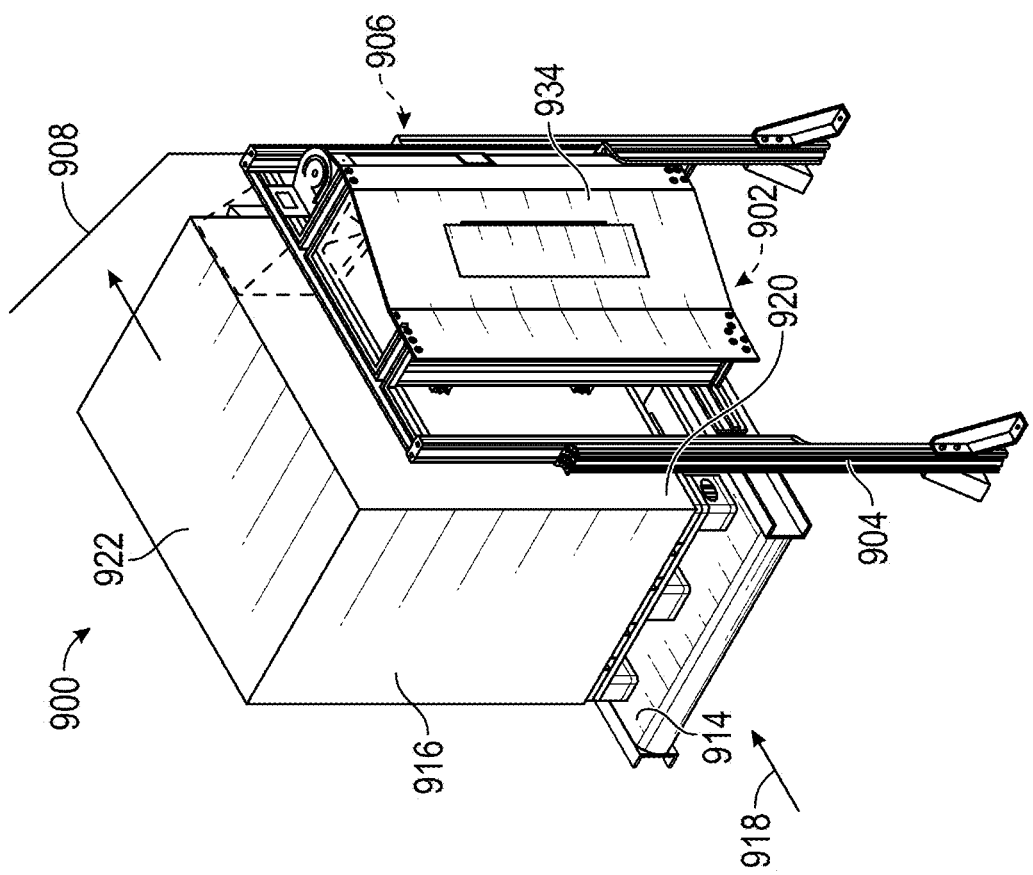
FIG. 23A is a front isometric view of another imaging system.

FIGS. 23A and 23B each illustrate an example of another imaging system 900 that is similar to, and a potential extension or modification of other imaging systems discussed above, including the imaging systems 210, 220, 500, 600. Thus, the imaging system 900 can include similar features or be configured for similar functionality as other imaging systems discussed herein, as appropriate.

As shown, the imaging system 900 includes an imaging device 902 having a control device (not shown), a support structure 904, fixed mirrors 906, 908, an illumination source 910, a proximity sensor 912, and a transport system 914 that supports and moves an object 916 (an others) along a direction of travel 918. Any of the components of the imaging system 900 can be in communication with the control device of the imaging device 902, as appropriate. For example, the illumination source 910, the proximity sensor 912, and the transport system 914 can be in communication with the control device of the imaging device 902. In some cases, the imaging device 902 can be implemented in a similar manner as the other previously described imaging devices, and can include any features (or combination of features) as described with references to these imaging devices described above. For example, the imaging device 902 can include at least one imaging sensor, at least one lens arrangement, and at least one control device (e.g., a processor device) configured to execute computational operations relative to the imaging sensor(s) or other modules. In addition, the imaging device 902 can also include a controllable mirror 903 (e.g., a one axis, two axis, etc., controllable mirror) that can be configured as similarly described for the controllable mirrors of other examples herein. In this way, the imaging device 902 can selectively acquire imaging data from different FOVs depending on the orientation of the controllable mirror.

In some configurations, the controllable mirror 903 of the imaging device 902 can be positioned within the housing of the imaging device 902, while in other configurations the controllable mirror 903 can be positioned externally to a housing of an imaging device (e.g., as part of an attachment for the imaging device 902), and even remotely from such a housing. For example, including when the controllable mirror 903 is external to the housing of the imaging device 902, the controllable mirror 903 can be positioned within a mirror housing that can be removably coupled to the housing of the imaging device 902 (e.g., as an attachment thereto). In some cases, in addition to the controllable mirror 903, the mirror housing can also support other components, including a distance sensor 905, an aimer, etc. In some embodiments, the mirror housing can be coupled to the housing of the imaging device 902 at a front side of the imaging device 902 that includes a lens arrangement of the imaging device 902. In addition, the mirror housing can be coupled to the housing of the imaging device 902 so that an optical axis of the imaging device 902, prior to redirection by the controllable mirror 903, intersects with the mirror housing when the mirror housing is coupled to the housing of the imaging device 902. Accordingly, for example, when the mirror housing is coupled to the housing of the imaging device 902, the optical axis of the imaging device 902 (prior to being redirected by the controllable mirror 903), is aligned with the controllable mirror 903 (e.g., so that the optical axis of the imaging device 902 would intersect with the controllable mirror 903). In some cases, the distance sensor 905 that is positioned within the mirror housing can utilize the controllable mirror 903 for directing and reflecting signals form the distance sensor 905, as described herein. In addition, including when the mirror arrangement includes an aimer, the aimer also can utilize the controllable mirror 903 for directing and reflecting aiming patterns (or other illuminations) off the controllable mirror 903.

In some embodiments, when the mirror housing is coupled to the imaging device 902, the components supported by the mirror housing (e.g., the controllable mirror 903, the distance sensor 905, the aimer, etc.) can electrically connect to the control device of the imaging device 902. For example, the mirror housing can include a circuit board that is electrically connected to the controllable mirror 903 (for example, via the actuators that drive the controllable mirror 903), the distance sensor 905, and the aimer, and thus when the mirror housing is coupled to the imaging device 902, the circuit board electrically connects to the control device of the imaging device 902. In this way, the control device of the imaging device 902 can directly control movement of the controllable mirror 903, aspects of the distance sensor 905 (e.g., sending and receiving distance sensor signals), and aspects of the aimer (e.g., turning on and off the illumination pattern). Regardless of the configuration, with the mirror housing removably coupled to the imaging device 902, imaging devices that do not have controllable mirrors, distance sensors, aimers, etc., can easily be outfitted with the mirror housing to gain the functionalities provided by the components supported by the mirror housing. Stated another way, imaging devices already in deployment can be outfitted to upgrade the functionalities of these imaging devices, without the need for replacing imaging devices.

The support structure 904 can be implemented in various ways, and provides a structural support to restrain relative movement between components of the imaging system 900. For example, the imaging device 902, the fixed mirrors 906, 908, the illumination source 910, and the proximity sensor 912 are all coupled to the support structure 904. As shown in FIG. 23A, the support structure 904 includes legs that fixedly engage a floor surface, and beams that extend between and are coupled to the legs, although a variety of other fixed or adjustable structures are possible. Both of the fixed mirrors 906, 908 are coupled to the same leg of the support structure 904, with the fixed mirror 908 extending above the fixed mirror 906. (As noted above, however, some embodiments may include only the fixed mirror 906, or other fixed-mirror arrangements). The imaging device 902 is coupled to a vertical beam of the support structure 904, and is positioned between the legs of the support structure 904. Additionally, the imaging device 902 is positioned upstream from the fixed mirrors 906, 908, relative to the direction of travel 918. Although the illustrated configuration of support structure 904 is one specific implementation, in other embodiments, the support structure 904 including the components of the imaging system 900 coupled thereto can be implemented in other ways. For example, in some configurations, the fixed mirror 906 can be positioned upstream of the imaging device 902 relative to the direction of travel 918 (e.g., with the imaging device positioned downstream from the fixed mirror 906).

Each of the fixed mirrors 906, 908 are angled (e.g., obliquely) relative to the direction of travel 918 of the transport system 914 so that each fixed mirror 906, 908 faces one or more sides of the object 916 as the object 916 travels along the transport system 914 along the direction of travel 918. For example, the fixed mirror 906 faces a lateral side 920 of the object 916, and is angled to direct a FOV from the imaging device 902 onto the lateral side 920, to allow the imaging device 902 to acquire imaging data of the lateral side 920. In contrast, the fixed mirror 908 faces an upper side 922 of the object 916, and is angled to direct a FOV from the imaging device 902 onto the upper side 922, to allow the imaging device 902 to acquire imaging data of the upper side 922 of the object 916.

Although FIGS. 23A and 23B illustrate each of the fixed mirrors 906, 908 as being configured to face only their respective side of the object 916 (e.g., to acquire imaging data of only their respective side of the object), in other configurations, the fixed mirrors 906, 908 can face (e.g., can be angled obliquely relative to, such as at 45 degrees relative to) multiple sides of the object 916. In this way, for example, the imaging device 902 can sometimes acquire images of multiple sides of the object 916, via only one of the fixed mirrors 906, 908 (e.g., a FOV of the imaging device 902 can be directed by the relevant mirror 906, 908 to simultaneously or sequentially include at least two different sides of the object 916). Further, in some cases a different number of fixed mirrors can be provided (e.g., only the fixed mirror 906).

In some embodiments, although the fixed mirrors 906, 908 operate as fixed during image acquisition (i.e., are immobile relative to the relevant imaging sensor), the angle of the fixed mirrors 906, 908 relative to the direction of travel 918 can be adjusted and subsequently locked, to fix the current orientation of the fixed mirrors 906, 908 for particular applications. For example, the fixed mirror 906 can be rotated about a vertical axis 924 of the support structure 904, which is substantially perpendicular (e.g., deviating from perpendicular by less than 5 degrees to the direction of travel 918, or about one or more other axes), and subsequently locked to adjust the fixed orientation of the fixed mirror 906. Similarly, the fixed mirror 908 can also be rotated about one or more applicable axes (and then locked, as appropriate) to adjust the fixed orientation of the fixed mirror 908.

In the embodiment shown, the FOV of the imaging device 902 is directed, via the moveable mirror 903, to different locations on the fixed mirror 906, thereby aligning the FOV to different locations on the lateral side 920 of the object 916. In this way, both the moveable mirror 903 and the fixed mirror 906 can collectively define the FOV of the imaging device 902 for any given image acquisition. Further, with movement of the moveable mirror 903, the FOV can be moved to different locations on the lateral side 920 of the object 916 (or elsewhere) to acquire images these different locations. The imaging device 902 can interact with the fixed mirror 908 in a similar manner as the fixed mirror 906, to direct a FOV for a particular image acquisition to different locations on the upper side 922 of the object 916.

In the embodiment shown, the fixed mirror 906 (and the fixed mirror 908) have a greater surface area than the projection of the FOV at the fixed mirror. In this way, the imaging device 902 can acquire multiple images via different locations along the fixed mirror 906, with a corresponding plurality of FOVs that collectively span the entire surface of the lateral side 920 of the object 916. Correspondingly, a higher resolution representation of the surface of the lateral side 920 of the object 916 can be acquired (e.g., as compared to an image with a single FOV spanning the entire surface of the lateral side 920 of the object 916), which can increase the likelihood of identifying regions of interest (e.g., barcodes) and also increase the likelihood of decoding symbols in the identified regions of interest. In some cases, the fixed mirror 906 has a height along the vertical axis 924 (e.g., defined between opposing ends of the fixed mirror 906), which can be less than or equal to the height of the object 916 (e.g., the height of the lateral side 920 of the object 916 along the vertical axis 924), or a maximum expected height of an object to be scanned via the imaging device 902. Similarly, the fixed mirror 908 can have a width that is substantially less than the width of the object 916 (e.g., the width of the upper side 922 of the object 916 along a transverse axis, such as the axis 926 described below, that is substantially perpendicular to the direction of travel 918), or a maximum expected width of the object. Thus, for example, a relatively small fixed mirror can be used in combination with a movable mirror, to acquire images of a relatively large area.

In the illustrated embodiment, the illumination source 910 is configured to directly illuminate the lateral side 920 of the object 916, which can allow for better images of the object 916. As shown, the illumination source 910 is coupled to the support structure and is positioned upstream from the fixed mirrors 906, 908, and the imaging device 902 relative to the direction of travel 918. In this way, the illumination source 910 can illuminate at least a portion of the object 916 for imaging, as the object 916 travels along the transport system 914. In some configurations, the illumination source 910 is configured to emit polarized light, or light of another particular type. Correspondingly, the imaging device 902 can filter out other types of light except the light emitted by the illumination source 910 (e.g., using polarizing filter optics), which can also help to provide for better images of the side of the object 916. For example, the illumination source 910 can emit polarized light having a polarized state, and the imaging device 902 can be configured to only receive polarized light of a different polarized state. As a more specific example, a first polarizing filter can be coupled to a surface of the imaging device 902 that has a plurality of slits oriented vertically (or horizontally), and a second polarizing filter can be coupled to a surface of the illumination source 910 that has a plurality of slits oriented 90 degrees offsetted from the orientation of the slits of the first polarizing filter (e.g., horizontally orientated slits, or vertically oriented slits when the first polarizing filter has horizontally oriented slits). Thus, the first and second polarizing filters form a cross-polarization configuration. In this way, the imaging device 902 can only (largely) receive light that originates from the illumination source 910, and additionally, the use of the polarized light can reduce glare seen by the imaging device 902 (e.g., during an image acquisition)—especially in the cross-polarized configuration. However, in other embodiments, a variety of types of known illumination sources can be used.

In some configurations, the support structure 904 can include a cover 934 that shields the imaging device 902 (and the illumination source 910, in some cases) from light that may undesirably impact imaging of the side of the object 916. For example, the cover 934 is positioned so that the imaging device 902 (and the illumination source 910) are situated between the object 916 and the cover 934, which can ensure that a larger percentage of the light emitted by the illumination source 910 is received by the imaging device 902. In some embodiments, while the illumination source 910 is illustrated as directly illuminating a side of the object 916, light emitted from the illumination source 910 can reflect off the mirror 906 (or the mirror 908) to illuminate the respective side of the object 916.

In some embodiments, a variety of know devices can be used to identify the presence of an object and an imaging device can be activated (or not) on that basis. For example, the proximity sensor 912 can sense the presence of the object 916 (and other objects), as they travel along the transport system 914, including sensing a leading edge and a following edge of the object 916. The proximity sensor 912 can be implemented in different ways, including as also described above. For example, the proximity sensor 912 can be implemented as a photo eye, an array of photo eyes, a laser curtain, a dimensioner, an imaging sensor, a photoresistor, a phototransistor, etc. As shown in FIG. 23B, the proximity sensor 912 is coupled to the support structure 904 at a downstream location from the imaging device 902, the fixed mirrors 906, 908, and the illumination source 910, relative to the direction of travel. In this way, when the proximity sensor 912 senses the leading edge of the object 916, the imaging device 902 can receive a corresponding indication to begin implementing a scanning pattern (e.g., as will be described in more detail below). Thus, the positioning of the proximity sensor 912 can help to ensure that an entire surface of the object 916 can be imaged (e.g., ensuring that no portion of the object 916 is prevented from being imaged, such as due to the delay between sensing the presence of the object 916 and implementing the scanning pattern).

Generally, the relative position between the proximity sensor 912 and the imaging device 902 can be known, which can then inform timing of image acquisition for a scanning pattern upon detection of an object by the proximity sensor 912. More specifically, in the embodiment shown, the proximity sensor 912 vertically intersects (e.g., along the vertical axis 924) all the FOVs of the imaging device 902, or in other words, the FOVs and the position of the proximity sensor 912 overlap along the direction of travel 918. Thus, this ensures that when the imaging device 902 receives a signal from the proximity sensor 912 indicating a detection of a leading edge of the object 916, the imaging device 902 can immediately begin implementing the scanning pattern.

In other embodiments, a proximity sensor can be otherwise arranged. For example, in some configurations, the proximity sensor 912 can be positioned at an upstream location from the imaging device 902 and the fixed mirrors 906, 908, relative to the direction of travel 918 (e.g., and thus may not be coupled to the support structure 904). In this case, for example, the imaging device 902 can also be in communication with an encoder of the transport system 914, which can determine a traveling rate of the object. In this way, the imaging device 902 can receive a signal from the proximity sensor 912 indicating a leading edge (and a trailing edge) of the object 916, as the object 916 travels along the transport system 914, and can use that signal in combination with the encoder data to determine when to begin the scanning pattern to image a side of the object (e.g., based on a known distance between the imaging device 902 and the proximity sensor, the time when the leading edge of the object 916 was detected, and the travel rate of transport system 914). Similarly, the imaging device 902 can determine when to stop the scanning pattern based on the difference in time between the detections of the leading and tailing edges, and the rate of travel of the transport system 914. In other cases, such as when the length of the object 916 is known (e.g., due to the transport system 914 transporting objects with the similar or same dimensions, such as pallets), the imaging device 902 can determine when to stop the scanning pattern based on the expected length of the object 916 and the travel rate of the transport system 914.

The transport system 914 generally supports objects on its upper surface and transports them along the transport system 914 in direction of travel 918. While the transport system 914 is illustrated as being a conveyor (with a conveyor belt), in alternative configurations, the transport system 914 can be implemented as other transport systems, such as series of rollers, other moveable surfaces, etc. As shown in FIG. 23B, the imaging device 902 (and the mounting structure 904) are positioned adjacent to the transport system 914 to image objects as they travel along the transport system 914. In this configuration, the imaging device 902 does not face the lateral side 920 of the object 916, but is rather situated so that the optical axis of the imaging device 902 (e.g., before reaching the controllable mirror 903, or in other words, if the optical axis were to extend through and bypass the controllable mirror 903 without reflecting off the controllable mirror 903) is substantially parallel to the direction of travel 918 of the transport system 914. In this way, the real-world size of the FOV of the imaging device 902 at the object can be adjusted by moving (e.g., translating) the imaging device 902 towards or away from the fixed mirrors 906, 908 (or vice versa), along (or away from) the direction of travel 918. In this way, the imaging system 900 can be in a more compact design, which can better fit low width clearance spaces, which would otherwise require movement of the imaging device transversely away from the transport system 914 to adjust its FOV size.

In some embodiments, the object 916 can be representative of a standard (or maximum expected) size of objects that travel along the transport system 914. Thus, the imaging device 902 can expect certain dimensions for the objects that travel along the transport system 914 for a given period of time, and can determine a scanning pattern based on these expected dimensions. For example, as described below, the number of image acquisitions, each corresponding to a different FOV of the imaging device 902 on the object 916 can collectively span the entire expected height of the object 916 (and an expected length of the object 916). Similarly, such as by using other fixed mirror configurations, a number of image acquisitions, each corresponding to a different FOV of the imaging device 902 at the object 916, can collectively span the entire width of the object 916.

In some cases, the imaging device 902 can receive dimensional information (e.g., from a computing device in communication with the imaging device 902, such as a via a user input) for a series of objects (e.g., objects on pallets) that have similar actual or expected (e.g., maximum expected) dimensions and are to travel along the transport system 914 during a given period of time. In this way, the scanning pattern, which is based on these dimensions, can be the same for each object as it travels along the transport system 914 (e.g., the scanning pattern does not need to change between objects because they are largely the same). In some cases, the scanning pattern can be modified according to a different set of dimensional information, such as when the transport system 914 switches to receive a different series with dimensions that are different than the dimensions of the previous series of objects. In other configurations, the imaging device 902 can be in communication with a dimensioner that is upstream from the imaging device 902. In this way, the dimensioner can measure one or more dimensions of the next object traveling along the transport system 914, and can determine (or modify) the scanning pattern based on the one or more dimensions to tailor the scanning pattern to the next object. For example, the one or more dimensions can include a width, length, and height of an object, any of which can be used to determine a scanning pattern for the object. In some cases, boundaries of an object can be determined by analysis of images acquired by the imaging device 902, rather than (or in addition to) being determined based on dimensional data from other sources.

In some configurations, along with the dimensional data, the length of an optical path from the object 916 to the imaging device 902 (e.g., the distance between them) can be used to determine a scanning pattern. For example, in some configurations, the imaging device 902 can include a distance sensor 905 (e.g., a ToF sensor, a camera including a fixed camera, a 3D imaging device), including as may be located within the housing of the imaging device 902, or may be otherwise in communication with a non-integrated distance sensor. Data from the distance sensor 905 can then be used to determine an optical path length between the imaging device 902 and a surface of the lateral side 920 of the object 916. In some cases, this can include the distance sensor 905 emitting and receiving signals off the fixed mirror 906 (e.g., when the distance sensor 905 is implemented as a ToF sensor). Correspondingly, a known relevant optical path length, along with other known quantities (e.g., characteristics of relevant lenses or other optics), a real world orientation and size of a FOV for any given orientation of a relevant set of mirrors can be determined, and a scanning pattern can be implemented accordingly.

In some configurations, the distance sensor 905 can also (or alternatively) emit and receive signals off of the controllable mirror 903. In this way, for example, particularly where the distance sensor 905 is integrated with the imaging device 902, the optical path length of the current FOV of the imaging device 902 can be readily determined with a high degree of accuracy. Once the optical path length has been determined, the imaging device 902 can determine the scanning pattern, based on the optical path length. For example, because the optical path length is related to the size of the FOV of the imaging device 902 (e.g., the FOV increases with increasing optical path length), the total number of image acquisitions for scanning the entire side of the object, each with a corresponding FOV having a different location on the side of the object, can be adjusted based on the determine optical path length. Similarly, the total number of image acquisitions for scanning an entire dimension of the object (e.g., an entire height) can be adjusted. For example, based on a known optical path length and an expected (e.g., maximum expected) height of the object 916, a control system can readily determine the number of images, each corresponding to a different FOV, that are needed to scan the entire height of the object 916.

In some embodiments, while the distance sensor 905 has been described as being integral with the imaging device 902, in other configurations, the distance sensor 905 can be external to the imaging device 902, but in communication with the imaging device 902. For example, the distance sensor 905 can be a ToF sensor, a fixed camera, a 3D sensor (e.g., a 3D imaging device) configured to receive 3D imaging data, or a dimensioner. Regardless of the configuration, the distance sensor 905 can be configured to sense the distance between the imaging device 902 and the object 916, and can be configured to determine one or more dimensions of the object. For example, such as when the distance sensor 905 is a 3D imaging device, the 3D imaging data received by the 3D imaging device can be used (e.g., by the controller device of the imaging device 902) to determine in addition to the distance between the imaging device 902 and the object 916, two dimensions of the object, including a height of the object, and a width or length of the object (e.g., depending on the orientation of the object 916). Then, the scanning pattern can be determined based also on the determined height of the object 916, the determined width of the object 916, and the determined length of the object 916. In this way, and in particular, by determining the scanning pattern based on the determined height, objects having differing heights can be compensated by adjusting the scanning pattern. In other words, by taking into consideration the height, the scanning pattern will either not miss portions of the side of the object that would otherwise would have been missed (e.g., when the height is taller than the expected height), or not scan portions that do not include the side of the object at all (e.g., when the height is shorter than expected height) thereby increasing scanning speed. In some embodiments, multiple images acquired from the imaging device 952, or the distance sensor 905, can be used to determine one or more dimensions of a side of the object 916. For example, multiple objects can be stitched together and edges, corners, etc., of the side of the object 916 can be identified to determine the at least two dimensions of the side (e.g., either height and width, or height and length, or width and length).

In some configurations, as generally discussed above, the control device of the imaging device 902 is configured to implement the scanning pattern to scan the lateral side 920 of the object 916 as the object 916 travels past the imaging device 902. In some cases, the scanning pattern can involve movement of the controllable mirror only about one axis, which can advantageously simplify the movements of the controllable mirror 903, while still allowing the imaging device 902 to scan the entire side of the object 916. For example, the scanning pattern can involve the control device moving the controllable mirror 903 about only an axis that is parallel to the horizontal axis 926 (e.g., which is substantially perpendicular to both the vertical axis 924 and the direction of travel 918) to a first orientation that along with the fixed mirror 906 defines a first FOV 928. The control device of the imaging device 902 can then acquire an image using the first FOV 928. Then, according to the scanning pattern, the control device of the imaging device 902 can cause the controllable mirror 903 to rotate downwardly about only the same axis that is parallel to the horizontal axis 926 to a second orientation that defines a second FOV 930. The control device of the imaging device 902 can then acquire another image using the second FOV 930, and the process can continue until images have been acquired of an entire relevant length. In some configurations, the first FOV 928 and the second FOV 930 can overlap vertically along the vertical axis 924 (i.e., can include similar data for a common vertically extending range of the object 916). In some cases, the mirror 903 can be controlled so that vertical overlap between successive FOVs is larger, in real-world dimension, than a maximum expected size of a region of interest (e.g., barcode). In this way, the likelihood that the region of interest is not divided between two adjacent FOVs can be effectively eliminated. In other words, the likelihood that the region of interest is contained within only a single FOV is increased, which can make region of interest identification and decoding easier.

Generally, a scanning process can repeat until a number of images are acquired according to the scanning pattern with respective FOVs that collectively cover the entire vertical height of the object 916 (or other relevant area). Continuing, further image acquisition can be executed, including via one-axis adjustment of the controllable mirror 903, to capture appropriate additional regions that horizontally overlap with each other or with the initial scan (i.e., include similar data for a common horizontally extending range of the object 916) over a vertical range (as described above). For example, after one vertical strip of the lateral side 920 of the object 916 has been imaged, the control device moves to rotate the controllable mirror 903 about only the horizontal axis 926 back to the first orientation. Because the object 916 has traveled along the transport system 914 along the direction of travel 918 while the vertical strip of the lateral side 920 of the object 916 was being imaged, the controllable mirror 903 and the fixed mirror 906 can define a FOV for subsequent image acquisition that may be at a different lateral location, including without the need to adjust the controllable mirror 903 about a second axis. In other words, each subsequent FOV may have a different position on the lateral side of the object 916 (e.g., which extends substantially along the direction of travel) than a preceding FOV, even though both FOVs may correspond to the controllable mirror 903 being in the same orientation relative to at least one axis (and possible two or more axes). This scanning process, including imaging of the vertical strips of the lateral side 920 of the object 916, can then continue until the control device of the imaging device 902 has acquired a plurality of images, each with a corresponding FOV, that collectively cover the entire lateral side 920 of the object 916 (or another relevant area).

In some embodiments, although FIGS. 23A and 23B illustrate the imaging system 900 with only a single support structure and imaging device (among other components), the imaging system 900 can include another support structure (e.g., similar to the support structure 904) and another imaging device (e.g., similar to the imaging device 902) that is positioned on an opposing side of the transport system 914, and which is configured to image an opposing lateral side of the object 916. In some embodiments, additional fixed or movable mirrors can be arranged to provide a similar imaging range with only one imaging device. In this regard, for example, any of a variety of arrangements of fixed mirrors discussed relative to other embodiments here can be implemented.

In some embodiments, while the imaging system 900 has been described with the possibility of including a distance sensor 905, the imaging system 900 does not include an distance sensor 905. In this way, however, the scan pattern for an object can still be determined (or can be predetermined) based on the previously described parameters including being based on one or more standard dimensions of a standard object, based on a fixed distance between the imaging device 902 and the side of the object 916, etc.

FIG. 24A shows a front isometric view of another imaging system 950, which is also similar to, and a potential extension or modification of other imaging systems discussed above, including the imaging systems 210, 220, 500, 600, 900. Thus, the imaging system 950 can include similar features or be configured for similar functionality as other imaging systems discussed herein, as appropriate.

Similarly to the imaging system 900, the imaging system 950 includes an imaging device 952 having a control device (not shown), a controllable mirror 953, a distance sensor 955, a support structure 954, a illumination source 956, a proximity sensor 958, and a transport system 960 that supports and moves an object 962 (and others) along a direction of travel 964. Each of these components can be implemented in a similar manner as the components of the imaging system 900, and thus these components also operate in a similar manner as the imaging system 900. However, unlike the imaging system 900, the imaging system 950 does not include a fixed mirror between the imaging device 952 and the object 962. Rather, the imaging device 902 can acquire images of a lateral side 966 of the object 962, for which the FOV of the imaging device 902 is defined by the moveable mirror 953 but not by any intervening fixed mirror outside the imaging device 952.

In different embodiments, different support structures can be used. For example, in the embodiment shown, the support structure 954 includes a base that is fixedly supported by the ground. The support structure 954 extends upwardly along a vertical axis 968, which is substantially perpendicular to the direction of travel 964. The imaging device 952 is coupled to the support structure 954 so that the optical axis of the imaging device 952 (before reaching the controllable mirror 903, or extending out of the imaging device 952 through the controllable mirror 903) is substantially parallel to the horizontal axis 970, which is substantially perpendicular to the vertical axis 968 and to the direction of travel 964. In some cases, similarly to the imaging device 902, the moveable mirror 953 can be moved about only an axis parallel with the direction of travel 964 to implement a scanning pattern to scan the lateral side 966 of the object 962. For example, the control device of the imaging device 952 can move to rotate the controllable mirror 953 about only the axis parallel with the direction of travel 964 to a first orientation that defines a first FOV 972, acquire an image, move the controllable mirror 953 about only the same axis that is parallel to the direction of travel 964 to define a second FOV 974, acquire another image, and so forth. Accordingly, for example, a plurality of images can acquired, with respective FOVs that collectively span the entire height of the object 962 (e.g., along the vertical axis 968), and that collectively define a vertical strip along the lateral side 966 of the object 962. Further, in some cases, when the appropriate images of the initial vertical strip of the lateral side 966 of the object 962 have been acquired according to the scan routine, the control device can move the moveable mirror 953 back to the first orientation (or otherwise) and can then acquire images of another vertical strip of the lateral side 966 of the object 962 (e.g., as may horizontally overlap with the preceding vertical strip) in a similar manner.

In the embodiment shown, the proximity sensor 958 is located to face the transport system 960 and can be in communication (e.g., wired, wireless, etc.) with the control device of the imaging device 952. Similarly to the proximity sensor 912, the proximity sensor 958 also senses a presence of the object 962, which can include sensing a leading edge (and a trailing edge) of the object 962 as the object 962 travels along the transport system 960. As similarly described above, these indications from the proximity sensor 958 can be used to determine when to begin (and end) scanning, according to the scanning pattern.

In some embodiments, the distance sensor 955 can sense the length of the optical path between the imaging device 952 and the lateral side 966 of the object 962 (e.g., the distance between the imaging deice 952 and the lateral side 966 of the object 962). As similarly described above, the control device of the imaging device 952 can then determine the scan routine, based on the length of the optical path (and FOV size). In addition, while the distance sensor 955 has been described as being integral with the imaging device 952, in other configurations, the distance sensor 955 can be external to the imaging device 952. For example, the distance sensor 955 can be a dimensioner, a ToF sensor, a fixed camera, a 3D sensor (e.g., a 3D imaging device), etc. Regardless of the configuration, the distance sensor 955 can sense the distance between the imaging device 952 and the object 962, and can sense at least two dimensions of the object, both of which can be used to determine a scan pattern.

In some embodiments, the distance sensor 955 can emit and receive signals off of the controllable mirror 953. Thus, the optical path length (or in other words) distance of the current FOV of the imaging device 952 can be readily determined. In this way, the distance sensor 955 can not only measure a distance between the object 962 and the imaging device 952, but the distance sensor 955 can also determine one or more dimensions of the object. For example, the distance sensor 955 can determine a boundary (or in other words a perimeter) of a side of the object by determining ends of the side of the object 962. In particular, as the FOV is (gradually) moved, by the controllable mirror 953, past a first edge of the side 966 of the object 962 a sharp increase in the distance measurement is sensed by the distance sensor 955, which indicates a first distance between the first edge of the side 966 of the object 962 and the imaging device 952. In other words, the measured distance just prior to the impulse in the distance measurement can be indicated as being the distance corresponding to the first edge of the side 966 of the object 962. This can be completed for an opposing second edge of the side 966 (e.g., the second edge being opposite the first edge) to determine a second distance between the opposing second edge of the side 966 and the imaging device 952. Then, by triangulating the first distance with the second distance, the dimension can be determined (e.g., a height of the object 962, a width of the object 962, or a length of an object 962). This process can be completed for opposing pairs of edges of the side 966. Thus, depending on the side to be scanned according to the scanning pattern, two dimensions can be determined for the side, with each dimension being defined by a pair of opposing edges. While FIG. 24A illustrates the dimensions of the side 966 being the height and the length of the object 962, in other configurations, including depending on the orientation of the imaging device 952 relative to the object 962, other dimensions can be determined by this process including the height and width, and the length and width. In some embodiments, while the distance sensor 955 has been described as emitting and receiving signals off the controllable mirror 953, in alternative configurations, the distance sensor 955 can emit and receive signals off its own controllable mirror (e.g., which can be the same as the controllable mirror 953, and can be controlled by the controller device of the imaging device 952). In this case, for example, the controllable mirror of the distance sensor 955 can be integrated within the housing of the imaging device 952 or can be external to the imaging device 952.

In some embodiments, and as described above, the imaging device 952 (or the distance sensor 955 including when the distance sensor 955 is implemented as an imaging device), can acquire images (or 3D imaging data) that can be used to identify corners, edges, etc., of the side 966 (or other side) of the object 962. These images (or 3D imaging data) can then be used to identify the two dimensions of the side 966 (or the other sides of the object 962). For example, multiple images can be acquired (and stitched together). Then, at least two corners (and in some cases three, or all four corners) can be identified, and the two dimensions can be determined. In some cases, the two identified corners that define a diagonal of the side 966 (or other side) can determine the two dimensions (e.g., height and length) assuming the height and length are the same. In other cases, at least three corners can be identified to determine each of the dimensions (e.g., the height and the length).

In some embodiments, although the imaging device 952 is illustrated as acquiring images of only the lateral side 920 of the object, the imaging device 952 can be configured to acquire images of multiple sides of the object 962. For example, the imaging device 952 can be oriented so that its optical axis (e.g., without the controllable mirror 953) extends at an oblique angle relative to the direction of travel 964. In some cases, the imaging device 952 can be positioned so that one or more images can be acquired with corresponding FOVs that span at least two sides of the object 962.

Figure 24:
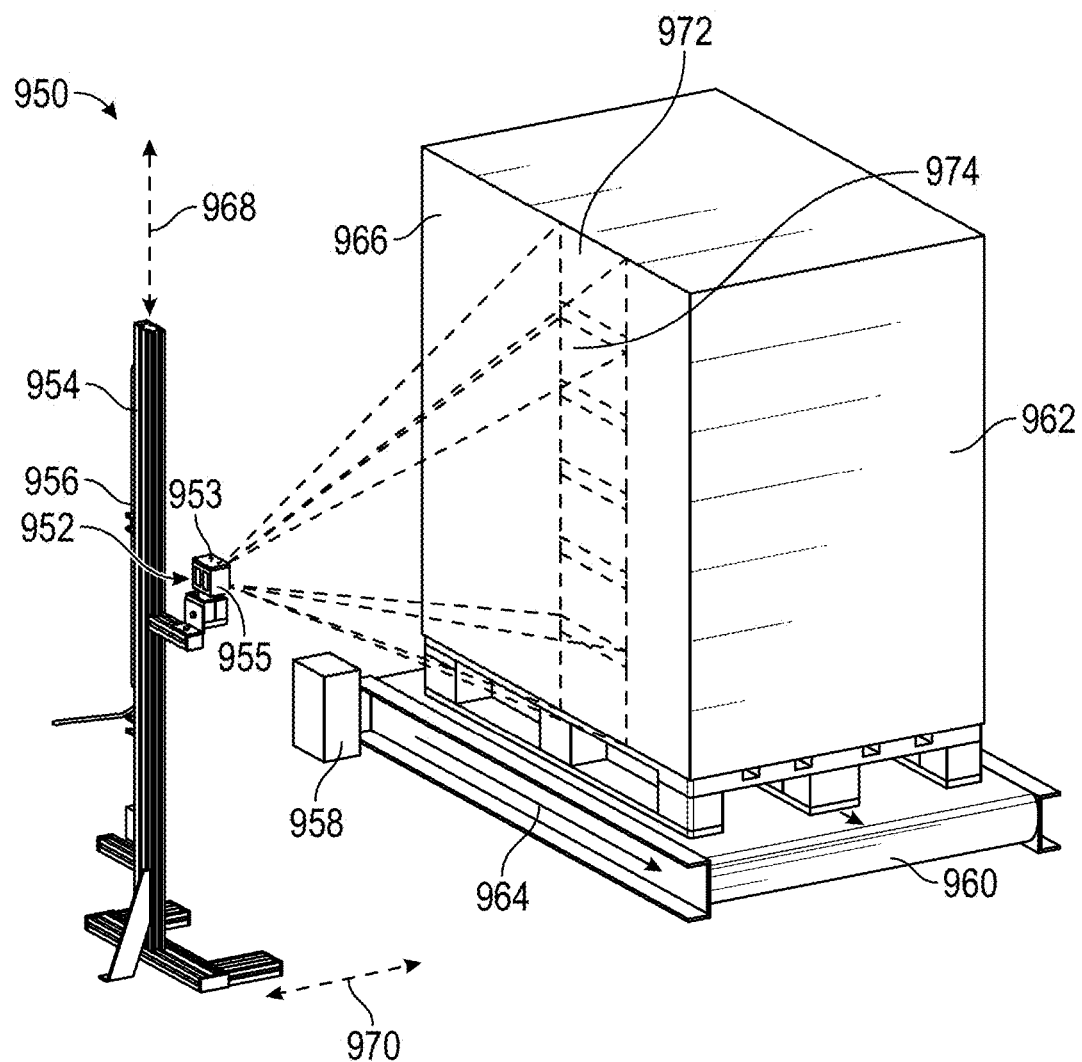
FIG. 24A is a front isometric view of another imaging system.
FIG. 24B is a front isometric view of another imaging system.
FIG. 24C is a top view of the imaging system of FIG. 24B.

In some embodiments, although the support structure 954 is illustrated in FIG. 24 as not having a cover, the support structure 954 can include a cover (e.g., similar to the cover 934 of the support structure 904). In some cases, a cover can be positioned so that, the imaging device 952 (and the illumination source 956) are situated between the object 962 and the cover, which can shield these components from other light (e.g., light not produced by the illumination source 956).

In some embodiments, although FIG. 24A illustrates the imaging system 950 with only a single support structure and imaging device (among other components), the imaging system 950 can include another support structure (e.g., such as the support structure 904) and another imaging device (e.g., such as the imaging device 902) that is positioned on an opposing side of the transport system 914, and which is configured to image an opposing lateral side of the object 916. In some cases, the additional imaging device and support structure could be positioned above the object 962 (e.g., to image an upper side of the object). In some embodiments, a support structure may be movable, so that translational or rotational adjustments to the support structure can be readily made.

In the illustrated example, the transport system 914 is a conveyor transport system. However, other implementations can include transport systems of other types. For example, some embodiments can include, or be configured for use with, other types of conveyors or fixed-base transport systems (i.e., transport systems that include a base that remains fixed in space as the transport system moves objects). Some embodiments can include mobile transport systems, including forklifts or other similar work vehicles (e.g., as further described below).

Figure 24B:
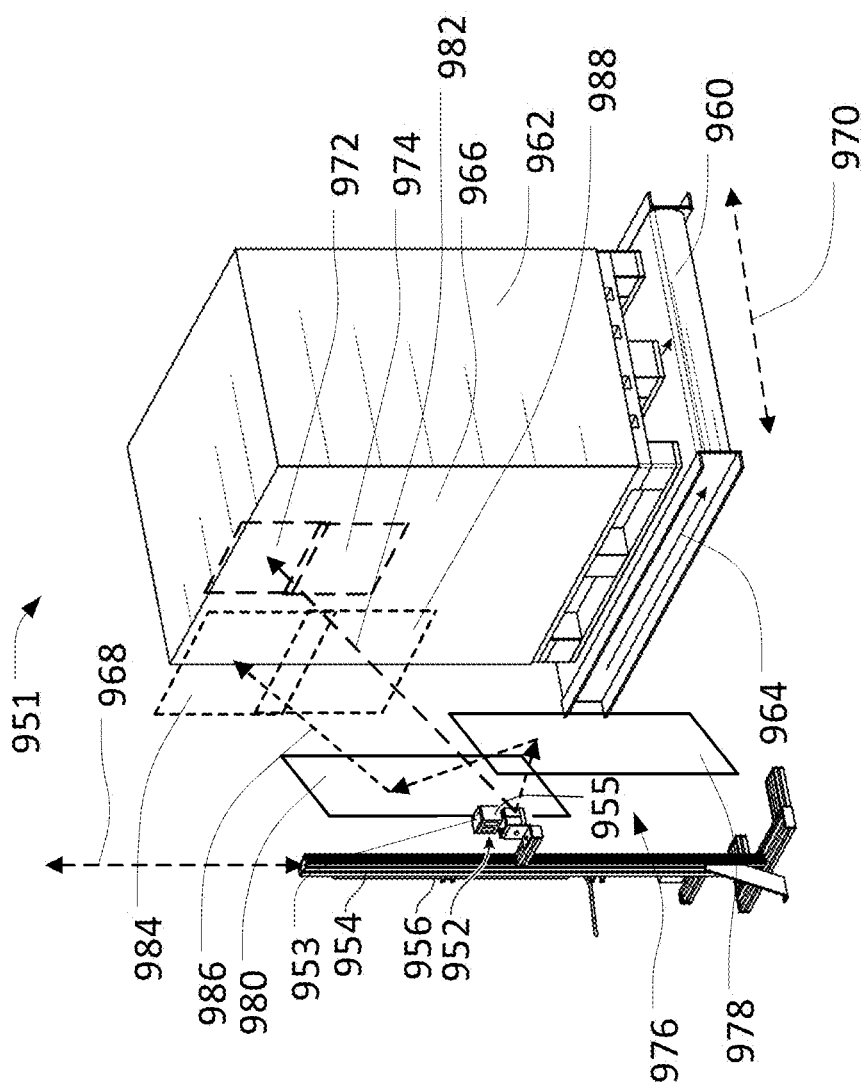

FIG. 24B shows a front isometric view of another imaging system 951, which is also similar to, and a potential extension or modification of other imaging systems discussed above, including the imaging systems 210, 220, 500, 600, 900, 950. Thus, the imaging system 951 can include similar features or be configured for similar functionality as other imaging systems discussed herein, as appropriate.

Similarly to the imaging system 950, the imaging system 951 includes the imaging device 952 having a control device (not shown), the controllable mirror 953, the distance sensor 955, the support structure 954, the illumination source 956, a proximity sensor (not shown), and the transport system 960 that supports and moves the object 962 (and others) along a direction of travel 964. Each of these components can be implemented in a similar manner as the components of the imaging system 950, and thus these components can also operate in a similar manner as the imaging system 950. However, unlike the illustrated imaging system 950, the imaging system 951 can include a mirror arrangement 976 that includes one or more fixed mirrors (e.g., two fixed mirrors 978, 980, as shown). Generally, the fixed mirrors 978, 980 can be structured in a similar manner as any of the previously described fixed mirrors including any of the fixed mirrors 906, 908. For example, each of the fixed mirrors 978, 980, as shown, are angled (e.g., obliquely) relative to the direction of travel 964 of the transport system 960 so that each fixed mirror 978, 980 faces the other. In addition to the fixed mirrors 978, 980 facing each other, the fixed mirror 978 is angled to face the imaging device 952, while the fixed mirror 980 is angled to face the side 966 of the object 962

(e.g., as the object 962 travels along the transport system 960 in the direction of travel 964).

In some cases, the fixed mirror 978 can extend (e.g., be angled along a plane) at a first angle relative to the direction of travel 964 and the horizontal axis 970, and the fixed mirror 980 can extend (e.g., be angled along a plane) at a second angle relative to the direction of travel 964 and the horizontal axis 970. In some cases, the magnitudes of the first angle and the second angle can be substantially identical (i.e., deviating by less than 10%), and in some cases, the first angle can be positive and the second angle can be negative. In some configurations, each of the fixed mirrors 978, 980 can be substantially straight relative to the vertical axis 968. In other words, each of the fixed mirrors 978, 980 can define a reflective surface (which can be planar) that is substantially parallel to the vertical axis 968. In some configurations, the imaging device 952 can be positioned between the fixed mirrors 978, at least relative to the direction of travel defined by the transport system 960.

In some embodiments, the imaging system 951, and in particular the imaging device 952 can operate in two different modes of operation, which can be similar to the configuration and functioning of the imaging system 500. For example, in the a first mode of operation (e.g., according to a predetermined or adaptive scanning pattern, including as discussed above), the imaging device 952 is configured to selectively acquire imaging data along different optical paths that extend between the fixed mirrors 978, 980, without reflecting off of the fixed mirrors 978, 980, and thereby do not utilize the fixed mirrors 978, 980 for image acquisition.

While the imaging system 951 is illustrated as having the illumination source 956 that directly illuminates a side of the object 962, in other configurations the illumination source 956 can emit light at the mirror 978 (or the mirror 980) to illuminate a side of the object 962. In some cases, the imaging system 951 can include multiple illumination sources, each of which can be implemented in a similar manner as the illumination source 956 (or other illumination sources described herein). For example, a first illumination source can emit light at the mirror 978, a second illumination source can emit light at the mirror 980, and a third illumination source can emit light directly at a side of the object 962 (e.g., the side 966 of the object 962).

In one example, in the first mode of operation, the control device of the imaging device 952 can rotate the controllable mirror 953 about only the axis parallel with the direction of travel 964 to a first orientation that defines the first FOV 972 (and thus an optical path 982), acquire an image, move the controllable mirror 953 about only the same axis that is parallel to the direction of travel 964 to define a second FOV 974, acquire another image, and so forth. Accordingly, for example, a plurality of images can acquired, with respective FOVs that collectively span the entire height of the object 962 (e.g., along the vertical axis 968), and that collectively define a vertical strip along the lateral side 966 of the object 962.

Further, in some cases and as also generally discussed above, when the appropriate images of the initial vertical strip of the lateral side 966 of the object 962 have been acquired according to the scan routine, the control device can move the moveable mirror 953 back to the first orientation (or otherwise) and can then acquire images of another vertical strip of the lateral side 966 of the object 962 (e.g., as may horizontally overlap with the preceding vertical strip) in a similar manner (e.g., until a plurality of images are acquired, corresponding to a respective plurality of FOVs that collectively cover the entire lateral side 966 of the object 962). In some cases, however, other scanning patterns can be used.

In some embodiments, while in a first mode of operation, the imaging device 952 only utilizes direct optical paths that directly extend from the controllable mirror 953 and to the object 962. In other words, each of these direct optical paths do not reflect off the fixed mirrors 978, 980. In some embodiments, each of these direct optical paths are substantially parallel to the horizontal axis 970.

In a second mode of operation, however, the imaging device 952 can be configured to utilize one or more fixed mirrors (e.g., both of the mirrors 978, 980) to acquire imaging data of the lateral side 966 of the object 962 (e.g., according to a scanning pattern). For example, in a second mode of operation (e.g., according to a predetermined or adaptive scanning pattern, including as described above), the control device of the imaging device 952 can rotate the controllable mirror 953 about one or more axes (e.g., about only an axis parallel to the axis 968) to a first orientation that defines the first FOV 984 (and thus an optical path 986), acquire an image, move the controllable mirror 953 again (e.g., about only a first axis, or other axes) to define a second FOV 988, acquire another image, move the controllable mirror 953 again to define another FOV (e.g., below the FOV 988), acquire an image and so forth. Accordingly, for example, a plurality of images can acquired, with respective FOVs that collectively span the entire height of the object 962 (e.g., along the vertical axis 968), and that collectively define a vertical strip along the lateral side 966 of the object 962.

Further, in some cases and as also generally discussed above, when the appropriate images of the initial vertical strip of the lateral side 966 of the object 962 have been acquired according to the scan routine, the control device can move the moveable mirror 953 back to the first orientation (or otherwise) and can then acquire images of another vertical strip of the lateral side 966 of the object 962 (e.g., as may horizontally overlap with the preceding vertical strip) in a similar manner (e.g., until a plurality of images are acquired, corresponding to a respective plurality of FOVs that collectively cover the entire lateral side 966 of the object 962). In some embodiments, while in the second mode of operation, the imaging device 952 only utilizes indirect optical paths (such as the optical path 986) that extend from the controllable mirror 953, to the fixed mirror 978, to the fixed mirror 980, and to the lateral side 966 of the object 962 (e.g., the FOV 984 reflecting off the mirror 980, which reflects off the mirror 978 to be directed at the controllable mirror 953 and to the imaging sensor). In other words, each of these indirect optical paths reflect off the fixed mirrors 978, 980.

As shown in FIG. 24B, the indirect optical paths are longer than the direct optical paths, and thus the FOVs 984, 988 are larger than the FOVs 972, 974. In this way, and similarly to the imaging system 500, as shown in FIG. 16A, the first mode of operation can be useful when the object 962 is farther away from the imaging device 952, so that the FOVs of the direct optical paths can include an entire region of interest (e.g., a barcode) of the lateral side 966 of the object 962. Alternatively, the second mode of operation can be useful when the object 962 is closer to the imaging device 952, so that the larger FOVs provided by the indirect optical paths can include an entire region of interest (e.g., a barcode) of the lateral side 966 of the object 916 even when the region of interest appears larger to the imaging device 952.

In some embodiments, a control device of an imaging device (e.g., the imaging device 952) can change between first and second modes of operation based on distance measurements. For example, the distance sensor 955 (or other distance sensor) can measure a distance between the imaging device 952 and the lateral side 966 of the object 962, and the imaging device 952 can select either the first or second mode of operation based on the distance. For example, when the distance is below a threshold (e.g., the object 962 is relatively close to the imaging device 952), the control device can select the first mode of operation and correspondingly implement a scanning pattern for the lateral side 966 of the object 962 while the imaging device 952 operates in the first mode of operation. Alternatively, when the distance is above a threshold (e.g., the object 962 is relatively far from the imaging device 952), the control device can select the second mode of operation and correspondingly implement a scanning pattern for the lateral side 966 of the object 962 while the imaging device 952 operates in the second mode of operation. In this way, the imaging device 952 can quickly switch (e.g., by only moving the controllable mirror 953) between scanning patterns having indirect optical paths and scanning patterns having direct optical paths to compensate for changes in the projection size of the region of interest (e.g., a barcode) of the object 962 to the imaging device 952 or the working distance of part or all of an object from the imaging device 952. In some cases, the control device of the imaging device determining a scan pattern can include determining which of (or both) the first or second modes of operation of the imaging device is to be used for the scan pattern when scanning a side of an object. Thus, in some configurations, determining the scan pattern can include determining a duration for utilizing a first mode of operation of the imaging device while implementing the scanning pattern, and a duration for utilizing a second mode of operation of the imaging device while implementing the scanning pattern.

In some embodiments, the imaging device 952 can operate in either the first mode of operation or the second mode of operation for scanning any given object. In other words, sometimes the imaging device 952 does not switch between the first and second modes of operation prior to finishing a scanning pattern for an object (e.g., that scans an entire side of the object). For example, a scanning pattern for scanning the lateral side 966 of the object 962 can specify which mode of operation to utilize (e.g., as based on previous distance measurements or known object location or dimensions), and only utilize the specified mode of operation to scan the entire lateral side 966 of the object 962. In some embodiments, however, an imaging device may switch between modes of operations (e.g., with direct and indirect optical paths) during a scan of a single object (e.g., a bundled set of smaller objects on a pallet).

In some embodiments, the selection of the mode of operation to utilize for an imaging device (e.g., as may also include measuring distances) can occur for each object that passes along the transport system 960 along the direction of travel 964. For example, a scanning pattern to scan the entire lateral side 966 of the object 962 can include the imaging device 952 only operating in a first mode of operation (e.g., as based on a larger measured working distance between the imaging device 952 and the object 962). Then, for example, after a presence sensor indicates that a subsequent object is traveling along the transport system 960, a distance sensor (e.g., the distance sensor 955) can measure the distance between the subsequent object and the imaging device 952, and the controller device of the imaging device 952 can determine that a corresponding mode of operation (e.g., a second mode of operation) is to be used. In this regard, for example, a scanning pattern to scan the entire lateral side of the subsequent object can then include the imaging device 952 only operating in the second mode of operation.

Figure 24C:
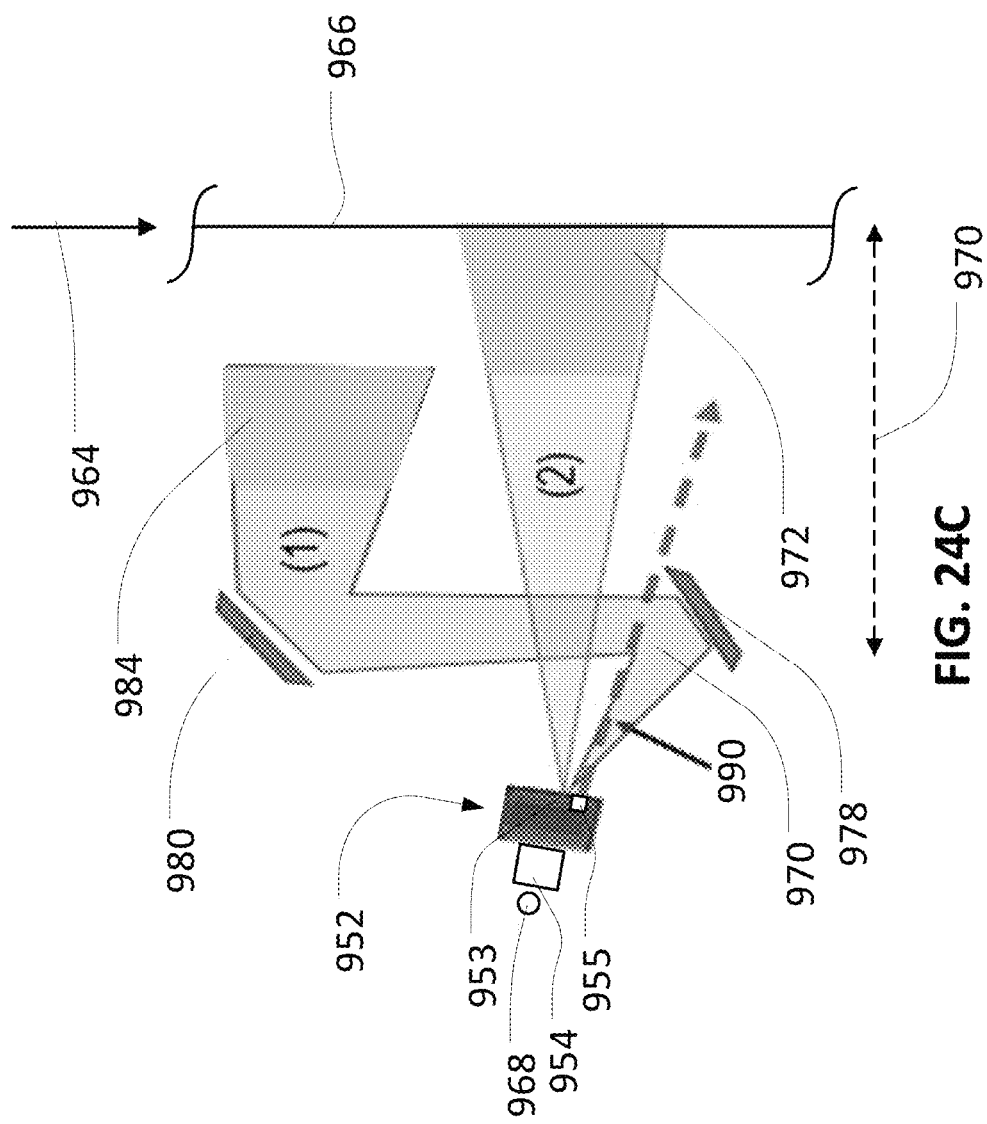

FIG. 24C shows a top view of the imaging system 951 with the imaging device 952 slightly changed in orientation. For example, as shown in FIG. 24C, the optical axis of the imaging device 952 (e.g., without the controllable mirror 953, or extending out of the imaging device 952 through the controllable mirror 953) extends at an angle relative to the direction of travel 964 and the horizontal axis 970, and the distance measurement signal 990 emitted from the distance sensor 955 is not perpendicular with the surface of the side 966 of the object 962. In other words, the imaging device 952 is slightly angled towards the mirror 978 (e.g., and away from the mirror 980). In this way, the position of the imaging device 952 can compensate for possible small ranges of motion of the controllable mirror 953. In addition, with the angled configuration of the imaging device 952 facing (slightly) towards the mirror 978, the controllable mirror 953 does not have to travel as far to switch between the first mode of operation of the imaging device 952 and the second mode of operation of the imaging device 952. Thus, the illustrated configuration can save time and can decrease total movement of the controllable mirror 953, in some cases.

As generally noted above, different imaging systems presented herein can be used in a variety of operational contexts, including with a variety of different transport systems. In this regard, for example, the imaging system 950, 951 (or others) can sometimes be used in combination with forklifts or other vehicles (e.g., work vehicles). For example, as further discussed below, imaging systems similar to the systems 950, 951 (or others disclosed herein) can be mounted to work vehicles, or can be located in operational settings to scan pallets or other objects being transported by work vehicles, including as based on distance measurements and other spatial data regarding the work vehicles (e.g., a measured by integrated or separated distance sensors).

Figure 25:
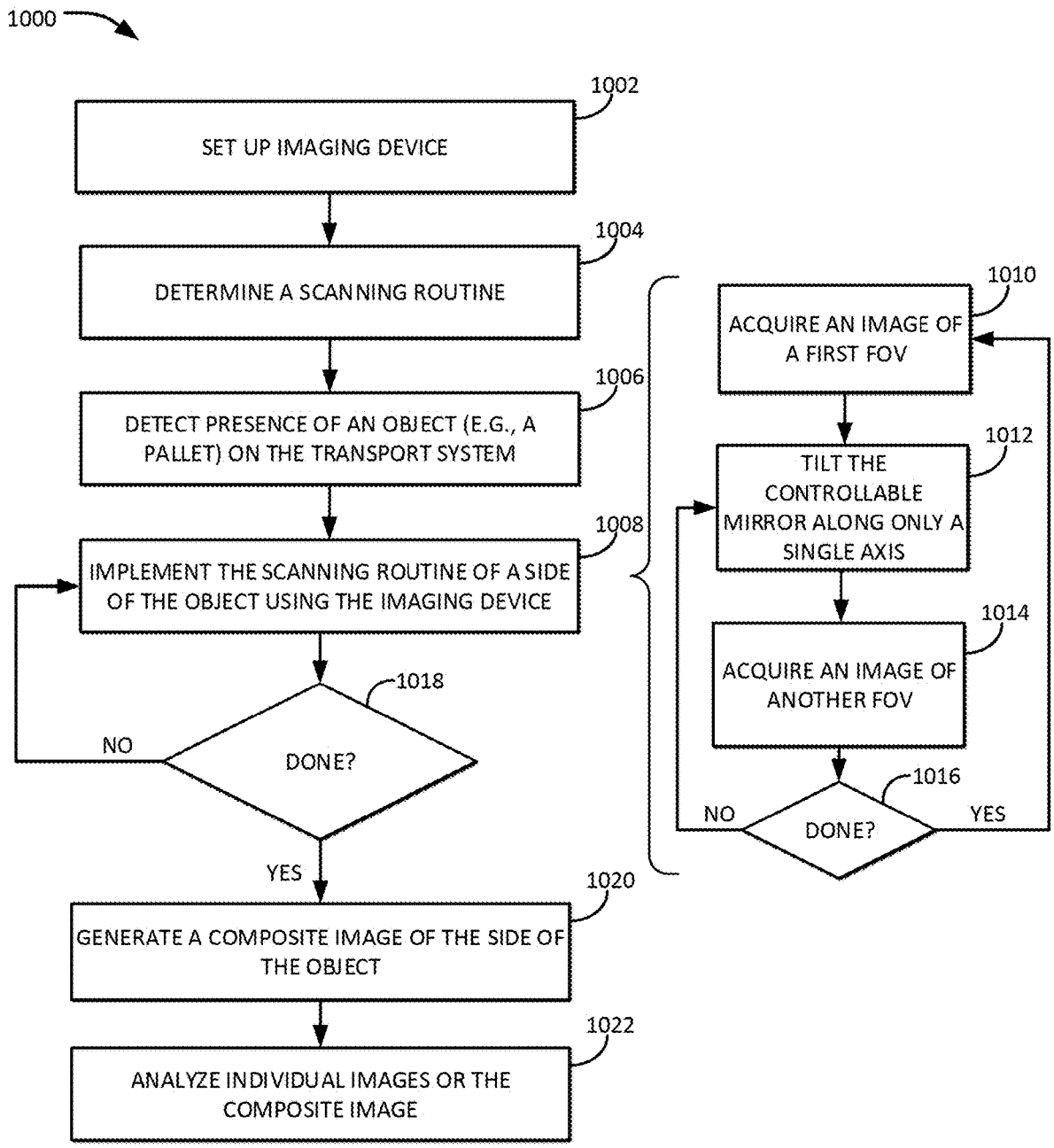
FIG. 25 is a flowchart of a process for scanning at least one side of an object.

FIG. 25 shows a flowchart of a process 1000 for scanning at least one side of an object, which can be similar to or operated in combination with other processes described herein, such as the process described with reference to FIG. 15, the processes 700, 800, 850, and so on. Similarly to other processes described above, the process 1000 generally includes using controllable mirrors to acquire images, including via control systems and algorithms as variously discussed above. In general, aspects of the process 1000 can be implemented using one or more of the imaging systems discussed above, alone or in combination with each other, or can be implemented using other imaging systems that include one or more imaging sensors, a mirror arrangement with at least one controllable mirror, and a control device (e.g., a specially programmed general purpose computer) that is configured to control image acquisition with the one or more imaging sensors and movement of the at least one controllable mirror. In some configurations, the process 1000 can be a computer-implemented process, which can be executed using one or more computing devices (e.g., the control device of an imaging device).

At 1002, the process 1000 can include setting up an imaging system, which includes at least one imaging device. In some cases, the imaging system can be assembled (e.g., by a user), which can include mounting the imaging device to a support structure. The support structure (and the imaging device) can then be positioned relative to a transport system. In some cases, the imaging device (or a fixed mirror) can be moved away or towards the transport system to adjust the FOV of the imaging device to a desired real world size for acquisition of useful images.

In some embodiments, during a set up process, one or more computing devices (e.g., the control device of the imaging device) can determine a length of the optical path between the imaging device and the surface of an object, or expected location of an object, by using a distance sensor. Further, this length of the optical path can be used to determine the scanning routine. In some cases, the position of this object on the transport system (e.g., its location on the conveyor belt) is consistent with other objects (e.g., some or all of the other object traveling along the transport system during a given period of time). Thus, this measurement using the distance sensor can be a calibrating measurement, to determine (or adjust) the scanning pattern to be tailored to similar objects.

In some embodiments, at 1002, the process 1000 can also include the one or more computing devices receiving dimensional information (e.g., one or more dimensions) of an object. In some cases, the one or more computing devices can receive dimensional information that is indicative of a standard sized object for a transport system. In other words, for a given period of time, the transport system transports objects that have a similar size (according to the standard sized object), such as, for example, objects supported on pallets. In some cases, this dimensional information can include an expected width of the object, an expected height of the object, and an expected length of the object (e.g., an expected maximum width, height, or length, as further discussed below). In other configurations, the dimensional information of the object can be determined prior to determining the scanning pattern (e.g., using a dimensioner, edge detection or other image analysis, using imaging data from an imaging sensor, using distance measurements from a distance sensor, using 3D imaging data from a 3D imaging device, etc.), which can include one or more dimensions of the object including a height, width, and length of the object. For example, a dimensioner upstream of an imaging device (or at a different location) along the transport system can determine one or more dimensions of the object to be scanned, and can transmit the one or more dimensions to the imaging device (e.g., to be received by the imaging device). As another example, a computing device can generate a plurality of images (or a 3D volume) from imaging data acquired using an imaging device (or other imaging sensor, including a 3D imaging device). This imaging data can have multiple corresponding FOVs, with each FOV being of a side of an object. Then, a computing device can stitch together the images, and locate features within the image(s) (or the 3D volume) including the edges, corners, etc., of the side of the object. These edge(s), corner(s), or both, can facilitate (e.g., by a computing device) the determination of the one or more dimensions of the side of the object.

In some configurations, the dimensional information can be the maximum possible dimensions of an object (or other objects) that the transport system is configured to transport. For example, the transport system may only be able to transport objects (or in general only transports) objects that collectively have certain maximum dimensions. In particular, this dimensional data can include a maximum height (e.g., a regulation set height, such as those for objects supported by pallets), a maximum width, and a maximum length, where the same objects, or different objects can have one or more of these maximum dimensions.

At 1004, the process 1000 can include the one or more computing devices determining a scanning pattern for an object. In some cases, the scanning pattern can be determined based on the length of the optical path between the imaging device and the object (e.g., the distance between them), the size of the FOV of the imaging device, the dimensional information (e.g., one or more of the dimensions of an object to be scanned), and a user input (as described below). For example, because the size of the FOV of the imaging device increases with increasing optical path length (and vice versa), the total number of images (e.g., as defined by the scanning pattern) needs to be increased (or decreased) in order to scan the entire surface of the side of the object. Similarly, the dimensional information, which can include a length, width, and height of an object (e.g., the object to be scanned) can be used to determine the total number of images for the scan, and more specifically, the number of images required to cover an entire vertical strip of an object and the number of vertical strips that are required to cover an entire length or width of the object.

In some configurations, the one or more computing device can determine the amount of overlap between adjacent FOVs during the scanning pattern. For example, this can include the one or more computing devices determining the amount of vertical overlap between adjacent FOVs (e.g., the amount of overlap between adjacent rows), and determining the amount of horizontal overlap between adjacent FOVs (e.g., the amount of overlap between adjacent columns). In some cases, the overlap can be determined based on a size of an anticipated region of interest (e.g., a barcode), and the travel rate of the transport system.

In some cases, a travel rate of a transport system can otherwise inform image acquisition, including relative to overlap between different images. For example, in a scanning pattern for which successive vertical strips of images are acquired, the start of image acquisition for a particular vertical strip may be timed so that each of the images of the vertical strip exhibits appropriate horizontal overlap with a corresponding image of a preceding vertical strip. Similarly, image acquisition of a first vertical strip may be timed to begin so that a leading edge of an object remains visible in each image of the vertical strip, despite the transport system having moved the object continuously during image acquisition for the vertical strip.

At 1006, the process 1000 can include the one or more computing devices detecting a presence of an object that is to be scanned (e.g., that is traveling along the transport system). In some cases, this can include the one or more computing devices receiving a signal from a proximity sensor (e.g., indicating a leading edge of the object). In some configurations, because the proximity sensor 912 is aligned with the FOV of the imaging device, the one or more computing devices can begin implementing the scanning pattern immediately (after receiving the signal from the proximity sensor). In other cases, such as when the proximity sensor is upstream of the imaging device, the one or more computing devices can receive the signal from the proximity sensor indicating a presence of the object (e.g., a leading edge), determine a delay (e.g., based on a known travel rate of the transport system, encoder data, etc.), and implement image acquisition for the scanning pattern after the delay has elapsed.

At 1008, the process 1000 can include the one or more computing devices implementing the scanning pattern using the imaging device, including as may be used to acquire images of an entire side (or sides) of an object. As noted above, in different embodiments, different scanning patterns can be implemented.

In some embodiments, the block 1008 of the process 1000 can include a particular scanning pattern as further detailed in FIG. 25. For example, at 1010, the one or more computing devices can acquire a first image of a first FOV defined at least in part by the controllable mirror of the imaging device in a first orientation (e.g., at a start location, such as a top or bottom corner of a leading edge of an object). At 1012, the block 1008 of the process 1000 can include the one or more computing devices tilting the controllable mirror about only a single axis (e.g., the horizontal axis) to a second orientation, to define a second FOV. At 1014, the block 1008 of the process 1000 can include acquiring a second image of the second FOV. At 1016, the block 1008 of the process 1000 can include the one or more computing devices determining whether or not a column acquisition of the scanning pattern is completed (e.g., whether images of a complete vertical strip of an object or area of interest have been acquired).

If, at 1016, the one or more computing devices determine that the column acquisition has not been completed, the process 1000 can proceed back to block 1012 to further tilt the controllable mirror along only the single axis to a third orientation to define a third FOV, and subsequently acquire an image of the third FOV. If, at 1016, the one or more computing devices determine that the column acquisition, the process 1000 can end, or can proceed back to block 1010 to move the controllable mirror back to the first orientation and acquire and image of that FOV. For example, after scanning an entire vertical strip of a moving object, from bottom to top (or vice versa), the controllable mirror can be tilted back to a bottom (or top) orientation and image acquisition for another vertical strip can similarly proceed.

Figure 26:
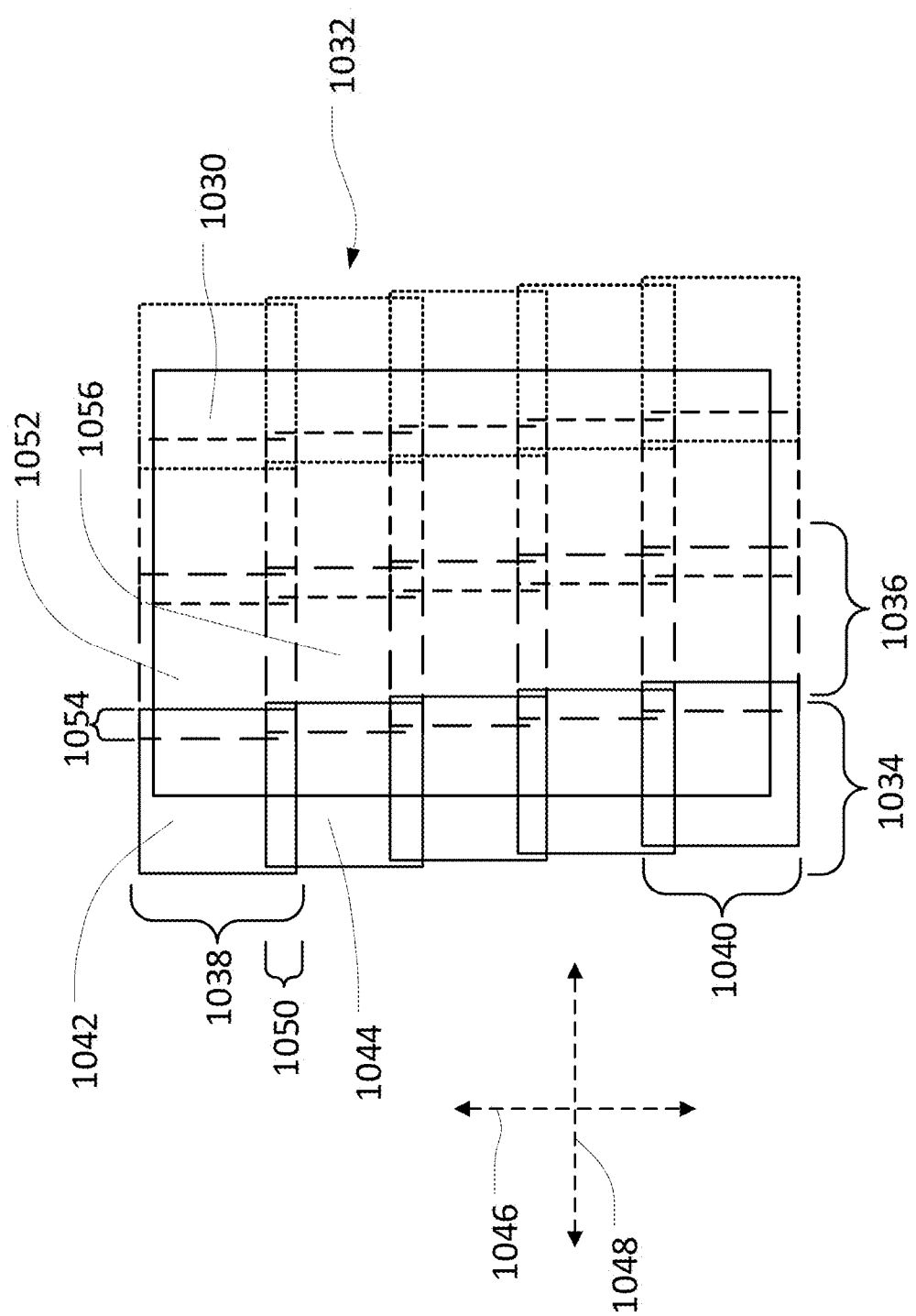
FIG. 26 is an illustration of an object overlaid with FOVs defined by an imaging device, that correspond to respective acquired images, according to some scanning patterns.

FIG. 26 shows an illustration of an object 1030 overlaid with FOVs 1032 defined by the imaging device, that correspond to respective acquired images, according to some scanning patterns according to the disclosed technology. In some cases, the scanning pattern is being implemented as the object travels along the transport system, and so in space, each column of FOVs with reference to the imaging device location has the same position in a horizontal direction. However, to better illustrate the overlaps, FIG. 26 is shown with reference to the object (e.g., the object being horizontally fixed) with the FOVs moving. As shown, the FOVs 1032 are organized into four columns including columns 1034, 1036, and five rows including rows 1038, 1040. As described above, the columns 1034, 1036 are column acquisitions, corresponding to a vertical strip of an object, for which the controllable mirror is tilted only about one axis to acquire images that correspond to respective FOVs that span a dimension of the object (e.g., in this case a vertical dimension). For example, the column 1034 defines five FOVs, which include adjacent FOVs 1042, 1044. Each of these FOVs including the FOVs 1042, 1044 overlap with each other relative to an axis 1046, which is a vertical axis. For example, the FOVs 1042, 1044 overlap vertically by an overlapping amount 1050 (e.g., a vertical overlap amount).

Similarly, each of the five rows include FOVs from each of the column acquisitions. For example, the column 1036 also includes five FOVs (including a FOV 1052), which each overlap with adjacent FOVs (e.g., from the adjacent column 1034) relative to the axis 1048, which in this case is a horizontal axis (e.g., the axes 1046, 1048 being substantially perpendicular to each other). Thus, as shown, the FOVs 1042, 1052, each from different columns, overlap horizontally with each other relative to the axis 1048 by an overlap amount 1054 (e.g., a horizontal overlap amount). In some configurations, each of the FOVs can overlap with every adjacent FOV. For example, the FOV 1042 can overlap with the FOVs 1044, 1052 (and the FOV 1056, which overlaps vertically with the FOV 1052).

For the embodiment shown, adjacent FOVs within a given column (e.g., the column 1034) are shifted horizontally relative to each other (e.g., due to the movement of the object along the transport system). Correspondingly, this horizontal shifting can be compensated for via appropriate horizontal overlap between the adjacent columns. In other words, appropriate horizontal overlap between columns can help to ensure that the entire side of the object 1030 is imaged (e.g., no gaps between FOVs are present). In this regard, returning to a bottom (or top) of an object to begin image acquisition for each successive vertical strip of the object may sometimes be beneficial, as this may help to minimize the horizontal overlap between the image columns that may be required to ensure appropriate horizontal overlap between each horizontally adjacent image.

In some embodiments, although the scanning pattern with reference to FIG. 25 is implemented as only tilting the controllable mirror about a single axis, the controllable mirror can be controllably tilted about multiple axis. For example, the imaging device can compensate for lateral shifting (e.g., horizontal shifting) by (slightly) tilting the controllable mirror about another axis to compensate for the movement of the object between acquisitions. As a more specific example, after an image has been acquired that corresponds to the FOV 1042, the controllable mirror can be slightly tilted about an axis parallel to the axis 1048 (in addition to tilting about an axis that is parallel to the axis 1046) so that the FOV 1044 is entirely aligned with the FOV 1042 about the axis 1048. In some cases, the tilting of the controllable mirror to compensate for movement of the object can be determined based on the travel speed of the transport system (e.g., imaging device can receive encoder data from the transport system to determine the travel speed of the transport system, and thus the object).

Although aspects of the scanning pattern illustrated in FIG. 26 may be particularly useful, other scanning patterns can also be implemented under the process 1000 and with the imaging systems 900, 950. For example, scanning patterns as discussed relative to any of FIGS. 3 through 16 can be implemented in some cases.

Returning to FIG. 25, at 1018, the process 1000 can include the one or more computing devices determining whether or not the scanning pattern has been completed. For example, the one or more computing devices can receive another presence signal of the following edge of the object (or lack thereof) to indicate that the scanning pattern is to be completed. As another example, such as when the proximity sensor is upstream of the imaging device, the one or more computing devices can determine a duration of the scanning pattern, based on the time elapsed between detecting the presence (e.g., the leading edge) of the object and detecting an end of the object (e.g., a trailing edge of the object based on a lack of signal). Thus, the imaging device can stop the scanning pattern after the duration has elapsed. As still other example, analysis of acquired images or predetermined (e.g., maximum expected) dimensional information may be used in some embodiments to identify that an object or other area of interest has fully passed the imaging device.

If, at 1018, the one or more computing devices determine that the scanning pattern is not completed for the object, the process 1000 can proceed back to block 1008 to continue the scanning pattern. If, at 1018, the one or more computing devices determine that the scanning pattern is completed for the object, the imaging device can stop the scanning pattern and proceed to block 1020.

At 1020, as appropriate, the process 1000 can include the one or more computing devices generating a composite image of the side of the object that was scanned according to the scanning pattern. For example, all (or some) of the images can be combined, such as using known image stitching processes. In some cases, a composite image is not formed, and rather the individual images from the scanning pattern can be analyzed individually or collectively (without generating a composite).

At 1022, the process 1000 can include the one or more computing devices analyzing individual images or the composite image from the scanning pattern. For example, the one or more computing devices can determine a region of interest for one or more of these images, and extract information from the region of interest. More specifically, such as when the region of interest is a barcode (or other symbol), once the one or more computing devices identify the barcode (or the symbol), the one or more computing devices can decode and extract information from the barcode (or the symbol).

Figure 27:
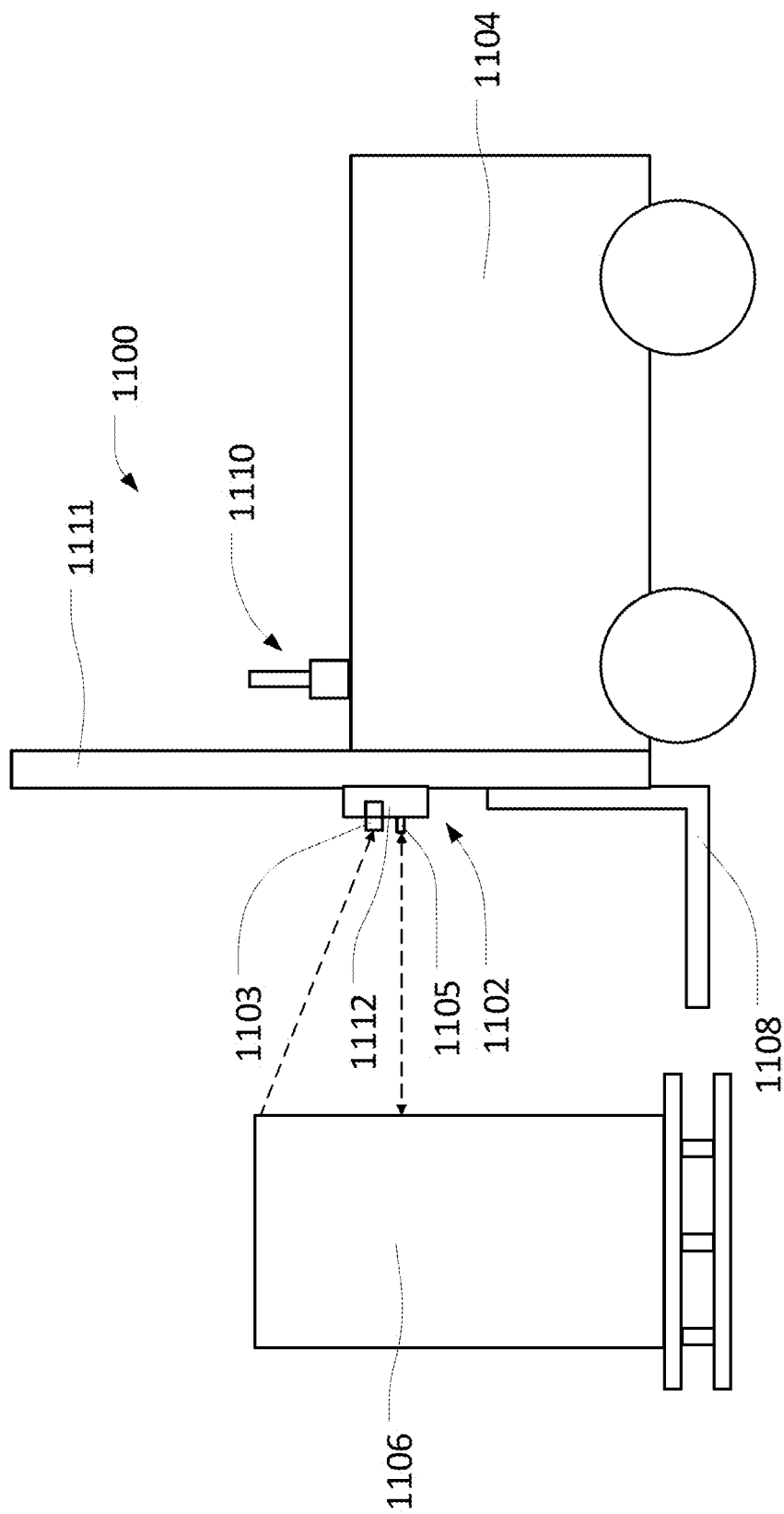
FIG. 27 is a schematic illustration of a front view of an object transport system.

In some embodiments, an imaging system with a controllable mirror can be implemented on movable platform, including with distance sensors that can help to inform appropriate scanning patterns based on the relative location or movement of the movable platform. In this regard, for example, FIG. 27 shows a schematic illustration of an object transport system 1100. The object transport system 1100 can include an imaging device 1102, and a work vehicle 1104 configured to engage a load 1106, each of which can be in communication with each other. In some cases, the imaging device 1102 can be implemented in a similar manner as the other imaging devices described herein. For example, the imaging device 1102 can include a control device, an imaging sensor, a controllable mirror 1103, and a distance sensor 1105. The controllable mirror 1103 can be controllably pivoted around two or more axis, and can thereby controllably define the FOV of the imaging device 1102. Thus, by moving the orientation of the controllable mirror 1103 (e.g., by the control device of the imaging device 1102), images from different FOVs can be acquired.

In the embodiment shown, the distance sensor 1105 is coupled to the housing of the imaging device 1102 and is situated below the controllable mirror 1103. However, other configurations are possible. For example, as described above, the distance sensor can be situated within the housing of the imaging device 1102, and can use the controllable mirror 1103 to reflect and receive signals so as the determine the length of the optical path of the current FOV of the imaging device 1102. In alternative configurations, the distance sensor 1105 can be coupled to the work vehicle and separate from the imaging device 1102, but can still be in communication with the control device of the imaging device 1102.

In the embodiment shown, the work vehicle 1104 includes at least one implement 1108 that is configured to engage the load 1106 to be moved by the work vehicle 1104. The work vehicle 1104 also includes a user interface 1110 that is configured to receive one or more user inputs from an operator (e.g., the operator driving the work vehicle 1104). In some embodiments, the user interface can include a joystick, actuatable buttons, a touch screen, etc. Although the user interface 1110 is illustrated as being part of the work vehicle 1104, it can be its own entity and communicate with the imaging device (e.g., via wired or wireless channels).

Thus, the user interface 1110 can be a smartphone, a tablet computer, etc. While the work vehicle 1104 is illustrated as being a type of forklift, the work vehicle 1104 can be implemented in other ways, including a hand pallet truck, other material handling vehicles, other off- or on-highway vehicles, etc.

In this illustrated embodiment, the at least one implement 1108 includes at least one fork (e.g., a pair of forks) that is configured to engage a pallet of the load 1106. The imaging device 1102 is coupled to the work vehicle 1104 at a front end of the work vehicle 1104. For example, in the illustrated embodiment, the work vehicle 1104 can include a mast 1111 that raises and lowers the at least one implement 1108, and the imaging device 1102 can be coupled to the mast 1111. In alternative configurations, the imaging device 1102 can be coupled to the vehicle frame of the work vehicle 1104. In still other configurations, such as when the work vehicle 1104 is implemented as a forklift the imaging device 1102 can be coupled to the work vehicle 1104 so that the imaging device is positioned between the forks or other work implements. In yet other configurations, the imaging device 1102 can be coupled to the work vehicle 1104 so that when the load 1106 is engaged by the at least one implement 1108 the load 1106 does not contact (and thus potentially damage) the imaging device 1102. In some embodiments, the imaging device 1102 can be coupled to the work vehicle 1104 so as to remain at a constant height relative to the floor that supports the work vehicle 1104, so that the height from the floor to the imaging device 1102 is known at all times by the imaging device 1102, and does not substantially change (e.g., with movement of the at least one implement 1108). In some embodiments, the imaging device 1102 may be movable to different heights or other orientations (e.g., along with a work implement), with tracking of this movement, as appropriate, to establish a relative or absolute location of the imaging device 1102.

In some embodiments, the imaging device 1102 can implement a scanning pattern to scan a side of the load 1106 (e.g., that the imaging device 1102 faces). In some cases, the work vehicle 1104 can approach the load 1106, stop at a particular distance from the load 1106, and the imaging device 1102 can receive an indication that the work vehicle 1104 has stopped (e.g., from a user actuating a user input). After the imaging device 1102 receives an indication that the work vehicle 1104 has stopped, the imaging device 1102, via the distance sensor 1105, can determine a distance between the imaging device 1102 and the side of the load 1106 to be scanned, which can include determining a length of the optical path of the current FOV of the imaging device 1102. Then, the imaging device 1102 can determine a scanning pattern, based on the distance, and implement the scanning pattern to scan the side of the load 1106 (e.g., after receiving another user input). In some embodiments, the distance sensor 1105 can determine distance measurements and, as appropriate, derivatives thereof (e.g., vehicle velocity) while the work vehicle 1104 is moving, and a scanning pattern can be implemented accordingly, including with appropriate adjustments to the scanning pattern as an imaging distance (or derivative thereof) changes. In some embodiments, the distance sensor 1105 can determine distance measurements using signals that are directed off of (and by) a controllable mirror associated with the imaging device 1102.

In some embodiments, rather than the work vehicle 1104 stopping, the imaging device 1102 can continuously update (e.g., change) the properties of the scanning pattern (e.g., the entire spatial coverage of all of the FOVs or, in other words, the scanning area of the scanning pattern, the overlaps between each adjacent FOVs or successive images, etc.). In some cases, a scanning pattern can be updated based on changes to the distance measurement between the imaging device 1102 and the load 1106. For example, at one point in time the distance sensor 1105 can measure a first distance (e.g., between the imaging device 1102 and the load 1106) and the controller device of the imaging device 1102 can adjust the properties of the scanning pattern based on the first distance (and an expected size of the object, such as the height of the object). Then, at a different point in time (e.g., such as when the work vehicle 1104 is traveling towards the load 1106), the distance sensor can measure a second distance (e.g., between the imaging device 1102 and the load 1106) and the controller device of the imaging device 1102 can adjust the properties of the scanning pattern based on the second distance (e.g., and a corresponding expected pixel- or real-world dimension of the object, such as the height of the object). In this way, not only can some effective scanning be performed during vehicle travel, but improved scanning speed can result when the work vehicle 1104 stops. For example, the controller device of the imaging device 1102 can selectively implement the most recent scanning pattern determined. Thus, the time required to scan a side of the object is decreased (e.g., the distance has been already measured and the scanning pattern already adjusted based on the distance).

In some embodiments, the imaging device 1102 can include an aimer 1112 that is configured to project an aiming pattern 1114 (see FIGS. 28A and 28B) that corresponds to the FOV 1116 of the imaging device 1102. In some embodiments, as also generally discussed above, the aimer 1112 can project an aiming pattern via the controllable mirror 1103 (e.g., the aiming pattern being directed at and reflecting off the controllable mirror 1103). In some configurations, although this aiming pattern 1114 is shown as being offset from the center of the FOV 1116 (e.g., from the central axis of the FOV) and parallel to the optical axis, the aiming pattern 1114 can be centrally located relative to the FOV 1116. The aiming pattern 1114 can embody different shapes, such as a crosshair, a circle (e.g., an enclosed circle), etc., and the aimer can include lasers, other circuitry, etc., to produce the aiming pattern 1114 according to a variety of known approaches. In some embodiments, the aiming pattern 1114 can be controllable via the user interface 1110 (e.g., by the operator of the work vehicle 1104), and thus can be used help to determine the scan routine, via the user interface 1110. In some embodiments, during image acquisition the aimer 1112 is turned off and does not project the aiming pattern 1114. In some embodiments, an aimer can provide additional information for a user, including identification or other information for an object (e.g., whether an object is damaged or otherwise has a defect, whether or where an object is to be picked/placed/etc., a position of a relevant label or symbol, etc.)

FIGS. 28A and 28B show schematic illustrations of the imaging device 1102 and the work vehicle 1104 during the determination of a scanning pattern for scanning at least one side of the load 1106, based on one or more user inputs from the user interface 1110. In some embodiments, a user, via the user interface 1110, can move the controllable mirror 1103 to adjust where the aiming pattern 1114 is located until the aiming pattern 1114 reaches a desired position. Then, for example, the imaging device 1102 can receive a user input from the user interface 1110 (e.g., by the actuation of a button), and the current orientation of the controllable mirror 1103 can be stored as a desired orientation that corresponds to a desired starting location for the scanning pattern (e.g., the scanning pattern can begin with acquiring an image of a FOV with the controllable mirror 1103 in the desired orientation).

In some cases, a similar procedure can be implemented to determine a scanning boundary (i.e., the boundary of a region of interest to scan), relative to which a scanning pattern can be defined. For example, this a can be implemented to determine more than one desired controllable mirror orientation that can each inform a scanning pattern. For example, each indicated mirror orientation can correspond to a FOV including a vertex of an object (e.g. each of the four corners of the load 1106 for the given side). Correspondingly, these mirror orientations can be used to define edge (or other) boundaries, beyond which images may not be acquired. In some configurations, the imaging device 1102 can prompt a user, via a display in communication with the imaging device 1102, to select, via a user input, the desired mirror orientations, according to an order of specific target locations on the load 1106. For example, this can include selecting which particular object to implement the scanning pattern on, and a region of interest of the object (e.g., a defect on the object, a label, such as a barcode, etc.) on or around which to implement a scanning pattern. As a specific example, a user can be prompted to identify the mirror orientation corresponding to a particular region of interest of the object (e.g., the aiming pattern being positioned on the region of interest at the mirror orientation). Then, a scanning pattern (e.g. which can be predetermined) can be implemented to include the identified mirror orientation. In this way, relatively limited user input can help imaging systems to more quickly scan the relevant portions of the object, by setting a reference location (or related parameter) for the scanning pattern (e.g., when only a portion of the side of the object is to be scanned, such as the portion that surrounds the region of interest).

As yet another example, in one specific case, the user can be prompted to capture the mirror orientation (or image) corresponding to the upper left corner of the load 1106, then capture the mirror orientation (or image) corresponding to the lower left corner of the load 1106, then capture the mirror orientation (or image) corresponding to the lower right corner of the load 1106, and then capture the mirror orientation (or image) corresponding to the upper right corner of the load 1106. While this is just one example, other orders are contemplated. In addition, and as described above these images (e.g., two images, three images, four images) can be utilized by a computing device to determine the one or more dimensions of the side of the object. Similarly, users may sometimes use an aiming device to similarly indicate other areas for prioritized scanning, including areas with relevant symbols to be decoded. For example, a user can be prompted to indicate where the barcode (or other symbol) is on the side of the object to be scanned, using the aimer 1112. In this case, once the aiming pattern 1114 reaches the location of the symbol, then a user can actuate a user input, which can be received by the imaging device as the desired mirror orientation to determine a scanning pattern. For example, the imaging device can then determine the scanning pattern based on the desired mirror orientation. In particular, the scanning pattern can be localized around the desired mirror orientation (e.g., so that at least one of the FOVs that collectively span the scanning pattern overlaps at least partially with the FOV corresponding to the desired mirror orientation). In some cases, this scanning pattern can collectively span only a portion of the side of the object. In this way, the entire side of the object need not be scanned, which can facilitate faster scanning and identification of relevant symbols. In some embodiments, the imaging device 1102 can acquire images based on a predetermined order (or number) of target locations, in the absence of relevant user input (e.g., the order being from left to right, from up to down, etc.).

FIG. 29A shows a side view of another imaging system 1150, which is also similar to, and a potential extension or modification of other imaging systems discussed above, including the imaging systems 210, 220, 500, 600, 900, 950. Thus, the imaging system 1150 can include similar features or be configured for similar functionality as other imaging systems discussed herein, as appropriate. For example, the imaging system 1150 also includes an imaging device 1152, and a support structure 1154, each of which can be implemented in a similar manner as the other imaging device, and support structures, described above. For example, the imaging device 1152 also can include a control device, an imaging sensor, a controllable mirror 1153, and a distance sensor 1155. The controllable mirror 1153 can pivot around two or more axis, and defines the FOV of the imaging device 1152. Thus, by moving the orientation of the controllable mirror 1153 (e.g., by the control device of the imaging device 1152), images from different FOVs can be acquired. The distance sensor 1155 can sense a distance between a load 1156 to be scanned and the imaging device 1152, which can include sensing a length of the optical path that corresponds to the current FOV of the imaging device 1152. In some cases, the imaging device 1152 can also include an aimer 1158 that is configured to project an aiming pattern on or near the load 1156. For example, a user input (not shown) can be in communication with the imaging device 1152, which can be used to determine the scanning pattern for the side of the load 1156 in a similar manner to the processes described above with regard to FIGS. 28A and 28B.

As shown, the imaging device 1152 is coupled to the support structure 1154, at a free end of the support structure 1154, although other coupling locations are contemplated. In some configurations, the imaging device 1152 can be coupled to the support structure 1154 so that that a distance between the optical axis of the imaging device 1152 and the floor (e.g., that supports the support structure 1154) is substantially the same as an average height of a human (such as five feet, six feet, etc.) measured from the floor. In this way, because regions of interest (e.g., barcodes) are typically placed around this height, the imaging device 1152 can potentially capture images over a decreased imaging area (collectively defined by multiple FOVs), which can reduce the number of images (and acquisition time) required for a scanning pattern. Similarly, because the optical axis of the imaging device 1152 (e.g., defined without the controllable mirror 1153) is closer to this region, the number and degree of movements required by the controllable mirror 1153 are decreased, which can speed up completion of the scanning pattern.

Similarly to implementations using the object transport system 1100, the distance between the imaging device 1152 and the load 1156 can be determined, via the distance sensor 1155, and, in some cases, can be used to determine the scanning pattern. Additionally, the imaging device 1152 can receive dimensional data of the load 1156 (or dimensional data representative of the load 1156, such as when the objects are substantially the same (e.g., are all standard pallets)), which can be used to determine the scanning pattern. In some embodiments, a user can transport the load (e.g., with a hand pallet truck) and can stop the load 1156 to face the imaging device 1152 (e.g., with the load 1156 off the truck, or still on it). In some cases, the user can, after the load 1156 is stopped in front of the imaging device 1152, actuate a user interface that is in communication with the imaging device 1152 (e.g., to implement the scanning pattern or distance measuring routine). In this case, once the imaging device 1152 receives the user input from the user interface, the imaging device 1152 can begin implementing the distance measuring routine, or the scanning pattern. In some cases, a proximity sensor or other device can be used to detect the presence of the load 1156 automatically, and a scanning process can be executed accordingly.

In some cases, the load 1156 can be supported by a rotatable platform that can rotate the object about the vertical axis 1160. In this way, different sides of the load 1156 can be positioned to face the imaging device 1152, and the imaging device 1152 can accordingly implement a scanning pattern for multiple sides of the load 1156. In some cases, the rotatable platform can automatically be moved (e.g., by a motor) thereby rotating the load 1156, while in other cases, a user can rotate the load 1156 when the load is positioned on the rotatable platform. In other cases, such as when the load 1156 is engaged by a hand pallet truck (or other work truck), the user can move the load 1156, using the truck to position different sides of the load 1156 to face the imaging device 1152.

In some embodiments, the imaging device 1152 is already calibrated to implement a scanning pattern at a particular distance. In this case, a zone can be placed on the floor, which indicates to a user to place the load 1156 within (or not to extend past) the zone. Thus, the load 1156 can be placed and stopped within the zone 1162, which is at a predetermined distance from the imaging device 1152. In some cases, however, the distance sensor 1155 can determine a relevant working distance, and a scanning pattern can be implemented accordingly.

Figure 29B:
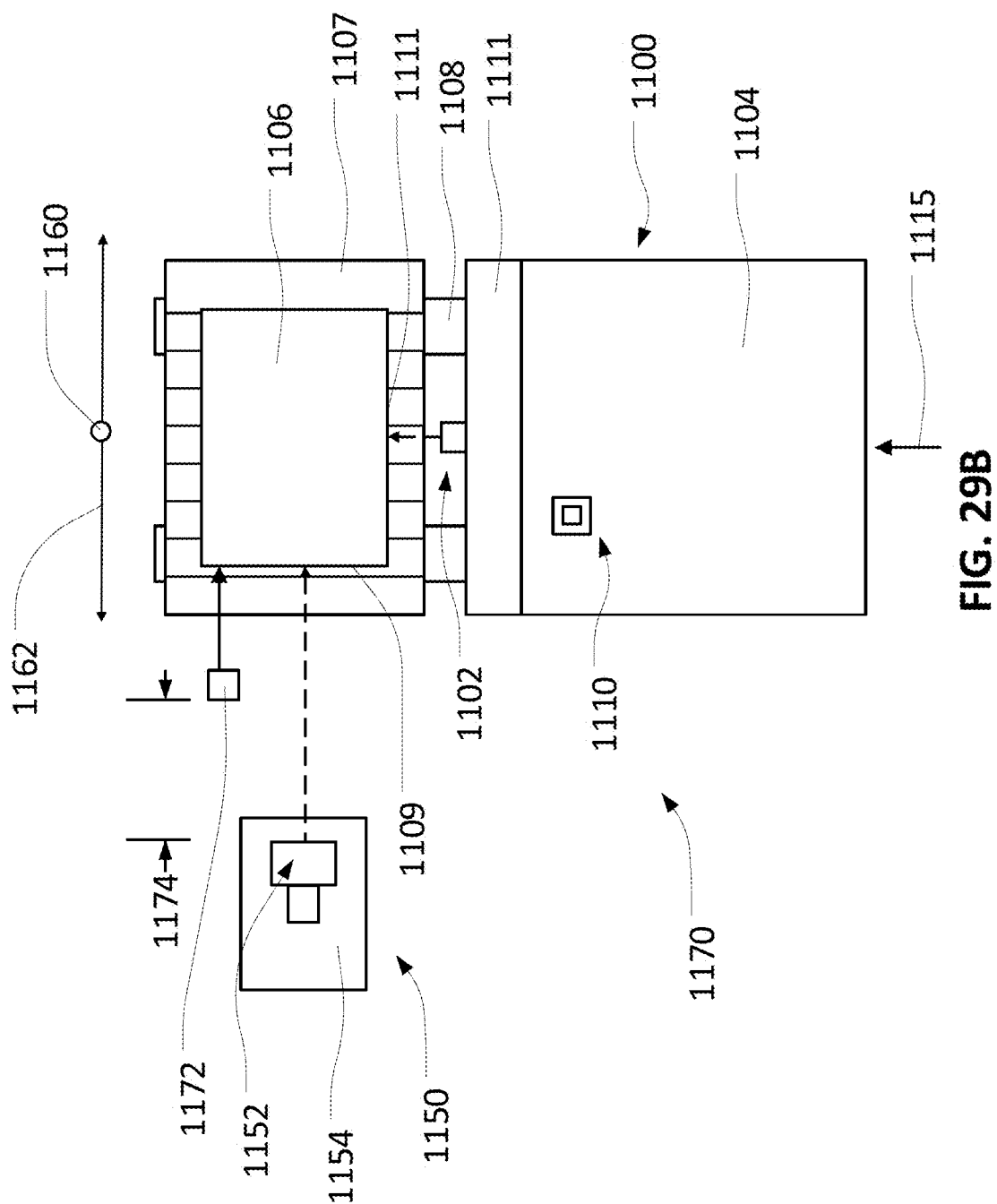
FIG. 29B is a top view of another imaging system.

FIG. 29B shows a top view of another imaging system 1170, which is also similar to, and a potential extension or modification of other imaging systems discussed above, including the imaging systems 210, 220, 500, 600, 900, 950, 951, 1150, 1151. Thus, the imaging system 1170 can include similar features or be configured for similar functionality as other imaging systems discussed herein, as appropriate. For example, the imaging system 1170 can include the object transport system 1100 and the imaging system 1150. In particular, as shown in FIG. 29B, the imaging system 1170 can include the object transport system 1100, which can have the work vehicle 1104 engaging with a pallet 1107 that supports the load 1106 and the imaging device 1102 coupled to the work vehicle 1104. In addition, the imaging system 1170 can include the imaging system 1150 having the imaging device 1152 and a support structure 1154 that supports the imaging device 1152.

In some embodiments, the imaging system 1170 can have a distance sensor 1172 that is positioned (e.g., at a fixed location) away from and at a different location than the load 1106, the transport system 1100, the imaging system 1150, or the support structure 1154, etc. In some cases, such as illustrated in FIG. 29B, the distance sensor 1172 can be positioned between the imaging device 1152 and the load 1106, however, in alternative configurations, the imaging device 1152 can be situated between the distance sensor 1172 and the load 1106. The distance sensor 1172 can be in communication (e.g., wired, wireless) with the imaging device 1152, and can be in communication with the imaging device 1102 (or other computing device). In some embodiments, the distance sensor 1172 can be mounted to or fixed at a known location relative to a structure of a building, such as, for example, a door (e.g., a dock door or other door of a cargo bay).

During operation, the distance sensor 1172 can measure a first distance between a side 1109 of the load 1106 (e.g., which is substantially perpendicular to the direction of travel 1115 of the work vehicle 1104) and the distance sensor 1172. Then, because a second distance 1174 between the imaging device 1152 and the distance sensor 1172 is known (or measurable), the first distance and the second distance can be combined (e.g., added together) to determine the distance between the side 1109 of the load 1106 and the imaging device 1152. Then, the scanning pattern for the side 1109 of the load 1106 can be generated (or adjusted) based on the distance between the side 1109 of the load 1106 and the imaging device 1152. In this way, for example, the distance sensor 1172 can help to determine the distance between the imaging device 1152 and the load 1106 (e.g., so the distance sensor 1155 of the imaging device 1152 does not have to, or when the imaging device 1152 does not include a distance sensor).

In some embodiments, a distance sensor (e.g., the distance sensor 1172) can measure a distance to an object that is not the same as a distance from the object during scanning operations (e.g., by the imaging system 1150). For example, a distance sensor can measure a distance of to an object at a reference time or location (e.g., as a work vehicle carrying the object passes through a dock door), and a subsequent path of travel of the object (e.g., based on an assumed or detected path for the work vehicle) can also inform determination of a scanning pattern (e.g., particular mode of operation).

In some embodiments, the imaging system 1170 can include other imaging systems (e.g., two instances of the imaging systems 1150 of FIG. 29B), with each of the imaging systems facing a particular side (or sides) of an object (e.g., the load 1106). In addition, the imaging system 1170 can include other distance sensors (e.g., two instances of the distance sensor 1172), with each distance sensor facing a particular side (or sides) of an object. In this way, for example, each imaging device of each imaging system can simultaneously (or otherwise) scan a respective side of the load 1106, according to a respective scanning pattern, which can generally decrease the time needed to scan multiple sides of the load 1106.

In some embodiments, including if there is enough clearance between a side of the load 1106 (e.g., that faces the imaging device 1102), an imaging device on a work vehicle (e.g., the imaging device 1102) can scan the side of the load 1106 while the at least one implement 1108 is engaged with the load 1106 (e.g., the pallet 1107 that supports the load 1106). In this case, the distance sensor 1105 can also measure the distance between the side and the load 1106, and adjust the scanning pattern for the side of the load 1106.

Figure 30:
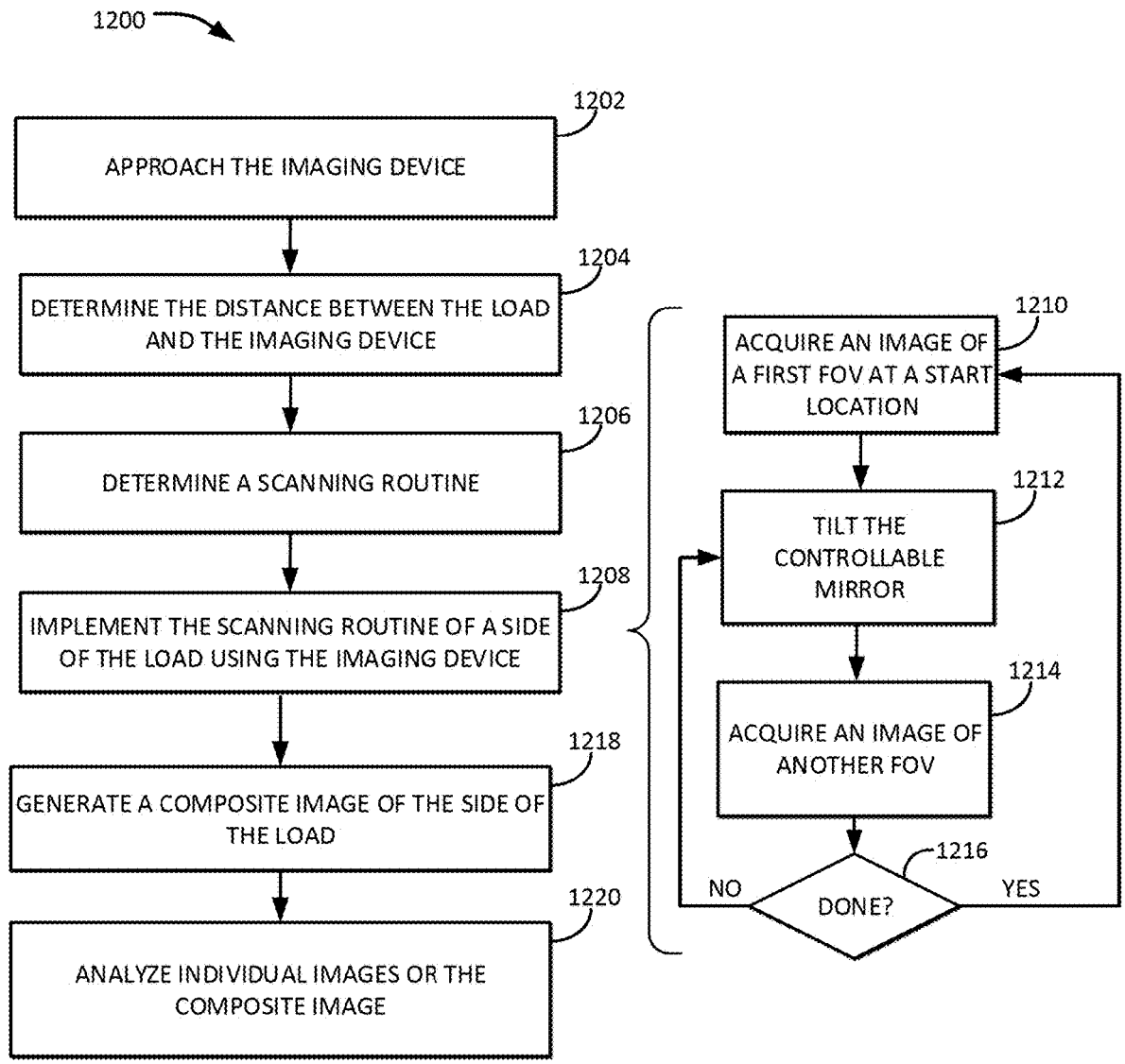
FIG. 30 is a flowchart of a process for scanning at least one side of an object.

FIG. 30 shows a flowchart of a process 1200 for scanning at least one side of an object, which can be similar to the other processes described above, such as the process described with reference to FIG. 15, the processes 700, 800, 850, 1000, and so on. Similarly to other processes discussed herein, the process 1200 generally includes using controllable mirrors to acquire images, as variously discussed above. In general, aspects of the process 1200 can be implemented using one or more of the imaging systems discussed above, alone or in combination with each other, or can be implemented using other imaging systems that include one or more imaging sensors, a mirror arrangement with at least one controllable mirror, and a control device (e.g., a specially programmed general purpose computer) that is configured to control image acquisition with the one or more imaging sensors and movement of the at least one controllable mirror. In some configurations, the process 1200 can be a computer-implemented process, which can be executed using one or more computing devices (e.g., the control device of an imaging device).

At 1202, the process 1200 can include approaching the imaging device with the load (or other object), such as, for example, an object support by a pallet. In some embodiments, this can include the load being already stopped, and moving the imaging device closer to the load (e.g., when the imaging device is coupled to a work vehicle). In other embodiments, this can include the imaging device being fixed (e.g., when the imaging device is coupled to a support structure that is fixed), and moving the load towards the imaging device (e.g., with a hand pallet truck) and stopping the load.

At 1204, the process 1200 can include one or more computing devices (e.g., the controller of an imaging device) determining the distance between the load and the imaging device (e.g., via a distance sensor), which can be similar to portions of the process 1000. In some embodiments, including when a work vehicle is moving towards the imaging device (or vice versa), a distance sensor can also determine derivative information (e.g., a velocity, or an acceleration), such as from multiple distance measurements and times associated with them. In some cases, these derivative measurements can then be used, as appropriate to determine the scanning pattern (e.g., adjust the FOV angles to compensate for the relative movement between the work vehicle and the imaging device), which can be implemented by the imaging device as the relative distance between the imaging device and the load changes.

At 1206, the process 1200 can include the one or more computing devices determining a scanning pattern for a side of the load, which can be similar to the portions of the process 1000, including the block 1004 of the process 1000. In some cases, the scanning pattern can at least be determined using one or more expected dimensions of the load to be scanned, the actual dimension(s) of the load to be scanned, one or more user inputs, etc. Additionally, the scanning pattern can at least be determined using the (determined) distance between the imaging device and the side of the load to be imaged. For example, a real world size of a FOV at an object can be determined based on a determined distance, and a scanning pattern for the object can then be determined based on this real world size of the FOV of the imaging device and the size of the object. In some embodiments, the imaging device can perform a search routine, which may include acquiring a plurality of images of the side of the load, some or all of which can include edges or corners of the side of the load. The imaging device can then analyze these images (e.g., using appropriate detection processes) to determine edges, corners (e.g., the four corners of the side of the load), etc., and can correspondingly determine one or more actual (or pixel) dimensions of the relevant side(s) of the object (e.g., the width and the height). With an area of interest (e.g., side of an object) thus specified, or otherwise determined, a series of movements for a controllable mirror and corresponding image acquisition timing (or relative sequence) can then be determined according to any variety of strategies, including as detailed relative to various examples above.

At 1208, the process 1200 can include the one or more computing devices implementing the scanning pattern to scan a side of the load using the imaging device, which can be similar to portions of the process 1000, including the block 1008 of the process 1000. For example, the block 1208 of process 1200 can include, blocks 1210, 1212, 1214, 1216, each of which can be similar respectively to the blocks 1010, 1012, 1014, 1016 of the process 1000. At 1210, the block 1208 of the process 1000 can include the one or more computing devices acquiring a first image of a first FOV defined at least in part by the controllable mirror of the imaging device in a first orientation (e.g., the start location, such as one of the desired orientations from the aiming process above). In some cases, this can include first tilting the controllable mirror about at least one axis (e.g., about only a single axis, multiple axes, etc.) to orient the controllable mirror to the first orientation. At 1212, the block 1208 of the process 1200 can include the one or more computing devices tilting the controllable mirror along at least one axis to a second orientation (different from the first orientation) to define a second FOV. At 1214, the block 1208 of the process 1200 can include acquiring a second image of the second FOV. At 1216, the block 1208 of the process 1200 can include the one or more computing devices determining whether or not the scanning pattern has been completed. For example, if all of the images defined by the scanning pattern (e.g., each with a different FOV) have been acquired, the one or more computing devices can determine that the scanning pattern has been completed and, in some cases, scanning may end. Similarly, in some cases, if all the controllable mirror orientations according to the scanning pattern have been completed by the controllable mirror, the one or more computing devices can determine that the scanning pattern has been completed.

In some embodiments, the imaging device can implement the scanning pattern to scan according to a predetermined order. In other words, the imaging device can orient the controllable mirror and subsequently acquire an image multiple times, according to a spatial pattern defined by the scanning pattern. For example, the spatial pattern can be similar to the acquisition as described with reference to FIG. 26, with a plurality of overlapping column acquisitions (or overlapping row acquisitions). In other cases, the spatial pattern can follow a serpentine path (e.g., acquiring one column acquisition along one direction, and acquiring another column acquisition adjacent to the one column acquisition along an opposing direction).

If at 1216, the one or more computing devices determine that the scanning pattern has not been completed, the process 1200 can proceed back to block 1210 to further tilt the controllable mirror along at least one axis to a third orientation (different from both the first and second orientations) to define a third FOV, and subsequently acquire an image of the third FOV. If at 1216, the one or more computing devices determine that the scanning pattern is complete, the, the process 1200 can proceed to block 1218.

At 1218, the process 1200 can include the one or more computing devices generating a composite image of the side of the load, which can be similar to the block 1020 of the process 1000. For example, all (or some of) the images, with corresponding FOVs, can be combined, such as using appropriate image stitching processes. In some cases, a composite image is not formed, and rather the individual images from the scanning pattern can be otherwise analyzed.

At 1220, the process 1200 can include the one or more computing devices analyzing the individual images or the composite image from the scanning pattern, which can be similar to the block 1020 of the process 1000. For example, the one or more computing devices can determine a region of interest for one or more of these images, and extract information from the region of interest. More specifically, such as when the region of interest is a barcode (or other symbol), once the one or more computing devices identify the barcode (or the symbol), the one or more computing devices can decode and extract information from the barcode (or the symbol).

In some embodiments, each of the imaging devices described herein can be configured to autofocus a FOV (e.g., that is directed by the orientation of the controllable mirror). For example, each imaging device can include a variable focus lens that can be adjust to focus the FOV. In addition, the control device can acquire and analyze an image of the FOV and adjust the focus of the variable focus lens to autofocus the imaging device.

Generally, systems and methods disclosed herein can also be optimized in various ways. For example, scan patterns and image acquisition using controllable mirrors, including those discussed relative to embodiments illustrated in the FIGS. can be optimized based on considerations relating to minimizing the number of total scans, movements, or images acquired, minimizing the equipment and other overhead required to acquire appropriate images for a complete scan area or scanning goal, and minimizing the perspective distortion of images of objects of interest (e.g., due to relatively large angle of incidence for optical paths). However, in some implementations, depending on available equipment, context, objectives, types of objects to be scanned, and other factors, certain of these considerations (or others) may be prioritized, as appropriate.

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. An imaging system comprising:
a transport system;
a distance sensor;
an imaging device in communication with the distance sensor, the imaging device comprising:
 an imaging sensor;
 a controllable mirror that is configured to be controllably tilted relative to one or more axes, the controllable mirror defining a field of view (FOV) for the imaging sensor, based on an orientation of the controllable mirror; and
 a control device, the control device being configured to:
  determine, using a distance sensor, a distance between the imaging device and a side of an object;
  determine a scanning pattern, based on the distance between the imaging device and the object and based on a predetermined dimension of the object; and
  implement the scanning pattern to scan a side of an object, and
wherein the imaging device is coupled to the transport system, or the imaging device is coupled to a support structure and the transport system supports and moves the object in a direction of travel.

2. The imaging system of claim 1, wherein the imaging device is coupled to the transport system, and wherein the transport system is a work vehicle having one or more implements that are configured to engage a load to be moved by the work vehicle.

3. The imaging system of claim 1, wherein the imaging system includes a support structure,
wherein the imaging device is coupled to the support structure that is configured to be fixed in place,
wherein the transport system supports and moves the object in a direction of travel, and
wherein the control device implements the scanning pattern to scan the side of the object as the object travels past the imaging device in a direction of travel along the transport system.

4. The imaging device of claim 3, wherein implementing the scanning pattern includes the control device moving the controllable mirror about only one axis to acquire a plurality of images, with a correspondingly plurality of FOVs, that collectively cover the entire side of the object, and
wherein the controllable mirror is configured to be controllably tilted relative to two or more axes.

5. The imaging system of claim 1, wherein implementing the scanning pattern includes the control device being further configured to:
acquire, using a first FOV that is defined by the controllable mirror in a first orientation, a first image of the side of an object;
move the controllable mirror only about only one axis of the one or more axes so that the controllable mirror is in a second orientation; and
acquire, using a second FOV that is defined by the controllable mirror in the second orientation, a second image of the side of the object.

6. The imaging system of claim 5, wherein the first FOV overlaps vertically with the second FOV.

7. The imaging system of claim 5, wherein implementing the scanning pattern further includes the control device being further configured to:
move the controllable mirror only about the one axis so that the controllable mirror is in a third orientation; and
acquire, using a third FOV that is defined by the controllable mirror in the third orientation, a third image of the side of the object; and
wherein the third FOV overlaps horizontally with at least one of the first FOV, or the second FOV.

8. The imaging system of claim 1, wherein the control device of the imaging device implementing the scanning pattern includes the imaging device being configured to acquire multiple images that collectively span the entire height of the object.

9. The imaging system of claim 1, wherein the predetermined dimension of the object is a maximum expected height of an object, and
wherein the control device is configured to implement the scanning pattern to acquire, using the imaging device, multiple images having corresponding FOVs that collectively span from a height of the transport system to a maximum expected height of the object.

10. The imaging system of claim 1, wherein an optical axis of the imaging device, at the imaging device, is substantially perpendicular to the direction of travel of the object, and
wherein the optical axis of the imaging device is defined by the optical axis that extends out of the imaging device to extend through and bypass the controllable mirror without reflecting off the controllable mirror.

11. The imaging system of claim 1, further comprising a fixed mirror that is obliquely angled relative to the direction of travel, and
wherein an optical axis of the imaging device, at the imaging device, is substantially parallel to the direction of travel of the object, and
wherein the optical axis of the imaging device is defined by the optical axis that extends out of the imaging device to extend through and bypass the controllable mirror without reflecting off the controllable mirror.

12. The imaging system of claim 1, further comprising a fixed mirror that faces the side of the object and exhibits a first height between first and second ends of the fixed mirror, to direct the FOVs that correspond to a plurality of images to collectively span the entire height of the object.

13. The imaging system of claim 12, wherein the fixed mirror is a first fixed mirror, the imaging system further comprising a second fixed mirror, and
wherein the control device of the imaging device is configured to move the controllable mirror to direct the FOV for the imaging sensor onto a different side of the object, via the second fixed mirror, to acquire an image of a portion of the different side of the object.

14. The imaging system of claim 1, further comprising a presence sensor, and wherein the control device is further configured to:
receive a signal from the presence sensor indicative of a sensing of the object; and
begin implementing the scanning pattern, based on receiving the signal from the presence sensor.

15. An object transport system comprising:
a distance sensor;
a work vehicle having a user interface and one or more implements that are configured to engage a load to be moved by the work vehicle; and
an imaging device coupled to the work vehicle, the imaging device being in communication with the distance sensor, the imaging device including:
an imaging sensor;
a mirror that is configured to be tilted relative to two axes, the mirror defining a field of view (FOV) for the imaging sensor;
an aimer that projects an aiming pattern via the mirror; and
a control device, the control device being configured to:
determine, using the distance sensor, a distance between the imaging device and the load;
control the mirror to move the aiming pattern;
receive, from the user interface, a user input that indicates that the aiming pattern is at a desired location;
determine a scanning pattern, based on the user input and the distance between the imaging device and the load; and
control the mirror and the image sensor, according to the scanning pattern, to tilt the mirror about one or more of the two axes and acquire a plurality of images of a first side of the load via the mirror.

16. The object transport system of claim 15, wherein the control device is further configured to determine the scanning pattern based also on a predetermined dimension of the load.

17. The object transport system of claim 15, wherein the control device is further configured to:
determine, using the distance sensor, a height of the load; and determine the scanning pattern based also on the determined height of the load.

18. A computer-implemented method for scanning a side of an object to identify a region of interest, the method comprising:
- determining, using one or more computing devices, a distance between a side of an object and an imaging device;
- determining, using the one or more computing devices, a scanning pattern for an imaging device that includes a controllable mirror, based on the distance between the side of the object and the imaging device and a predetermined dimension of the object;
- moving a controllable mirror according to the scanning pattern to acquire, using the one or more computing device and the imaging device, a plurality of images of the side of the object; and
- identifying, using the one or more computing devices, the region of interest based on the plurality of images.

19. The computer-implemented method of claim 18, wherein moving the controllable mirror according to the scanning pattern includes:
- moving, using the one or more computing devices and the imaging device, the controllable mirror about only one axis to acquire the plurality of images, with a corresponding plurality of FOVs, that collectively cover the entire side of the object.

20. The computer-implemented method of claim 18, further comprising:
- determining, using the one or more computing devices, a dimension of the side of the object; and
- determining, using the one or more computing devices, the scanning pattern for the imaging device based on the dimension of the side of the object.

21. The computer-implemented method of claim 18, wherein determining the dimension of the side of the object is based on at least one of data from a distance sensor, or one or more of the plurality of images.

* * * * *